(12) United States Patent
Owens

(10) Patent No.: US 7,376,591 B2
(45) Date of Patent: May 20, 2008

(54) INTERACTIVE INTERNET SHOPPING AND DATA INTEGRATION METHOD AND SYSTEM

(76) Inventor: Cstephani D. Owens, 5901 E. Sanna St., Paradise Valley, AZ (US) 85253

( * ) Notice: Subject to any disclaimer, the term of this patent is extended or adjusted under 35 U.S.C. 154(b) by 980 days.

(21) Appl. No.: 10/164,334

(22) Filed: Jun. 6, 2002

(65) Prior Publication Data

US 2003/0004831 A1    Jan. 2, 2003

Related U.S. Application Data

(60) Provisional application No. 60/297,207, filed on Jun. 7, 2001.

(51) Int. Cl.
*G06Q 30/00* (2006.01)
(52) U.S. Cl. ...................................... 705/26
(58) Field of Classification Search .................. 705/26, 705/27
See application file for complete search history.

(56) References Cited

U.S. PATENT DOCUMENTS

| | | | |
|---|---|---|---|
| 4,703,423 A * | 10/1987 | Bado et al. ...................... 705/1 |
| 5,918,211 A * | 6/1999 | Sloane .......................... 705/16 |
| 6,513,017 B1 * | 1/2003 | Howard et al. ................ 705/28 |
| 6,676,014 B2 * | 1/2004 | Catan .......................... 235/375 |
| 2002/0082931 A1 * | 6/2002 | Siegel et al. ................... 705/26 |
| 2002/0178088 A1 * | 11/2002 | Lurie et al. .................... 705/26 |
| 2003/0171944 A1 * | 9/2003 | Fine et al. ....................... 705/1 |

OTHER PUBLICATIONS

Atlanta Journal Constitution, Dec. 25, 2001. Retrieved from Dialog File 608, Acc#: 07007964.*

* cited by examiner

*Primary Examiner*—Naeem Haq
(74) *Attorney, Agent, or Firm*—Stoneman Volk Patent Group; Martin L. Stoneman; Michael D. Volk, Jr.

(57) ABSTRACT

A method and system for interactively shopping for groceries, especially on an Internet web site, where the user may create a shopping list, shop for items from the list at a selected Grocery Storey store, arrange for pick up or delivery of the selected items and payment, or to download the list to a PDA or for printing with the store's layout for use in the store. Users are required to register and provide specific demographic information (useful to Manufacturers and stores) to be eligible to receive the benefits of use of the web site, such as menu creation, coupon downloads, menu planning, and recipe input. Shopping lists may be created from a single input screen using standard language text; and products may be automatically suggested to the user based on best regular price or retailer's specials. Recipes may be altered to meet numbers of servings or dietary requirements and changes stored for future use.

23 Claims, 114 Drawing Sheets

| | |
|---|---|
| Use Case ID | OFUC0001 |
| Use Case Name | Web site log in |
| Created by | |
| Date Created | 6/7/02 |
| Actor | User |
| Description | User requests to log on to the system. The user will do so by means of entering a user name and password to a web page logon screen. |
| Preconditions | User must have access to the log on screens |
| Post conditions | User's logon information, time and date stamp are recorded within the system. All account information retrieved and read into session variables for easy retrieval |
| Priority | High |
| Frequency of Use | Approximately 5 times per week per user, potential for more, if users log out and in periodically during the day |
| Normal Course | 1.0 Log in<br><br>*Actor Actions*<br>1. Open client or web browser<br>2. Go to logon Screen<br>3. Enter Username and password<br><br>*System Responses*<br>4. Verify Username and password<br>5. \<continue until user is validated for login into the system\> |
| Alternate Course | 1.1 N/A<br><br>*System Response*     *Actor Response* |
| Exceptions | 1.E.1 User cannot be authenticated<br><br>*Actor Response*<br>1. Try again to enter in user name and password<br><br>*System Responses*<br>2. Verify Username and password<br>3. \<continue until user is validated for login into the system\> |
| Includes | N/A |
| Special Requirements | N/A |
| Assumptions | User has a created a user name and password in a previous visit to the site. |
| Notes and Issues | N/A |

FIG. 7

| | |
|---|---|
| Use Case ID | OFUC0002 |
| Use Case Name | Product search within a particular ZIP code |
| Created by | |
| Date Created | 6/7/02 |
| Actor | Requestor |
| Description | User requests a product search within a particular ZIP code |
| Preconditions | User must have access to the screen |
| Post conditions | A list of stores carrying the indicated product is displayed along with the pricing. |
| Priority | High |
| Frequency of Use | Once a week per user, maybe more. |
| Normal Course | 2.0 Enter product and zip<br><br>*Actor Actions*<br>1. Open client or web browser<br>2. Go to Product Search Screen<br>3. Enter in the zip which you are trying to search<br>4. Enter in text name of the product<br>5. Submit the request<br><br>*System Responses*<br>5. Brings up list of stores where the products can be found, listings all sizes and the corresponding prices. |
| Alternate Course | 2.1 Zip Code is already known<br><br>*Actor Actions*<br>1. Open client or web browser<br>2. Go to Message Screen<br>4. If the user desires, he/she enter in a new zip code in which to search<br>5. Enter in the text name of the product for which he/she wishes to search<br><br>*System Responses*<br>3. System lists the zip code which has already been selected by the user<br>6. Brings up list of stores where the products can be found, listings all sizes and the corresponding prices. |
| Exceptions | 5.E.1 None identified<br><br>*Actor Response*<br>1. No zip code was entered<br><br>*System Responses*<br>2. System prompts for zip code<br>3. <repeat until zip code is entered> |
| Includes | N/A |
| Special Requirements | N/A |
| Assumptions | N/A |
| Notes and Issues | Volume of messages has not been identified |

FIG. 8

| | |
|---|---|
| Use Case ID | OFUC0003 |
| Use Case Name | User account sign up |
| Created by | |
| Date Created | 6/7/02 |
| Actor | Requestor |
| Description | User signs up for an account, and also submits some statistical information. |
| Preconditions | User must have access to the site, must also be willing to answer some questions about themselves |
| Post conditions | User has an account with the site, enabling them access to special features on the site |
| Priority | High |
| Frequency of Use | Once per login per user |
| Normal Course | 3.0 Fill out user information screen<br><br>*User Responses*<br>1. User fills in this info:<br>   • Name<br>   • Age range<br>   • Gender<br>   • Number in household<br>   • Zip code<br>   • Email<br>   • Special Diets<br>2. User answers the following questions<br>   • How often do you shop for food<br>   • Estimated grocery bill<br>   • Do you use coupons<br>   • Do you shop at more than one grocery store<br>   • Which grocery stores to you show<br>3. User submits the form<br><br>*System Responses*<br>4. System makes sure all required fields are filled<br>5. <repeat until all required information is entered><br>6. User account is created, information is recorded |
| Alternate Course | 3.1 N/A<br>   *System Response*         *Actor Response* |
| Exceptions | 3.E.1 User already has an account<br>   *System Response*         *Actor Response*<br>1. Indicate to user that they already have an account<br>2. Ask them to log in. |
| Includes | |
| Special Requirements | N/A |
| Assumptions | N/A |
| Notes and Issues | N/A |

FIG. 9

| | |
|---|---|
| Use Case ID | OFUC0004 |
| Use Case Name | Zip code and store selection |
| Created by | |
| Date Created | 6/7/02 |
| Actor | Requestor |
| Description | User selects a zip code and store. This is a necessary step in order for the user to see store specials or to create a shopping list. |
| Preconditions | User must have access to the site, must also be willing to answer some questions about themselves |
| Post conditions | User has an account with the site, enabling them access to special features on the site |
| Priority | High |
| Frequency of Use | Once per login per user |
| Normal Course | 4.0 Select zip code and grocery store<br><br>*User Responses*<br>1. User go to the select a store screen<br>2. User will be prompted to enter a zip code<br>3. User enters in zip code and submits the form.<br>4. User submits the form<br>6. User selects a store and submits the form<br><br>*System Responses*<br>5. System creates list of stores from which the user can select<br>7. <repeat until store is selected> |
| Alternate Course | 4.1 User has already selected a zip code and store, change zip code |
| Alternate Course | 4.2 User has already selected a zip code and store, change store<br><br>*System Response*<br>1. System informs user that a zip code and store has been selected and gives the option to change the zip code and store<br>2. System provides a list of stores based on the zip code<br><br>*Actor Response*<br>3. User selects a new store from the list and submits the form.<br>4. <repeat until user has selected a store> |
| Exceptions | 4.E.1 Zip Code is not valid<br><br>*System Response*<br>1. Zip code user enters is not valid<br>2. User is prompted to reenter zip code<br><br>*Actor Response*<br>3. User enters in a new zip code<br>4. <repeat until zip code the user enters is valid> |
| Includes | |
| Special Requirements | N/A |
| Assumptions | N/A |
| Notes and Issues | Zip code may be valid, but if the store is not in the system database, it will show as invalid. |

FIG. 10

| | |
|---|---|
| Use Case ID | OFUC0005 |
| Use Case Name | Shopping list creation |
| Created by | |
| Date Created | 6/7/02 |
| Actor | Requestor |
| Description | User creates a shopping list |
| Preconditions | User must have access to the shopping list creation screen, picked a zip code and store |
| Post conditions | A Shopping List is created |
| Priority | High |
| Frequency of Use | Once every time a user accesses the web site |
| Normal Course | 5.0 Create Shopping list<br><br>*User Responses*<br>1. User selects grocery item general descriptions groceries in each of the grocery categories:<br>3. User submits the shopping list<br>5. User selects the desired brands, sizes and quantities<br>7. User submits the list<br><br>*System Responses*<br>2. As the user selects itemst, ads for foods items of this category are displayed<br>4. System provides list of all brands for each selected food item, and the corresponding prices, along with any coupons that may be associated with each item<br>6. System tallies the total price in real time as each item is selected |
| Alternate Course | 5.1 Consumer adds couponed items to the shopping list<br><br>*User Responses*<br>1. User selects grocery item general descriptions groceries in each of the grocery categories:<br>3. User clicks on any coupons or specials that are displayed on the shopping list<br>5. User submits the shopping list<br>6. User selects the desired brands, sizes and quantities<br>7. User submits the list<br><br>*System Response*<br>2. System adds the item or special the user clicks on to the shopping list<br>4. System provides list of all brands for each entered food item, and the corresponding prices, along with any coupons that may be associated with each item<br>8. System tallies the total price in real time as each item is selected |

FIG. 11

| | |
|---|---|
| Alternate Course | 5.2 Consumer filters Brand Name selection by dietary needs <br> *User Responses*      *System Responses* <br> 1. User selects grocery item general descriptions groceries in each of the grocery categories.    2. As the user selects items in the list, ads for foods items of this category are displayed <br> 3. User submits the shopping list    4. System provides list of all brands for each entered food item, sorted for dietary considerations, the corresponding prices, along with any coupons that may be associated with each item <br> 5. User selects the desired brands, sizes and quantities <br> 6. User submits the list <br> 7. System tallies the total price in real time as each item is selected |
| Exceptions | 5.E.1 No Items entered <br> *System Response*      *Actor Response* <br> 1. Tell user that he or she must enter some grocery items <br> 2. <repeat until grocery items are entered> |
| Includes | OFUC0003, OFUC0004 |
| Special Requirements | N/A |
| Assumptions | User selected zip code and stores (OFUC0004) |
| Notes and Issues | Usage and traffic flow may need to be determined in order to understand impact on the network. |

FIG. 11

| | |
|---|---|
| Use Case ID | OFUC0006 |
| Use Case Name | Saved shopping list access |
| Created by | |
| Date Created | 6/7/02 |
| Actor | Requestor (Administrator) |
| Description | After the user creates the shopping list, he/she may wish to print out the shopping list |
| Preconditions | User must have created a shopping list |
| Post conditions | Shopping list has been printed |
| Priority | Medium |
| Frequency of Use | Every time user creates a list |
| Normal Course | 6.0 Request to load previously saved list<br><br>*System Responses*<br>1. The create shopping list screen, the system will provide an option to pull up previously saved shopping list<br>3. System bring up previously saved list<br>5. System brings up the previously saved shopping list, and user can make modifications or additions to the list.<br><br>*User Responses*<br>2. User requests to pull up previous list<br>4. User selects the saved shopping list to pull up. |
| Alternate Course | 6.1 Alternate course – N/A |
| Exceptions | 6.E.1 User is not logged in<br><br>*System Response*<br>1. If the user has not logged in, the system will redirect the user to the login screen<br>4. System returns the user to create the shopping list screen.<br><br>*User Response*<br>2. User logs in.<br>3. <repeat until correct username and password has been entered and the user is logged in.> |
| Includes | OFUC0005, OFUC0002 |
| Special Requirements | N/A |
| Assumptions | User must have created a shopping list, saved a shopping list and be logged in |
| Notes and Issues | One of many options available after the user has created the shopping list. Others include: downloading list into PDA, send list to grocery store, save shopping list, see nutritional content |

FIG. 12

| | |
|---|---|
| Use Case ID | OFUC0007 |
| Use Case Name | Print a shopping list |
| Created by | |
| Date Created | 6/7/02 |
| Actor | Requestor (Administrator) |
| Description | After the user creates the shopping list, he/she may wish to print out the shopping list |
| Preconditions | User must have created a shopping list |
| Post conditions | Shopping list has been printed |
| Priority | Medium |
| Frequency of Use | Every time user creates a list |
| Normal Course | 7.0 Request print-friendly format<br><br>*System Responses*<br>5. On the completed shopping list screen, the system provides an option to provide a print friendly format of the list.<br>6. System reformats the shopping list into a print-friendly format.<br><br>*User Responses*<br>3. After the shopping list has been created with the print option, the user's request to print the shopping list.<br>7. User must print out the list from the browse printing functionality. |
| Alternate Course | 7.1 Alternate course – N/A |
| Exceptions | 7.E.1 None identified |
| Includes | OFUC0005 |
| Special Requirements | N/A |
| Assumptions | User must have created a shopping list |
| Notes and Issues | One of many options available after the user has created the shopping list. Others include: downloading list into PDA, send list to grocery store, save shopping list, nutritional content |

FIG. 13

| | |
|---|---|
| Use Case ID | OFUC0008 |
| Use Case Name | Send a shopping list to personal digital assistant (PDA) |
| Created by | |
| Date Created | 6/7/02 |
| Actor | User |
| Description | After the user requests the shopping list to be converted into a file which can be downloaded into a PDA |
| Preconditions | User must have created a shopping list |
| Post conditions | File has been created which user can download into PDA |
| Priority | Medium |
| Frequency of Use | Every time user creates a list |
| Normal Course | 8.0 Request Personal Digital Assistant Download<br><br>*System Responses*        *User Responses*<br>1. On the completed shopping list screen, the system provides an option to create a PDA Friendly file that the user can download.<br>2. The user requests the file to be created.<br>3. System creates file in PDA format<br>4. System creates downloading link on the screen for the user to click to download.<br>5. Requests the download<br>6. System downloads the file and returns use to the shopping list screen so the user can select other options. |
| Alternate Course | 8.1 Alternate course – N/A |
| Exceptions | 8.E.1 None identified |
| Includes | OFUC0005 |
| Special Requirements | N/A |
| Assumptions | User must have created a shopping list |
| Notes and Issues | One of many options available after the user has created the shopping list. Others include: print shopping list, send list to grocery store, save shopping list, nutritional content |

FIG. 14

| | |
|---|---|
| Use Case ID | OFUC0009 |
| Use Case Name | Save current shopping list to user's account |
| Created by | |
| Date Created | 6/7/02 |
| Actor | User |
| Description | The user requests the a just created shopping list to be added to his/her account |
| Preconditions | User must have created a shopping list |
| Post conditions | Shopping list has been added to the user's account which can be called up at a later date. |
| Priority | High |
| Frequency of Use | Potentially Every time user creates a list |
| Normal Course | 9.0 Request to save into user's account<br><br>*System Responses*<br>1. On the completed shopping list screen, the system provides an option to save the list into the user's account.<br>3. System prompts the user for a title for the shopping list<br>5. System saves the shopping list into the user's account<br><br>*User Responses*<br>2. The user requests the list to be added to the user's account.<br>4. User enters in a title for the shopping list and hits submit. |
| Alternate Course | 9.1 Alternate course – N/A |
| Exceptions | 9.E.1 User is not logged in<br><br>*System Response*<br>2. If the user has not logged in, the system will redirect the user to the login screen<br>5. System returns the user to the shopping list screen.<br><br>*User Response*<br>4. User logs in.<br>5. <repeat until correct username and password has been entered and the user is logged in.> |
| Includes | OFUC0005, OFUC0005 |
| Special Requirements | N/A |
| Assumptions | User must have created a shopping list |
| Notes and Issues | One of many options available after the user has created the shopping list. Others include: save list into PDA file, print shopping list, send list to grocery store, see nutritional content |

FIG. 15

| | |
|---|---|
| Use Case ID | OFUC0010 |
| Use Case Name | Send a shopping list to the store to place an order |
| Created by | |
| Date Created | 6/7/02 |
| Actor | User |
| Description | The user requests the a just created shopping list to be added to his/her account |
| Preconditions | User must have created a shopping list, must be logged on to the system |
| Post conditions | Order has been submitted to the grocery store |
| Priority | High |
| Frequency of Use | Potentially Every time user creates a list |
| Normal Course | 10.0 Request shopping list be sent to store to place order<br><br>*System Responses*<br>1. On the completed shopping list screen, the system provides an option to order the list from the selected grocery store.<br>3. System sends the list to the grocery store's ordering system, along with the user's information.<br><br>*User Responses*<br>2. The user requests the order to be placed |
| Alternate Course | 10.1 Alternate course – N/A |
| Exceptions | 10.E.1 User is not logged in<br><br>*System Response*<br>3. If the user has not logged in, the system will redirect the user to the login screen<br>4. System returns the user to the shopping list screen.<br><br>*User Response*<br>2. User logs in.<br>3. <repeat until correct username and password has been entered and the user is logged in.> |
| Includes | OFUC0005, OFUC0002 |
| Special Requirements | N/A |
| Assumptions | User must have created a shopping list |
| Notes and Issues | One of many options available after the user has created the shopping list. Others include: save list into PDA file, print shopping list, save list into user account, see nutritional content |

FIG. 16

| | |
|---|---|
| Use Case ID | OFUC0011 |
| Use Case Name | Shopping list item nutritional information request |
| Created by | |
| Date Created | 6/7/02 |
| Actor | User |
| Description | Once the user has created the list, the user requests to see the nutritional content of any of the items on the list |
| Preconditions | User must have created a shopping list |
| Post conditions | Nutritional information for requested items is displayed to user |
| Priority | Medium |
| Frequency of Use | Potentially every time user creates a list |
| Normal Course | 11.0 Request to see nutritional information on a particular item<br><br>*System Responses*<br>1. On the completed shopping list screen, the system provides an option to see the nutritional information for each screen.<br>3. System displays the nutritional information to the user.<br><br>*User Responses*<br>2. The user requests to see the nutritional value for each item. |
| Alternate Course | 11.1 Alternate course – N/A |
| Exceptions | 11.E.1 N/A |
| Includes | OFUC0005, OFUC0002 |
| Special Requirements | N/A |
| Assumptions | User must have created a shopping list |
| Notes and Issues | One of many options available after the user has created the shopping list. Others include: save list into PDA file, print shopping list, save list into user account, place an order with the shopping list |

FIG. 17

| | |
|---|---|
| Use Case ID | OFUC0012 |
| Use Case Name | Store sales and promotions information request |
| Created by | |
| Date Created | 6/7/02 |
| Actor | Requestor |
| Description | After selecting a store, user wants to see sales and promotions for that store. |
| Preconditions | User must have already selected a zip code and stores |
| Post conditions | User sees all of the in-store specials and promotions and has the opportunity to add any of them to his/her shopping list |
| Priority | Medium |
| Frequency of Use | Once per login per user |
| Normal Course | 12.0 User navigates to the store promotions and specials screen<br><br>*System Responses*<br>1. User navigates to the store specials and promotions screen<br>4. System adds the items to the shopping list and coupon savings to the user's account.<br><br>*User Response*<br>2. Based on zip code and store selection provides a list, pricing and a opportunity to add each listed product to the user's shopping list (even if it is not yet created)<br>3. User selects any or all of the product to add to the shopping list and submits the form |
| Alternate Course | 12.1 N/A<br>*System Response*      *User Response* |
| Exceptions | 12.E.1 User has not selected a store<br>*System Response*      *User Response*<br>1. System takes the user to the "Pick a store" screen |
| Includes | |
| Special Requirements | N/A |
| Assumptions | User has selected a grocery store |
| Notes and Issues | N/A |

FIG. 18

| | |
|---|---|
| Use Case ID | OFUC0013 |
| Use Case Name | Request available manufacturer's coupon |
| Created by | |
| Date Created | 6/7/02 |
| Actor | Requestor |
| Description | User wants to see what manufacturer's coupons are available for downloading. |
| Preconditions | User must have already selected a zip code and store |
| Post conditions | User sees all of the manufacturer's coupons available and has the opportunity to add any of them to his/her shopping list, as well as download the coupons to his/her account |
| Priority | Medium |
| Frequency of Use | Once per login per user |
| Normal Course | 13.0 User selects products to add to the shopping list<br><br>*User Responses*<br>1. User navigates to the manufacturer's coupon's screen<br>3. User selects which products he/she wishes to add to the shopping list and submits the form<br><br>*System Response*<br>2. System displays any manufacturer's coupons in the database along with the chance for the user to download the coupons to his/her account and/or to add the items to his/her shopping list<br>4. System adds the items to the shopping list and coupon savings to the user's account |
| Alternate Course | 13.1 User selects coupons to download<br><br>*User Responses*<br>1. User navigates to the manufacturer's coupon's screen<br>3. User selects which product coupons he/she wishes to print or download into the user's store account<br><br>*System Response*<br>2. System displays any manufacturer's coupons in the database along with the chance for the user to download the coupons to his/her account and/or to add the items to his/her shopping list<br>5. System adds coupon savings to the user's account |
| Exceptions | 13.E.1 User has not selected a store<br><br>*System Response*      *User Response* |
| Includes | |
| Special Requirements | N/A |
| Assumptions | |
| Notes and Issues | N/A |

FIG. 19

| | |
|---|---|
| Use Case ID | OFUC00014 |
| Use Case Name | Download or print any manufacturer's coupons |
| Created by | |
| Date Created | 6/7/02 |
| Actor | Requestor |
| Description | User wants to retrieve coupons he/she has downloaded into his account in this visit or a previous visit. This can be into the store account or they can be printed out to the screen so the user can print them out on his/her printer. |
| Preconditions | If the user wants to download any coupons into his/her store account, the user must have already selected a zip code and store, and have signed up for a store account |
| Post conditions | User has retrieved all of the coupons in the user's on-line account |
| Priority | High |
| Frequency of Use | Once per login per user |
| Normal Course | 14.0 User selects products to add to the shopping list<br><br>*User Responses*      *System Response*<br>2. User navigates to the manufacturer's coupon's screen<br>4. User selects which products he/she wishes to add to the shopping list and submits the form<br>3. System displays any manufacturer's coupons in the database along with the chance for the user to download the coupons to his/her account and/or to add the items to his/her shopping list<br>6. System adds the items to the shopping list and coupon savings to the user's account |
| Alternate Course | 14.1 User selects coupons to download<br><br>*User Responses*      *System Response*<br>2. User navigates to the manufacturer's coupon's screen<br>4. User selects which product coupons he/she wishes to print or download into the user's store account<br>3. System displays any manufacturer's coupons in the database along with the chance for the user to download the coupons to his/her account and/or to add the items to his/her shopping list<br>7. System adds coupon savings to the user's account |
| Exceptions | 14.E.1 User has not selected a store<br>*System Response*      *User Response* |
| Includes | |
| Special Requirements | N/A |
| Assumptions | |
| Notes and Issues | The coupons the user has selected remain stored in a temporary database until they wish to print them or download them into a store account. |

FIG. 20

| | |
|---|---|
| Use Case ID | OFUC00015 |
| Use Case Name | Sign up for Store Savings Card |
| Created by | |
| Date Created | 6/7/02 |
| Actor | Requestor |
| Description | User Signs up for store Savings Card. This will allow the user to download coupons/savings into his/her savings card while on line. |
| Preconditions | User must be logged in, must have at minimum entered in the zip code of the ZIP in which they are interested. |
| Post conditions | User has signed up for one or more savings store account |
| Priority | High |
| Frequency of Use | A few times during the lifetime of the user. |
| Normal Course | 15.0 Select stores savings cards to which he/she wants to have<br><br>*User Responses*<br>1. User navigates to the "Sign up for store savings accounts" screen.<br>3. User selects any or all of the stores in the provided list and submits it.<br><br>*System Responses*<br>2. System provides list of stores with which the user has a store account. Also provided is a list of store in the chosen zip code.<br>4. System sends the request to all the stores the user has selected. Information sent is the user's name, address and phone number. |
| Alternate Course | 15.1 Alternate course<br>*User Responses*  *System Response* |
| Exceptions | 15.E.1 User is not logged in<br><br>*System Response*<br>1. If the user has not logged in, the system will redirect the user to the login screen<br>4. System returns the user to the savings card sign up screen.<br><br>*User Response*<br>2. User logs in.<br>3. <repeat until correct username and password has been entered and the user is logged in.> |
| Exceptions | 15.E.2 User has not picked a zip code<br><br>*System Response*<br>1. If the user has not picked a zip code, the system will prompt the user for the zip code<br>5. System follows the rest of the procedure in OFUC00015.1<br><br>*User Response*<br>2. User enters the zip code he/she is interested in.<br>3. <repeat until correct username and password has been entered and the user is logged in.> |
| Includes | OFUC0001, OFUC0004, OFUC0003 |
| Special Requirements | N/A |
| Assumptions | User is logged in, has selected a zip code |
| Notes and Issues | User account information required phone number, as this is typically the user account number for the store savings cards |

FIG. 21

| | |
|---|---|
| Use Case ID | OFUC0016 |
| Use Case Name | Look up the nutritional content of a food item |
| Created by | |
| Date Created | 6/7/02 |
| Actor | User |
| Description | User wants to see a standard nutritional label on a brand name of food. Information such as calories per serving, protein and fat grams, and percentage daily requirements are included in this label. |
| Preconditions | None |
| Post conditions | Nutritional contents are displayed to the user. |
| Priority | High |
| Frequency of Use | Several times per login |
| Normal Course | 16.0 Request nutritional content<br><br>*User Responses*<br>1. User opens the "Nutritional Labels" screen<br>2. User enters the Name Brand whose nutritional value that he/she wishes to see.<br>3. Submits the form.<br><br>*System Responses*<br>2. Displays the nutritional values of the product |
| Alternate Course | 16.1 Alternate course – N/A |
| Exceptions | 16.E.1 Item can not be found<br><br>*System Responses*<br>1. System cannot find the item in the database.<br>2. System displays a message the item cannot be found.<br>3. System prompts the user to reenter a name brand.<br><br>*User Responses*<br>4. User enters another food item name.<br>5. <repeat until system finds the item or user is finished> |
| Includes | N/A |
| Special Requirements | N/A |
| Assumptions | None |
| Notes and Issues | N/A |

FIG. 22

| | |
|---|---|
| Use Case ID | OFUC0017 |
| Use Case Name | Browse recipes |
| Created by | |
| Date Created | 6/7/02 |
| Actor | User |
| Description | User wants to view recipes and potentially add the ingredients to his/her shopping list, and/or menu planner. |
| Preconditions | User must be logged in. |
| Post conditions | Recipe ingredients and instructions displayed to user, potentially the mean has been added to the meal planner or the recipe ingredients have been added to the shopping list. |
| Priority | High |
| Frequency of Use | Several times per login |
| Normal Course | 17.0 Request nutritional content<br><br>*User Responses*<br>1. User opens the "Search for Recipes" screen<br>3. User enters search criteria for a recipe.<br>4. User can choose to filter result by things such as breakfast, lunch, dinner or dessert items, as well as ethnicity.<br>6. User selects desired recipe.<br><br>*System Responses*<br>2. System displays current featured list of recipes and includes a search text box for user to search for a type of recipe by name, or type of dish, or recipes from user's account.<br>5. System provides list of matching recipes<br>7. System brings up the recipe, along with an option to add the ingredients in the recipe to the shopping list and/or add the item to the user's menu planner. |
| Alternate Course | 17.1 Alternate course – User wants to add recipe ingredients to shopping list<br><br>*User Responses*<br>8. User indicates they want the ingredients to be added to his/her shopping list.<br><br>*System Responses*<br>3. System adds the ingredients to the shopping list and brings the user to the shopping list screen.<br>9. |
| Alternate Course | 17.2 Alternate course – User wants to add recipe to menu planner<br><br>*User Responses*<br>8. User indicates they want the meal to be added to his/her menu planner.<br><br>*System Responses*<br>9. System adds the meal to the menu planner and brings the user to the menu planner screen. |

FIG. 23

| | |
|---|---|
| Alternate Course | 17.3 Alternate course – User wants to convert units from US into Metric |
| | <u>User Responses</u>          <u>System Responses</u><br>8. User indicates they want the meal units to be converted from US measurements into metric units    9. System displays the recipe ingredient amounts in the equivalent metric units. |
| Exceptions | 17.E.1 No search criteria entered |
| | <u>User Responses</u>          <u>System Responses</u><br>1. User submits the search without entering any search criteria    2. Systems prompts user to enter in search criteria.<br>   3. <repeat until system finds the item or user is finished> |
| Exceptions | 17.E.2 User wants to add items to shopping list, but they have not selected a store/zip code |
| | <u>System Responses</u>          <u>User Responses</u><br>1. System redirects user to the picking zip code and store screen.    2. User selects store and zip code.<br>3. System adds menu ingredients to shopping list and redirects user to shopping list screen. |
| Includes | OUCF0001, OFUC0004 |
| Special Requirements | N/A |
| Assumptions | None |
| Notes and Issues | N/A |

FIG. 23

| | |
|---|---|
| Use Case ID | OFUC0018 |
| Use Case Name | Recipe creation |
| Created by | |
| Date Created | 6/7/02 |
| Actor | User |
| Description | User wants to create his/her own recipe to add to account. |
| Preconditions | User must be logged in. |
| Post conditions | Recipe has been added to the user's account. |
| Priority | High |
| Frequency of Use | Several times per login |
| Normal Course | 18.0 Enter Recipe<br><br>*User Responses*<br>1. User opens the "Create my own recipe screen" screen<br>2. User enters a list of ingredients, along with the corresponding amounts needed of each of the items.<br>3. User enters instructions for preparing the dish<br>4. User enters a name for the recipe<br>5. User indicates whether the dish is a breakfast dish, a lunch dish, a dessert and/or ethnicity of the dish<br>6. Submits the form.<br><br>*System Responses*<br>7. System adds the recipe to the user's account, then redirects user to the "Select a recipe Page" |
| Alternate Course | 18.1 Alternate course – N/A |
| Exceptions | 18.E.1 Recipe information incomplete<br><br>*System Responses*<br>1. User did not enter all of the information necessary to create a recipe. System prompts user to enter missing information.<br><br>*User Responses*<br>2. User enters missing information.<br>3. <repeat until system finds the item or user is finished> |
| Includes | OFUC0001 |
| Special Requirements | N/A |
| Assumptions | None |
| Notes and Issues | N/A |

FIG. 24

| | |
|---|---|
| Use Case ID | OFUC0019 |
| Use Case Name | Edit/delete a recipe |
| Created by | |
| Date Created | 6/7/02 |
| Actor | User |
| Description | User wants to edit/delete a recipe. |
| Preconditions | User must be logged in and have previously created a recipe. |
| Post conditions | Recipe has been updated or deleted in the system. |
| Priority | High |
| Frequency of Use | Several times per login |
| Normal Course | 19.0 Edit Recipe<br><br>*User Responses*<br>1. User opens the "Edit/Delete Recipe" screen<br>3. User selects the recipe to edit.<br>4. User makes changes to the recipe and submits the changes.<br><br>*System Responses*<br>3. System displays the current list of recipes which the user has created.<br>5. System updates the recipe. |
| Alternate Course | 19.1 Alternate course – Delete Recipe<br><br>*User Responses*<br>1. User opens the "Edit/Delete Recipe" screen<br>2. User selects the recipe to delete.<br><br>*System Responses*<br>1. System displays the current list of recipes which the user has created.<br>3. System deletes the recipe. |
| Exceptions | 19.E.1 No name given for recipe<br><br>*System Responses*<br>1. After editing, a name for the recipe is missing. System prompts the user for a recipe name.<br><br>*User Responses*<br>2. User enters missing information.<br>3. <repeat until system finds the item or user is finished> |
| Exceptions | 19. E.2 Required information missing to define a recipe.<br><br>*System Responses*<br>1. After editing, there is not enough required information to define a recipe. System prompts the user to enter items.<br><br>*User Responses*<br>2. User enters missing information.<br>3. <repeat until system finds the item or user is finished> |

FIG. 25

| | |
|---|---|
| Exceptions | 19.E.3 Deleted Recipe is included in a meal or meal plan |

<table>
<tr><td colspan="2"><u>System Responses</u></td><td><u>User Responses</u></td></tr>
<tr><td>1.</td><td>A recipe the user wishes to delete is included in a predefined meal or meal plan</td><td>3. If User enters indicates yes or no, go to step 5a, otherwise go to Step 5b.</td></tr>
<tr><td>2.</td><td>System tells the user that the recipe is included in a list of meals and/or meal plans.</td><td></td></tr>
<tr><td>3.</td><td>Informs user that deleting the recipe will change the list of meals/meal plans. Asks if it is okay to proceed.</td><td></td></tr>
<tr><td>5.</td><td>a. System deletes the recipe from any meal/menu plan which includes it and then deletes it off the system.</td><td></td></tr>
<tr><td>5.</td><td>b. System does nothing.</td><td></td></tr>
</table>

| | |
|---|---|
| Includes | OFUC0001, OFUC0018 |
| Special Requirements | N/A |
| Assumptions | None |
| Notes | None |

FIG. 25

| | |
|---|---|
| Use Case ID | OFUC0020 |
| Use Case Name | Define a meal for a menu plan |
| Created by | |
| Date Created | 6/7/02 |
| Actor | User |
| Description | User wants to create a meal to add to a meal planner |
| Preconditions | User must be logged in. |
| Post conditions | Meal has been added to a list of meals for the menu planner. |
| Priority | High |
| Frequency of Use | Several times per login |
| Normal Course | 20.0 Define Meal<br><br>*User Responses*<br>2. User opens the "Menu Planner" screen<br>3. User selects the "Add a Meal" Option.<br>2. User selects any or all of the following: main course, vegetables, side dishes, beverage, dessert, or a recipe.<br>3. User enters a name for the meal<br>4. Submits the form.<br><br>*System Responses*<br>4. System displays a choice of recipes user has chosen to add to his/her menu planner, and selections of generic main courses, generic vegetables dishes, generic beverages, generic deserts, and generic side dishes (see notes). |
| Alternate Course | 20.1 Alternate course – N/A |
| Exceptions | 20.E.1 No name given<br><br>*System Responses*<br>4. User did not enter a name for the meal. System prompts the user for a meal name.<br><br>*User Responses*<br>5. User enters missing information.<br>6. <repeat until system finds the item or user is finished> |
| Exceptions | 20. E.2 No items selected to be included in the meal.<br><br>*System Responses*<br>4. User did not enter any items to be defined as a meal. System prompts the user to enter items.<br><br>*User Responses*<br>5. User enters missing information.<br>6. <repeat until system finds the item or user is finished> |
| Includes | OFUC0001 |
| Special Requirements | N/A |
| Assumptions | None |
| Notes and Issues | Generic main course examples: beef, chicken, pork, spaghetti, pizza<br>Generic vegetable courses examples: green beans, broccoli, corn<br>Generic side dish examples: rice, salad, potatoes, bread<br>Generic beverages examples: soda, milk, coffee<br>Generic dessert examples: ice cream, cake, pie, fruit |

FIG. 26

| | |
|---|---|
| Use Case ID | OFUC0021 |
| Use Case Name | Create a meal plan |
| Created by | |
| Date Created | 6/7/02 |
| Actor | User |
| Description | User wants to create a meal planner. Up to 7 days of meals can be planned. |
| Preconditions | User must be logged in, and user has created meals to be added to the menu planner. |
| Postconditions | Meal Planner has been created. |
| Priority | High |
| Frequency of Use | Once per login |
| Normal Course | 21.0 Define Meal Plan<br><br>*User Responses*<br>1. User opens the "Menu Planner" screen<br>2. User selects the "Create a Menu Plan" Option.<br>5. For each area, user may select one of the meals he/she has defined.<br>6. User enters the name for the menu plan.<br>7. User enters the day number (1, 2, 3, etc.) of the meal.<br>8. Submits the form.<br><br>*System Responses*<br>3. System displays a screen divided into areas for breakfast, lunch, dinner and snacks.<br>4. A list of the predefined meals that the user has created is shown available for selection as the meal for that area.<br>9. System enters the day into the meal plan.<br>10. \<Repeat until up to 7 days have been created for this meal plan.\> |
| Alternate Course | 21.1 Alternate course – N/A |
| Exceptions | 21.E.1 No name given<br><br>*System Responses*<br>1. User did not enter a name for the menu plan. System prompts the user for a meal name.<br><br>*User Responses*<br>2. User enters missing information.<br>3. \<repeat until system finds the item or user is finished\> |
| Exceptions | 21. E.2 No items selected to be included in the menu plan.<br><br>*System Responses*<br>1. User did not enter any items to be defined as a meal. System prompts the user to enter items.<br><br>*User Responses*<br>2. User enters missing information.<br>3. \<repeat until system finds the item or user is finished\> |
| Includes | OFUC0001, OFUC0020 |
| Special Requirements | N/A |
| Assumptions | None |
| Notes and Issues | |

FIG. 27

| | |
|---|---|
| Use Case ID | OFUC0022 |
| Use Case Name | Edit/delete a meal |
| Created by | |
| Date Created | 6/7/02 |
| Actor | User |
| Description | User wants to edit/delete a meal. |
| Preconditions | User must be logged in and have previously defined a meal |
| Post conditions | Meal has been updated or deleted in the system. |
| Priority | High |
| Frequency of Use | Once per login |
| Normal Course | 22.0 Edit Meal<br><br>*User Responses*<br>1. User opens the menu planner screen<br>2. User selects the "Edit/Delete Meals" screen<br>4. User selects the meal to edit.<br>5. User makes changes to the meal and submits the changes.<br><br>*System Responses*<br>3. System displays the current list of recipes which the user has created.<br>6. System updates the meal. |
| Alternate Course | 22.1 Alternate course – Delete Meal<br><br>*User Responses*<br>1. User opens the "Edit/Delete Recipe" screen<br>3. User selects the recipe to delete.<br><br>*System Responses*<br>2. System displays the current list of recipes which the user has created.<br>4. System deletes the recipe. |
| Exceptions | 22.E.1 No name given for meal<br><br>*System Responses*<br>1. After editing, a name for the recipe is missing. System prompts the user for a recipe name.<br><br>*User Responses*<br>2. User enters missing information.<br>3. <repeat until system finds the item or user is finished. |
| Exceptions | 22. E.2 Required information missing to define a meal.<br><br>*System Responses*<br>1. After editing, there is not enough required information to define a recipe. System prompts the user to enter items.<br><br>*User Responses*<br>2. User enters missing information.<br>3. <repeat until system finds the item or user is finished> |

FIG. 28

| | |
|---|---|
| Exceptions | 22.E.3 Deleted Meal is included in a meal plan <br> <u>System Responses</u>        <u>User Responses</u> <br> 1. A meal the user wishes to delete is included in a meal plan    4. If User enters indicates yes or no, go to step 5a, otherwise go to Step 5b. <br> 2. System tells the user that the recipe is included in a list of meal plans. <br> 3. Informs user that deleting the recipe will change the list of meal plans. Asks if it is okay to proceed. <br> 5. a. System deletes the recipe from any menu plan that includes it and then deletes it off the system. <br> 5. b. System does nothing. |
| Includes | OFUC0001, OFUC0020 |
| Special Requirements | N/A |
| Assumptions | None |
| Notes | None |

FIG. 28

| | |
|---|---|
| Use Case ID | OFUC0023 |
| Use Case Name | Alert when food is running low. |
| Created by | |
| Date Created | 6/7/02 |
| Actor | User |
| Description | User wants to be alerted that a personal supply of a food item may be running low |
| Preconditions | User must be logged in. |
| Post conditions | Alert has been set up |
| Priority | High |
| Frequency of Use | Occasionally |
| Normal Course | 23.0 Set up Alert<br><br>*User Responses*<br>1. User opens up the Alert screen<br>2. User enters a food item to be reminded to purchase.<br>3. User enters the frequency he/she wishes to be reminded.<br>3. User enters a new email address if they wish to have the alert sent to a different email address.<br>4. Submits the form.<br><br>*System Responses*<br>1. System shows the current email the system has for the user's account and asks them if they want to use this one or a new one to send the alerts.<br>2. System adds the alert into the system.<br>3. System sends an email to the user to purchase more of an item on the frequency the user indicated. |
| Alternate Course | 23.1 Alternate course – N/A |
| Exceptions | 23.E.1 Email address is not valid<br><br>*System Responses*<br>1. Email address is not valid so the user never receives the email.<br><br>*User Responses* |
| Includes | OFUC0001 |
| Special Requirements | N/A |
| Assumptions | None |
| Notes and Issues | N/A |

FIG. 29

| | |
|---|---|
| Use Case ID | OFUC0024 |
| Use Case Name | Disable/modify alert when food is running low. |
| Created by | |
| Date Created | 6/7/02 |
| Actor | User |
| Description | User wants to modify or delete an alert |
| Preconditions | User must be logged in, Alert has been set up |
| Post conditions | Alert has been edited or deleted. |
| Priority | High |
| Frequency of Use | Occasionally |
| Normal Course | 24.0 Edit up Alert<br><br>*User Responses*<br>1. User opens up the Alert screen<br>3. User selects the alert they wish to edit.<br>5. User makes changes to the alert.<br>6. Submits the form.<br><br>*System Responses*<br>2. System shows the current alerts the user has set up.<br>4. System displays the alert information.<br>7. System modifies the alert information. |
| Alternate Course | 24.1 Delete Alert<br><br>*User Responses*<br>1. User opens up the Alert screen<br>3. User selects the alert they wish to delete.<br>4. Submits the form.<br><br>*System Responses*<br>2. System shows the current alerts the user has set up.<br>5. System deletes the alert |
| Exceptions | 24.E.1 None |
| Includes | OFUC0001, OFUC0023 |
| Special Requirements | N/A |
| Assumptions | None |
| Notes and Issues | N/A |

FIG. 30

| | |
|---|---|
| Use Case ID | OFUC0025 |
| Use Case Name | PDA (Personal Digital Assistant) software installation |
| Created by | |
| Date Created | 6/7/02 |
| Actor | User |
| Description | User wants to install the software on his/her PDA and want to interact with the grocery shopping web site web site via off-line functions in their PDA. |
| Preconditions | User must own a PDA running the Palm OS®. |
| Post conditions | User's PDA has the Palm software installed. |
| Priority | Moderate |
| Frequency of Use | Once in the lifetime of the user. |
| Normal Course | 25.0 Download and install software<br><br>*User Actions*<br>4. Open the Download Software screen<br>3. User asks for the download<br>5. User hits the install program set up which<br>7. User synchronizes his/her PDA with his/her computer<br><br>*System Responses*<br>6. System displays a link to the software that the user can click on.<br>4. System sends the user the software.<br>6. System installs a client on the user's computer and puts an installation file on the user's PDA software.<br>8. System installs software on the user's PDA |
| Alternate Course | 25.1 N/A<br>*System Response*  *Actor Response* |
| Exceptions | 25.E.1<br>*Actor Response*  *System Responses* |
| Includes | N/A |
| Special Requirements | N/A |
| Assumptions | User owns a PDA running the Palm OS. |
| Notes and Issues | This use case relates to users who own a PDA and want to interact with the grocery shopping web site web site via off-line functions in their PDA. |

FIG. 31

| | |
|---|---|
| Use Case ID | OFUC0026 |
| Use Case Name | PDA shopping list creation |
| Created by | |
| Date Created | 6/7/02 |
| Actor | Requestor |
| Description | User creates a shopping list on his/her PDA. This list will be uploaded to the web site. |
| Preconditions | User must have installed the grocery shopping web site software on his/her PDA. |
| Post conditions | A shopping list has been prepared which is ready to be uploaded to the organizedfood.com web site. |
| Priority | Moderate |
| Frequency of Use | Once a week per user, maybe more. |
| Normal Course | 26.0 Create Shopping List with predefined items <br><br> *User Actions* <br> 6. Select the organizedfood.com software from the applications list on the user's PDA. <br> 7. User selects the "Create new list" option <br> 4. User selects any of the options except "Enter your items using your own key words". <br> 7. \<repeat with other grocery type options until all desired items have been selected\> <br> 8. User hits the finish button <br> 9. User enters a name for the shopping list <br><br> *System Responses* <br> 7. System displays options of "Enter Fresh Items", "Enter Frozen Items", "Enter Canned Items", "Enter Refrigerated Items", "Enter Bagged/Dried/Boxed" Items", "Enter Pet, and non-Edible Items" and "Enter your items using your own key words". <br> 5. System displays a drop down list of possible grocery items for each categories and a text box to display all of the items that have been selected by the user. <br> 6. Each item selected shows up in the text box. <br> 9. System prompts the user for a name of the shopping list. <br> 11. System saves the shopping list |
| Alternate Course | 26.1 Create Shopping List using his/her own key words <br><br> *User Actions* <br> 1. Select the organizedfood.com software from the applications list on the user's PDA. <br> 2. User selects the "Create new list" option <br> 4. User selects the option of "Enter your items using your own key words". <br> 6. User enters in a comma-delimited list of food items in. <br> 7. \<repeat until all desired items have been entered\> <br> 8. User hits the finish button <br> 10. User enters a name for the shopping list <br><br> *System Responses* <br> 3. System displays a options of "Enter Fresh Items", "Enter Frozen Items", "Enter Canned Items", "Enter Refrigerated Items", "Enter Bagged/Dried/Boxed" Items", "Enter Pet, non-Edible Items" and <br> 5. System displays a text box in which the user can enter food items. <br> 9. System prompts the user for a name of the shopping list. <br> 11. System saves the shopping list |

FIG. 32

| | | |
|---|---|---|
| Exceptions | 26.E.1 None identified | |
| | *Actor Response* | *System Responses* |
| Includes | OFUC0004, OFUC0002, OFUC0025 | |
| Special Requirements | N/A | |
| Assumptions | N/A | |
| Notes and Issues | This use case relates to users who own a PDA and want to interact with the grocery shopping web site web site via off-line functions in their PDA. | |

FIG. 32

| | |
|---|---|
| Use Case ID | OFUC0027 |
| Use Case.Name | PDA shopping list edit/delete |
| Created by | |
| Date Created | 6/7/02 |
| Actor | Requestor |
| Description | User edits/deletes a shopping list on his/her PDA. This list will be uploaded to the web site. |
| Preconditions | User must have installed the grocery shopping web site software on his/her PDA, and must have created a shopping list, or downloaded one to the user's PDA. |
| Post conditions | A shopping list has been edited or deleted which is ready to be synchronized to the user's account. |
| Priority | Moderate |
| Frequency of Use | Once a week per user, maybe more. |
| Normal Course | 27.0 Create Shopping List with predefined items |

27.0 Create Shopping List with predefined items

*User Actions*
1. Select the organizedfood.com software from the applications list on the user's PDA.
2. User selects the "Edit or Delete shopping list" option
4. User selects the shopping list he/she wishes to edit.
6. User selects any of the options except "Enter your items using your own key words".
8. User selects any of the items in the drop down list
10. <repeat with other grocery type options until all desired items have been selected>
11. User hits the finish button

*System Responses*
3. System displays a list of shopping lists.
5. System displays list of items for the shopping list and gives the user the options to add to the lists:
   - "Enter Fresh Items"
   - "Enter Frozen Items"
   - "Enter Canned Items"
   - "Enter Refrigerated Items" "Enter Bagged/Dried/Boxed" Items"
   - "Enter Pet, non-Edible Items"
   - "Enter your items using your own key words".
7. System displays a drop down list of possible grocery items for each categories and a text box to display all of the items that have been selected by the user.
9. Each item selected shows up in the text box.
12. System saves the shopping list

FIG. 33

| | | |
|---|---|---|
| Alternate Course | 27.2 Create Shopping List using his/her own key words | |
| | *User Actions* | *System Responses* |
| | 1. Select the organizedfood.com software from the applications list on the user's PDA.<br>2. User selects the "Edit/Delete shopping lists" option<br>4. User selects the shopping list he/she wishes to edit.<br>6. User selects the option of "Enter your items using your own key words".<br>8. User adds to or subtracts from the comma-delimited list of items.<br>9. <repeat until all desired items have been entered/or deleted><br>10. User hits the finish button | 3. System displays a list of shopping lists.<br>5. System displays list of items for the shopping list and gives the user the options to add to the lists:<br>• "Enter Fresh Items"<br>• "Enter Frozen Items"<br>• "Enter Canned Items"<br>• "Enter Refrigerated Items" "Enter Bagged/Dried/Boxed" Items"<br>• "Enter Pet, non-Edible Items"<br>• "Enter your items using your own key words".<br>7. System displays a text box in which previously selected items show up as a comma delimited list.<br>11. System saves the shopping list |
| Alternate Course | 27.3 Delete Shopping List | |
| | *User Actions* | *System Responses* |
| | 1. Select the organizedfood.com software from the applications list on the user's PDA.<br>2. User selects the "Edit/Delete shopping lists" option<br>4. User selects the shopping list he/she wishes to delete.<br>6. User selects the option of "Delete". | 3. System displays a list of shopping lists.<br>5. System displays list of items for the shopping list and displays a delete option<br>7. System deletes the shopping list |
| Exceptions | 27.E.1 None identified | |
| | *Actor Response* | *System Responses* |
| Includes | OFUC0025, OFUC0026 | |
| Special Requirements | N/A | |
| Assumptions | N/A | |
| Notes and Issues | This use case relates to users who own a PDA and want to interact with the grocery shopping web site web site via off-line functions in their PDA. | |

FIG. 33

| | |
|---|---|
| Use Case ID | OFUC0028 |
| Use Case Name | PDA shopping list upload to user account |
| Created by | |
| Date Created | 6/7/02 |
| Actor | User |
| Description | User uploads current shopping lists to his/her account |
| Preconditions | User must have a PDA, have installed the OrganizedFood software on his/her PDA, and have a user account on the web site, must have created a shopping list on his/her PDA. |
| Post conditions | User's PDA generated shopping lists have been uploaded to the grocery shopping web site. |
| Priority | Moderate |
| Frequency of Use | Several times per month |
| Normal Course | 28.0 User uploads shopping lists to web site<br><br>*User Responses*<br>7. User synchronizes his/her PDA with his/her computer. (This is done via whatever method is required by the PDA.)<br>3. User logs on to the OrganizedFood site.<br>4. User navigates to the shopping list screen.<br>5. User selects the "upload shopping list" option.<br>7. User selects the file that the system has created when the user synchronized his/her PDA with the computer and selects "upload".<br><br>*System Responses*<br>2. System creates a file on the user's computer.<br>6. System displays an option to browse the user's computer for the file to upload.<br>8. File is uploaded; shopping lists are created in the user's account. |
| Alternate Course | 28.1 N/A<br>*System Response*      *Actor Response* |
| Exceptions | 28.E.1 None identified<br>*System Response*      *Actor Response* |
| Includes | OFUC0025, OFUC0026, OFUC0027 |
| Special Requirements | N/A |
| Assumptions | N/A |
| Notes and Issues | This use case relates to users who own a PDA and want to interact with the grocery shopping web site web site via off-line functions in their PDA. |

FIG. 34

↑ Home

△ Edit Your Stores

Grocery Shark™

Shop | My Shark | Diets | Savings | Recipes

Login or Register

Grocery Shark Requires you to Login to Access the Advanced Features of the Site. Please Login Below.

Username: [    ]

Password: [    ]

[Login]

Forgot your Username or Password?

Not a registered GroceryShark User? Registration is quick and easy! Register Now!

[Register]

Why Register?

Registering with Grocery Shark Allows you to Access Advanced Functionality Including:

▸ The Ability to Shop from Saved Shopping Lists
▸ Easy Price Comparison Shopping from Your Favorite Stores
▸ Create, Manage, and Shop from Recipes
▸ Find Recipes, Products, and Specials that Meet Your Dietary Needs!
▸ Manage your own Menu and Meal Planners, or, Use Our Suggested Menu and Meal Plans!

---

Testimonial
..   . .. ... . .

Dear Grocery Shark:

I'm a busy Mom, and I shop for a family of four and my kids at college. With Grocery Shark, it's easy for me to keep track of all of the items I need, and, I get the best price! Thank You Grocery Shark!

*Image*

Janice,
Los Angeles, California

FIG. 36

Registration - General Information

| | |
|---:|:---|
| First Name: | Cstevi |
| Last Name: | Owens |
| Address: | 5901 E Sanna |
| Apartment/Suite: | |
| City: | Paradise Valley |
| State: | AZ |
| Zipcode: | 85253 |
| Phone Number: | 4805551000 |
| Email Address: | cstevi@home.net |
| | |
| Age Range: | 20 - 30 |
| Gender: | ⦿ Female  ○ Male |
| Household Count: | 2 |
| Do You Shop at Multiple Stores: | ⦿ Yes  ○ No |
| At Which Stores Do You Shop? | Select the Stores You Shop / Albertsons / AJ's Fine Foods / Bashas |
| How Often Do You Grocery Shop? | Weekly |
| | |
| User Name: | cstevi |
| Password: | ●●●●●●●● |
| Confirm Password: | ●●●●●●●● |
| Usage Agreement: | By checking the "I Accept the Usage Agreement" checkbox below and pressing the 'Continue' button at the bottom of this screen you acknowledge |

☑ I Accept the Usage Agreement

[ Continue ]

Featured Stores!

*Logo*

▸ Shop Online with Basha's and Grocery Shark!

*Logo*

▸ NEW: Shop AJ's at GroceryShark!

*Logo*

▸ Shop With Grocery Shark, and Safeway Will Deliver!

FIG. 37

Registration - Select Your Stores

Store Search Results [View Your Stores]

Featured Stores!

Stores Close to Your Location are Listed Below. To Find More Stores to Choose From, or Stores in a Different Area, Try an Advanced Store Search.

GroceryShark Stores in Your Area

| Store | Location | Distance | Add |
|---|---|---|---|
| A | Albertsons #21 - 10665 N Tatum Blvd (Tatum & Shea) | 1.7 mi | ☑ |
| ($) | Safeway #231 - 10773 N Scottsdale Rd (Scottsdale & Shea) | 1.8 mi | ☑ |
| A | Albertsons #22 - 6965 N Hayden Rd (Hayden & Indian Bend) | 3.3 mi | ☑ |
| ($) | Safeway #232 - 4857 E Greenway Rd (Greenway & Tatum) | 4.4 mi | ☐ |
| A | Albertsons #23 - 4747 E Greenway Rd (Greenway & Tatum) | 4.2 mi | ☐ |
| ($) | Safeway #233 - 3131 E Thunderbird Rd (Thunderbird & 32nd Street) | 4.5 mi | ☐ |
| ($) | Safeway #234 - 7920 E Chaparral Rd (Chaparral & Hayden) | 4.8 mi | ☐ |
| A | Albertsons #24 - 15100 N 90th St (Frank Lloyd Wright & Pima) | 5.3 mi | ☐ |
| ($) | Safeway #242 - 4750 E Indian School Rd (Indian School Road & 48th Street) | 5.3 mi | ☐ |
| ($) | Safeway #246 - 3132 E Camelback Rd (Camelback & 32nd Street) | 5.3 mi | ☐ |

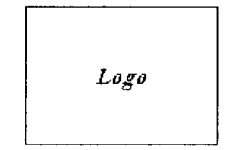

▶ Shop Online with Basha's and Grocery Shark!

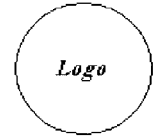

▶ NEW: Shop AJ's at GroceryShark!

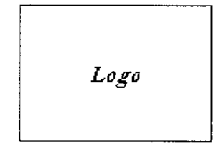

▶ Shop With Grocery Shark, and Safeway Will Deliver!

Add Checked Stores

Not finding the stores you want to shop at? Try an Advanced Store Search.

Your Current Store Selection

You currently have no stores in your Grocery Shark Profile. You can select stores from the list above titled "Store Search Results ", or, you can perform an Advanced Search to find additional stores to choose from. To replace a store, delete it, and add new stores.

Your Stores

| Store | Preferred Location | Distance | Delete |
|---|---|---|---|

Delete Checked Stores

Registration - Select Your Stores

⬇ 3 Stores Were Added to Your Profile

Store Search Results [View Your Stores]

Stores Close to Your Location are Listed Below. To Find More Stores to Choose From, or Stores in a Different Area, Try an Advanced Store Search.

GroceryShark Stores in Your Area

| Store | Location | Distance | Add |
|---|---|---|---|
| (S) | Safeway #232 - 4857 E Greenway Rd (Greenway & Tatum) | 4.4 mi | ☐ |
| A | Albertsons #23 - 4747 E Greenway Rd (Greenway & Tatum) | 4.2 mi | ☐ |
| (S) | Safeway #233 - 3131 E Thunderbird Rd (Thunderbird & 32nd Street) | 4.5 mi | ☐ |
| (S) | Safeway #234 - 7920 E Chaparral Rd (Chaparral & Hayden) | 4.8 mi | ☐ |
| A | Albertsons #24 - 15100 N 90th St (Frank Lloyd Wright & Pima) | 5.3 mi | ☐ |
| (S) | Safeway #242 - 4750 E Indian School Rd (Indian School Road & 48th Street) | 5.3 mi | ☐ |
| (S) | Safeway #246 - 3132 E Camelback Rd (Camelback & 32nd Street) | 5.3 mi | ☐ |

[Add Checked Stores]

Not finding the stores you want to shop at? Try an Advanced Store Search.

Your Current Store Selection

You currently have 3 stores in your Grocery Shark Profile. You can select additional stores from the list above titled "Store Search Results", or, you can perform an Advanced Search to find additional stores to choose from. To replace a store, delete it, and add new stores.

Your Stores

| Store | Preferred | Location | Distance | Delete |
|---|---|---|---|---|
| A | ☑ | Albertsons #21 - 10665 N Tatum Blvd (Tatum & Shea) | 1.7 mi | ☐ |
| (S) | ☑ | Safeway #231 - 10773 N Scottsdale Rd (Scottsdale & Shea) | 1.8 mi | ☐ |
| A | ☑ | Albertsons #22 - 6965 N Hayden Rd (Hayden & Indian Bend) | 3.3 mi | ☐ |

[Delete Checked Stores]

[Continue]

Featured Stores!

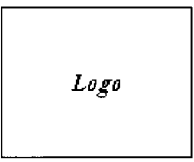

Logo

▶ Shop Online with Basha's and Grocery Shark!

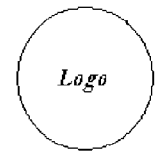

Logo

▶ NEW: Shop AJ's at GroceryShark!

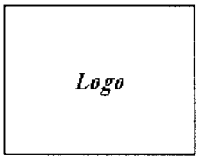

Logo

▶ Shop With Grocery Shark, and Safeway Will Deliver!

FIG. 39

Safeway #231
(Scottsdale & Shea)
10773 N Scottsdale Rd
Scottsdale, AZ 85254
480.948.6446
View Map

General Information

| Location | Hours of Operation |
|---|---|
| Safeway #231 | Monday - Friday: 24 Hours |
| 10773 N Scottsdale Rd | Saturday: 24 Hours |
| Scottsdale, AZ 85254-5264 | Sunday: 24 Hours |

Department Telephone Directory

| | |
|---|---|
| Bakery | Pharmacy |
| 480.948.6446 x 120 | 480.948.6446 x 133 |
| Deli/Catering | Produce |
| 480.948.6446 x 122 | 480.948.6446 x 126 |
| Floral | |
| 480.948.6446 x 124 | |

Meet Pete Green, Manager, Safeway #231

Hello, I'd like to thank you personally for considering Safewway #2. Since 1912 Safeway has been providing the best customer service of any grocery store nationwide. Here at Safeway #231, we've been in operation since 1927, and committment to customer service is our number one priority. Whether you come to our store, or purchase via the Internet for delivery, you can count on the team at Safeway #2 to deliver quality and great prices.
If you have any questions about Safeway, or Safeway #231 in particular, contact us at managers@safeway.com.

Store Spotlight - Safeway #231 and Habitat for Humanity

For the fourth consecutive year, employees of Safeway #231 have participated in Habitat for Humanity's homebuilding project. For the past year, 7 employees dedicated time to helping disadvantaged local families by providing them with quality housing. For more information on Safeway and community projects, check the Safeway Corporate website.

FIG. 40 - A

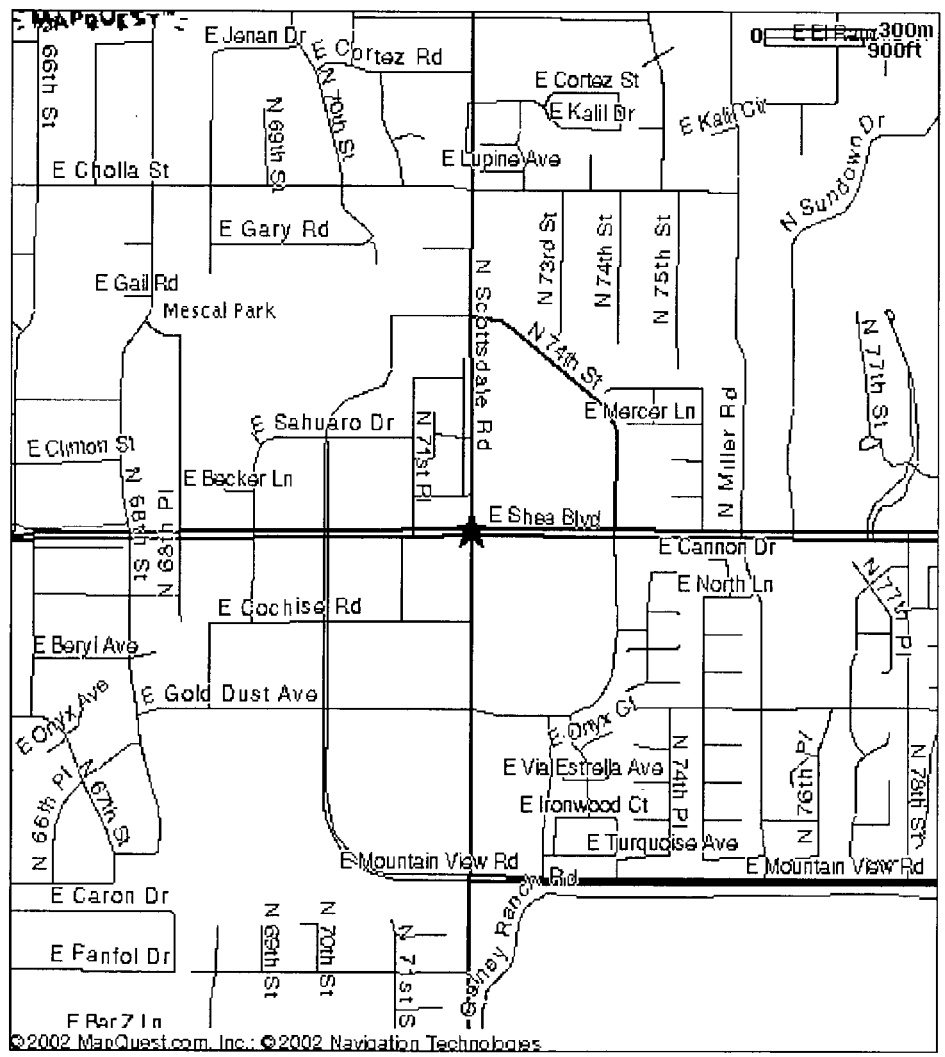
FIG. 40 - B

Advanced Store Selection

Find: All Stores / Albertsons / AJ's Fine Foods / Bashas

Within: 2 - 5 Miles of this Address/Intersection: 5901 E Sanna

City: Paradise Valley

State: AZ

Zip Code: 85253

[Find Stores]

Featured Stores!

*Logo*

▶ Shop Online with Basha's and Grocery Shark!

*Logo*

▶ NEW: Shop AJ's at GroceryShark!

*Logo*

▶ Shop With Grocery Shark, and Safeway Will Deliver!

FIG. 41

Registration - Select Your Stores

Store Search Results [View Your Stores]

Stores Close to Your Location are Listed Below. To Find More Stores to Choose From, or Stores in a Different Area, Try an Advanced Store Search.

GroceryShark Stores in Your Area

| Store | Location | Distance | Add |
|---|---|---|---|
| ℬ | Bashas #15 - 10631 N 32nd St (Shea & 32nd Street) | 3.5 mi | ☑ |
| ℬ | Bashas #23 - 3901 E Thunderbird Rd (Thunderbird & 40th Street) | 3.9 mi | ☐ |
| ℬ | Bashas #19 - 8423 E Mcdonald Dr (McDonald & 83rd Place) | 4.4 mi | ☐ |

Add Checked Stores

Not finding the stores you want to shop at? Try an Advanced Store Search.

Your Current Store Selection

You currently have 3 stores in your Grocery Shark Profile. You can select additional stores from the list above titled "Store Search Results ", or, you can perform an Advanced Search to find additional stores to choose from. To replace a store, delete it, and add new stores.

Your Stores

| Store | Preferred | Location | Distance | Delete |
|---|---|---|---|---|
| 🄰 | ☑ | Albertsons #21 - 10665 N Tatum Blvd (Tatum & Shea) | 1.7 mi | ☐ |
| (S) | ☑ | Safeway #231 - 10773 N Scottsdale Rd (Scottsdale & Shea) | 1.8 mi | ☐ |
| 🄰 | ☑ | Albertsons #22 - 6965 N Hayden Rd (Hayden & Indian Bend) | 3.3 mi | ☐ |

Delete Checked Stores

Continue

Featured Stores!

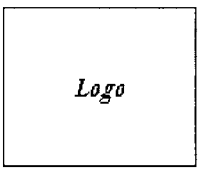

▸ Shop Online with Basha's and Grocery Shark!

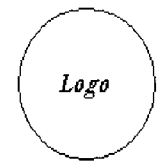

▸ NEW: Shop AJ's at GroceryShark!

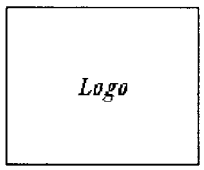

▸ Shop With Grocery Shark, and Safeway Will Deliver!

FIG. 42

Registration - Select Your Stores

⬇ 1 Store Was Added to Your Profile

Store Search Results [View Your Stores]

Featured Stores!

Stores Close to Your Location are Listed Below. To Find More Stores to Choose From, or Stores in a Different Area, Try an Advanced Store Search.

GroceryShark Stores in Your Area

| Store | Location | Distance | Add |
|---|---|---|---|
| ß | Bashas #23 - 3901 E Thunderbird Rd (Thunderbird & 40th Street) | 3.9 mi | ☐ |
| ß | Bashas #19 - 8423 E Mcdonald Dr (McDonald & 83rd Place) | 4.4 mi | ☐ |

Add Checked Stores

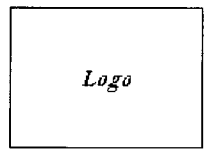

*Logo*

▸ Shop Online with Basha's and Grocery Shark!

Not finding the stores you want to shop at? Try an Advanced Store Search.

Your Current Store Selection

You currently have 3 stores in your Grocery Shark Profile. You can select additional stores from the list above titled "Store Search Results ", or, you can perform an Advanced Search to find additional stores to choose from. To replace a store, delete it, and add new stores.

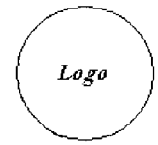

*Logo*

▸ NEW: Shop AJ's at GroceryShark!

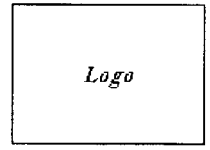

*Logo*

▸ Shop With Grocery Shark, and Safeway Will Deliver!

Your Stores

| Store | Preferred | Location | Distance | Delete |
|---|---|---|---|---|
| A | ☑ | Albertsons #21 - 10665 N Tatum Blvd (Tatum & Shea) | 1.7 mi | ☐ |
| (S) | ☑ | Safeway #231 - 10773 N Scottsdale Rd (Scottsdale & Shea) | 1.8 mi | ☐ |
| A | ☑ | Albertsons #22 - 6965 N Hayden Rd (Hayden & Indian Bend) | 3.3 mi | ☐ |
| ß | ☐ | Bashas #15 - 10631 N 32nd St (Shea & 32nd Street) | 3.5 mi | ☐ |

Delete Checked Stores

MyDiets

Learn How Diets Can be Utilized with Your Grocery Shark Profile to Enhance Your Shopping Experience.

- ☐ Low Fat
- ☐ Low Sodium
- ☐ Diabetic
- ☐ Islamic
- ☐ Kosher
- ☐ Atkins
- ☐ Jenny Craig
- ☐ Nutrisystems
- ☐ Weight Watchers

Continue

Recommended Diets

*Logo*

▸ Check Out the Atkins Approach

*Logo*

▸ NEW: Sugar Busters

FIG. 44

 Low Fat Diet
The logic of these diets is that since fat contains more calories than carbohydrates or protein, limiting the fat in our diet is a simple way to promote weight loss.

Keyword Search

About the Low Fat Diet

▸ The Plan
All types of added fats, such as butter, margarine, mayonnaise, sour cream and salad dressings, are reduced or eliminated. Foods high in fat, such as fried foods, snack foods, cheeses and meats, should be replaced with lower-fat versions or eaten in smaller portions.

▸ Upside
A high-fat diet has been associated not only with obesity but also with heart disease and some types of cancer. The plan encourages the use of foods naturally low in fat, such as fruits and vegetables, which also contain healthy amounts of essential nutrients.

▸ Downside
There has been an explosion of foods that are reduced in fat yet contain lots of sugar: snack bars, cookies, cakes, candies, ice cream and so on. Those foods do not promote a healthy diet, even if they are low in fat.

▸ Duration
Indefinite

▸ Checklist
Restaurants: Yes
Alcohol: Varies
Caffeine: Varies
Need to Buy Special Foods: Yes; focus is on foods that are fat-free or reduced in fat
Okay for Vegetarians: Yes You Profile Currently Indicates That You Are NOT a Subscriber to this Diet. Learn How Diets Can be Utilized with Your Grocery Shark Profile to Enhance Your Shopping Experience.

Add the Low Fat Diet to my Profile

Resources

▸ Find Out What Others Are Saying in the Grocery Shark Diet Community
▸ Internet Links with additional information about Low Fat Diets

Stores & Specials

*Logo*

▸ Get Your Free Sample!

*Logo*

▸ NEW: Shop AJ's at GroceryShark!

*Logo*

▸ Shop Purity Supreme's Brand

FIG. 45

MyDiets
🗋 The Low Fat Diet Was Added to Your Profile
Learn How Diets Can be Utilized with Your Grocery Shark Profile to Enhance Your Shopping Experience.
| ☑ Low Fat | ☐ Islamic | ☐ Jenny Craig |
| ☐ Low Sodium | ☐ Kosher | ☐ Nutrisystems |
| ☐ Diabetic | ☐ Atkins | ☐ Weight Watchers |
[Continue]
Recommended Diets
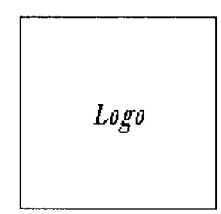
▸ Check Out the Atkins Approach
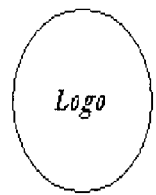
▸ NEW: Sugar Busters
FIG. 46

Your Registration is Complete Cstevi!

Cstevi, What Would You Like to do Today?

Testimonial

- Create a Shopping List for Price Comparison Shopping
- Find Nutritional Information on a Product
- Take our "How to Shop" Shopping Tutorial

Dear Grocery Shark:

Shopping has never been easier! With Grocery Shark, I shop multiple stores without even leaving the house. It's like walking down the aisles of three stores at once! Thank You Grocery Shark!

- Customize Your Experience by Specifying Your Dietary Needs
- Expand Your Reach by Adding or Updating your Stores Profile
- Create a Menu Planner to Organize Your Needs

- Find a Diet that Fits Your Lifestyle
- Discuss Diet Information in our Community
- Learn How Diets Work with Your Profile in Our Diets Tutorial

*Image*

Cathy,
Memphis, TN

- Apply for Savings Cards at Stores Nationwide
- Find Manufacturer Coupons for your Favorite Products
- Maximize Your Savings: Check Out Our Savings Tutorial

- Search Our Recipe Database for Great Meal Ideas
- Store Your Recipes for Easy Shopping
- Read the Recipes and Grocery Shark Tutorial for Easy

In-Store Specials

Savings Category: [All Categories ▼]
Keyword: [         ]

Stores: 
- Albertson's #21 - Tatum & Shea
- Albertson's #22 - Hayden & Indian Bend
- Basha's #15 - Shea & 32nd Street
- Safeway #231 - Scottsdale & Shea

[Find In-Store Savings]

Keyword Search
[     ] [Go]

Stores & Specials

*Logo*

▸ 20% off All Kraft Items!

*Logo*

▸ Save 10% on all Nabisco Products

FIG. 50

In-Store Specials Search Results
To Add Products to Your Shopping Cart, Check the Products You Would Like to Add to Your Cart, Enter a Quantity, and Click the "Add Checked Items to Cart" Button.

Keyword Search [    ] [Go]

In-Store Special Search Results

| Store / Crossroads | Special | Expires | Price | | Qty |
|---|---|---|---|---|---|
| Bashas #15 (Shea & 32nd Street) | Bananas - 3lb for $1.00! | 6/15/2002 | $1.00 You Save! $.33/lb | | ☐ |
| Basha's #15 (Shea & 32nd Street) | Energizer AA Batteries 4 Pack - Buy 1 Get 1 Free! | 6/20/2002 | $2.65 You Save! $.066/ea | | ☐ |

Sort by [Store Location ▼]

[Add Checked Items to Cart]

[New Savings Search]

FIG. 51

Manufacturer Coupon Search

Brand: Kraft

Savings Category: Dairy & Beverage

Keyword:

Find Manufacturer Coupons

Keyword Search [Go]

Stores & Specials

*Product Image*

▸ Save on Old El Paso Products!

*Product Image*

▸ Save 10% on all Nabisco Products

FIG. 52

Manufacturer Coupon Search Results

Keyword Search
[     ] Go

Manufacture Coupon Search Results: Kraft

| Coupon | Select |
|---|---|
| Kraft - Shredded Cheddar Cheese Sharp - 8oz - $1.00 Off! | ☐ |
| Kraft - Macaroni and Cheese - Buy 2 Get 1 Free! | ☐ |
| Kraft - American Cheese Singles - Save .49! | ☐ |

[Back]

Add Checked to Todays Shopping List

Stores & Specials

*Product Image*

▸ 15% off Selected Sargento Products!

*Product Image*

▸ Tillamook Savings!

FIG. 53

Build Your Shopping List

Keyword Search [    ] Go

You have no items in your Today's Shopping List

| Bakery & Sweet Shop | ▶ | | |
|---|---|---|---|
| Dairy & Beverage | ▶ | Butter_Margarine | ▶ |
| Delicatessan & Specialty Foods | ▶ | Cheese | |
| | | Cottage Cheese_Cream Cheese | |
| Floral & News Stand | ▶ | | |
| Health & Beauty | ▶ | Cream_Creamers | |
| Produce | ▶ | Eggs | ▶ |
| Meat & Seafood | ▶ | Juice | ▶ Apple Juice_Cider |
| Dry Goods & Staples | ▶ | Ice Cream | ▶ Berry Juice |
| Home Maintenance & Supplies | ▶ | Milk | ▶ Cranberry Juice |
| | | Puddings_Gelatins | |
| Infant & Child Care | ▶ | Lactose-free Beverages | Frozen Juice |
| General Store | ▶ | Yogurt | Fruit Punch |
| | | Coffee_Tea | ▶ Gourmet Juice |
| | | Soda Pop_Ice Teas | Grape Juice |
| | | Water_Sports Drinks | Grapefruit Juice |
| | | | Juice Concentrate |
| | | | Lemon_Lime Juice |

Stores & Specials
..........

*Product Image*

▶ Coke 16.9 oz 6 Packs

*Product Image*

▶ NEW: Fritos Chilli-Cheese Flavor

*Product Image*

▶ Skippy 28oz Creamy Peanut Butter

View Today's Shopping List and Cart

FIG. 56 - A

Build Your Shopping List

🔔 You Just Added Bounce Dryer Sheets (160 ct) to Today's Shopping List

| | |
|---|---|
| Bakery & Sweet Shop | ▶ |
| Dairy & Beverage | ▶ |
| Delicatessan & Specialty Foods | ▶ |
| Floral & News Stand | ▶ |
| Health & Beauty | ▶ |
| Produce | ▶ |
| Meat & Seafood | ▶ |
| Dry Goods & Staples | ▶ |
| Home Maintenance & Supplies | ▶ |
| Infant & Child Care | ▶ |
| General Store | ▶ |

View Today's Shopping List and Cart

Keyword Search [ ] Go

Stores & Specials

*Product Image*

▶ Rubbermaid Mop

*Product Image*

▶ NEW: Bounce Large Size 160 Sheets

*Product Image*

▶ Clorox Bleach 1 Gallon

FIG. 56 - B

Today's Shopping List and Cart

☑ Apply Dietary Filters When Finding Products

Keyword Search
[        ] [Go]

Todays Shopping List

☑ 📋 Items on Todays List (8 Items)

| | |
|---|---|
| Home Maintenance & Supplies > Pet Food & supplies > Canned Cat Food | ☐ |
| Dry Goods And Staples > Flour & cornmeal > Unbleached Flour | ☐ |
| Produce > Fresh fruits > Apples | ☐ |
| Home Maintenance & Supplies > Laundry > Powdered Detergent | ☐ |
| Home Maintenance & Supplies > Laundry > Dryer Sheets<br>  - Bounce Dryer Sheets Outdoor Fresh(160 ct) | ☐ |
| Dairy & Beverage > Butter & Margarine > Butter | ☐ |
| Dry Goods And Staples > Sugar > Unprocessed Sugar | ☐ |
| Dry Goods And Staples > Baking > Safflower Oil | ☐ |

[ Delete Checked From List ]

[ Add Additional Products ]    [ SharkShop For Checked Items ]

Your Shopping Cart - Has No Products

☑ 🛒 Items in Your Shopping Cart (None)

Total:    0    $ 0.00
Savings:       $ 0.00

Sort This Store's Shopping List By: [Product Category ▼]

[ Delete Checked From Cart ]    [ Update Cart Quantities ]

[ Checkout ]

FIG. 57

Search Results
To Add Products to Your Shopping Cart, Check the Products You Would Like to Add to Your Cart, Enter a Quantity, and Click the "Add Checked Items to Cart" Button.

Keyword Search [____] [Go]

🛒 Shopping For Canned Cat Food                                25 Results | Page: 1 2 3

| Product | Size | 🔺 | ($) | 🔺 |
|---|---|---|---|---|
| 9 Lives Cat Food Canned Bite Size Sliced Beef in Gravy 4 Pack | 5.5 oz | $1.49 You Save! $.068/oz  Qty [2] [✓] | $1.39 $.064/oz  Qty [ ] [ ] | $1.49 You Save! $.068/oz  Qty [ ] [ ] |
| 9 Lives Cat Food Canned Chicken and Tuna Dinner 4 Pack | 5.5 oz | $1.49 You Save! $.068/oz  Qty [ ] [ ] | $1.39 $.064/oz  Qty [ ] [ ] | $1.49 You Save! $.068/oz  Qty [ ] [ ] |
| 9 Lives Cat Food Canned Chicken Dinner 4 Pack | 5.5 oz | $1.39 $.064/oz  Qty [2] [✓] | $1.39 $.064/oz  Qty [ ] [ ] | $1.39 $.064/oz  Qty [ ] [ ] |
| 9 Lives Cat Food Canned Chicken Lamb and Rice Dinner 4 Pack | 5.5 oz | $1.59 $..074/oz  Qty [ ] [ ] | $1.58 You Save! $.073/oz  Qty [ ] [ ] | $1.59 $.074/oz  Qty [ ] [ ] |
| 9 Lives Cat Food Canned Liver N Bacon 4 Pack | 5.5 oz | $1.29 $.058/oz  Qty [ ] [ ] | $1.39 $.064/oz  Qty [ ] [ ] | $1.29 $.058/oz  Qty [ ] [ ] |
| 9 Lives Cat Food Canned Ocean Whitefish 4 Pack | 5.5 oz | $1.39 $.068/oz  Qty [ ] [ ] | $1.39 $.068/oz  Qty [ ] [ ] | $1.39 $.068/oz  Qty [ ] [ ] |
| 9 Lives Cat Food Canned Ocean Whitefish Shredded 4 Pack | 5.5 oz | $1.39 $.068/oz  Qty [ ] [ ] | $1.39 You Save! $.068/oz  Qty [ ] [ ] | $1.39 $.068/oz  Qty [ ] [ ] |
| 9 Lives Cat Food Canned Super Supper 4 Pack | 5.5 oz | $1.39 $.068/oz  Qty [ ] [ ] | $1.29 $.064/oz  Qty [ ] [ ] | $1.39 $.068/oz  Qty [ ] [ ] |
| 9 Lives Cat Food Canned Tuna and Shrimp 4 Pack | 5.5 oz | $1.39 You Save! $.068/oz  Qty [ ] [ ] | $1.36 $.066/oz  Qty [ ] [ ] | $1.39 You Save! $.068/oz  Qty [ ] [ ] |
| 9 Lives Cat Food Canned Tuna Select with Cheese 4 Pack | 5.5 oz | $1.39 $..068/oz  Qty [ ] [ ] | $1.39 $.068/oz  Qty [ ] [ ] | $1.39 $.068/oz  Qty [ ] [ ] |

Sort by [Product Name ▼]                                         25 Results | Page: 1 2 3

[ Add Checked Products to Cart ]

Not finding what you're looking for? Try an <u>Advanced Search</u>.

FIG. 58

Today's Shopping List and Cart
☑ Apply Dietary Filters When Finding Products Keyword Search
[      ] [Go]

Todays Shopping List

⬇ You Just Added 1 Product to Your Shopping Cart

☑ ✓ Items on Todays List (4 Items)

| | |
|---|---|
| Dairy & Beverage > Butter & Margarine > Butter | ☐ |
| Dry Goods And Staples > Sugar > Unprocessed Sugar | ☐ |
| Dry Goods And Staples > Baking > Safflower Oil | ☐ |

[ Delete Checked From List ]

[ Add Additional Products ]   [ SharkShop For Checked Items ]

Your Shopping Cart - Has 7 Products

☑ 🛒 Items in Your Shopping Cart (7)

| | | | | | |
|---|---|---|---|---|---|
| ⚠ | 9 Lives Cat Food Canned Bite Size Sliced Beef in Gravy 4 Pack<br>View Other: Pet Food & supplies > Canned Cat Food Products | 5.5 oz<br>$.068/oz | $ 1.49 | [2] | $ 3.98 ☐ |
| ⚠ | 9 Lives Cat Food Canned Chicken Dinner 4 Pack<br>View Other: Pet Food & supplies > Canned Cat Food Products | 5.5 oz<br>$.068/oz | $ 1.49 | [2] | $ 3.98 ☐ |
| ⚠ | Gold Medal Flour Unbleached All-Purpose<br>View Other: Flour & cornmeal > Unbleached Flour Products | 10 lbs<br>$.020/oz | $ 3.18 | [1] | $ 3.18 ☐ |
| ⚠ | Apples Red Delicious 3 lb Bag<br>View Other: Fresh fruits > Apples Products | 3 lbs<br>$1.00/lb | $ 2.99 | [1] | $ 2.99 ☐ |
| ($) | Arm & Hammer Laundry Detergent Clean Mountain 40 Load<br>View Other: Laundry > Powdered Detergent Products | 7.23 lbs<br>$.030/oz | $ 3.50 | [1] | $ 3.50 ☐ |
| ($) | Bounce Fabric Softener Sheets Outdoor Fresh Scent 160 Ct<br>View Other: Laundry > Dryer Sheets Products | 160 ct<br>$.050/ea | $ 7.99 | [1] | $ 7.99 ☐ |

Total:   8   $ 25.62
Savings:       $ 4.85

Sort This Store's Shopping List By: [ Product Category ▼ ]

[ Delete Checked From Cart ]   [ Update Cart Quantities ]

[ Checkout ]

FIG. 59

Shop Summary

Keyword Search [ ] [Go]

Todays Shopping List - 3 Items

☑ 📋 Items Remaining on Todays Shopping List (3 Items)

| | |
|---|---|
| Dairy & Beverage > Butter & Margarine > Butter | ☐ |
| Dry Goods And Staples > Sugar > Unprocessed Sugar | ☐ |
| Dry Goods And Staples > Baking > Safflower Oil | ☐ |

<u>Albertsons #21</u> Shopping Cart - 6 Products - 14.13 - You Save $ 2.77!

☑ 🛒 Shopping Cart for Albertsons #21 (Tatum & Shea)

Canned Cat Food

| | | | | | |
|---|---|---|---|---|---|
| 9 Lives Cat Food Canned Bite Size Sliced Beef in Gravy 4 Pack | 5.5 oz $.068/oz | $ 1.49 | 2 | $ 3.98 | ☐ |
| 9 Lives Cat Food Canned Chicken Dinner 4 Pack | 5.5 oz $.068/oz | $ 1.49 | 2 | $ 3.98 | ☐ |

Unbleached Flour

| | | | | | |
|---|---|---|---|---|---|
| Gold Medal Flour Unbleached All-Purpose | 10 lbs $.020/oz | $ 3.18 | 1 | $ 3.18 | ☐ |

Apples

| | | | | | |
|---|---|---|---|---|---|
| Apples Red Delicious 3 lb Bag | 3 lbs $1.00/lb | $ 2.99 | 1 | $ 2.99 | ☐ |
| | | Savings: | | $ 2.77 | |
| | | Total: | 6 | $ 14.13 | |

Sort This Store's Shopping List By: [Product Category ▼]

[ Print Shopping List for this Store ] [ Print Coupons for this Store ] [ Purchase Checked ]

FIG. 60

Shop Summary                                          Keyword Search
⬇ Your Pantry Has Been Updated                        [          ] [Go]

Todays Shopping List - 3 Items

☑ ✍ Items Remaining on Todays Shopping List (3 Items)

Dairy & Beverage > Butter & Margarine > Butter                          ☐
Dry Goods And Staples > Sugar > Unprocessed Sugar                       ☐
Dry Goods And Staples > Baking > Safflower Oil                          ☐

Albertsons #21 Shopping Cart - 6 Products - 14.13 - You Save $ 1.47!

☑ 🛒 Shopping Cart for Albertsons #21 (Tatum & Shea)

Canned Cat Food

| | | | | | |
|---|---|---|---|---|---|
| 9 Lives Cat Food Canned Bite Size Sliced Beef in Gravy 4 Pack | 5.5 oz $.068/oz | $ 1.49 | 2 | $ 3.98 | ☐ |
| 9 Lives Cat Food Canned Chicken Dinner 4 Pack | 5.5 oz $.068/oz | $ 1.49 | 2 | $ 3.98 | ☐ |

Unbleached Flour

| | | | | | |
|---|---|---|---|---|---|
| Gold Medal Flour Unbleached All-Purpose | 10 lbs $.020/oz | $ 3.18 | 1 | $ 3.18 | ☐ |

Apples

| | | | | | |
|---|---|---|---|---|---|
| Apples Red Delicious 3 lb Bag | 3 lbs $1.00/lb | $ 2.99 | 1 | $ 2.99 | ☐ |
| | | Savings: | | $ 1.47 | |
| | | Total: | 6 | $ 14.13 | |

Sort This Store's Shopping List By: [Product Category ▼]

[ Print Shopping List for this Store ]  [ Print Coupons for this Store ]  [ Purchase Checked ]

FIG. 61

Grocery Shark

Shopping List for Albertsons #21
10665 N Tatum Blvd
Scottsdale, AZ 85256

Print Coupons And Driving Directions

Print Coupons Only

| Item | Size UnitCost | Price | Qty | Unit Price | UPC | ✓ |
|---|---|---|---|---|---|---|
| Pet Food | | | | | | |
| 9 Lives Cat Food Canned Bite Size Sliced Beef in Gravy 4 Pack | 16 oz $.068/oz | $ 1.49 | 2 | $ 3.98 | ▎▍▌▐▎▍▌ | |
| 9 Lives Cat Food Canned Chicken Dinner 4 Pack | 16 oz $.068/oz | $ 1.49 | 2 | $ 3.98 | ▎▍▌▐▎▍▌ | |
| Unbleached Flour | | | | | | |
| Gold Medal Flour Unbleached All-Purpose | 10 lbs $.020/oz | $ 3.18 | 1 | $ 3.18 | ▎▍▌▐▎▍▌ | |
| Apples | | | | | | |
| Apples Red Delicious 3 lb Bag | 3 lbs $1.00/lb | $ $ 2.99 | 1 | $ 2.99 | ▎▍▌▐▎▍▌ | |

Savings: $ 2.77

Total: $ 14.13

| SAVE $.49 9 Lives Beef in Gravy Cat Food | SAVE $.79 Gold Medal Unbleached Flour | SAVE $1.00 Red Delicious Apples 3lb Bag |
|---|---|---|

FIG.62

My Saved Lists

Saved Lists

| List Name | Select |
|---|---|
| Camping Necessities | ☐ |
| In-laws in Town | ☐ |
| Kids' Favorites | ☐ |
| Meghan at College | ☐ |
| Mother's Weekly List | ☐ |
| Our Weekly Shopping List | ☐ |
| Sping Break at the Lake in Montana | ☐ |
| *Icon* 4th of July Picnic | ☐ |
| *Icon* Romantic | ☐ |
| *Icon* Thanksgiving Dinner | ☐ |

[ Delete Checked Lists ]  [ Create New Shopping List ]

[ Add Checked to Todays Shopping List ]

Featured Stores!

*Logo*

▶ Shop Online with Basha's and Grocery Shark!

*Logo*

▶ NEW: Shop AJ's at GroceryShark!

*Logo*

▶ Shop With Grocery Shark, and Safeway Will Deliver!

FIG. 63

My Saved Lists > Weekly Shopping List

Product Categories and Items

| Product Category/Item | Qty | Select |
|---|---|---|
| Bakery & Sweet Shop > Candy<br>- Hershey Dark Chocolate Bars | 6 | ☐ |
| Baking<br>- Kraft Marshmallows - 12oz | 2 | ☐ |
| Dry Goods & Stapes > Canned Goods > Beans<br>- Bush's Baked Beans - 16oz Can | 2 | ☐ |
| Tobbaco, Wine & Spirits > Beer<br>- Fat Tire Beer - 6 pack - 12oz Bottles | 2 | ☐ |
| Dry Goods & Stapes > Canned Goods > Canned Vegetables<br>- Green Giant Green Beans - 12oz Can | 4 | ☐ |
| Meat & Seafood > Poultry<br>- Skinless & Boneless Chicken Breast | 10 | ☐ |
| Bakery & Sweet Shop > Bread (National Brands)<br>- Holsum Sandwich Bread - Loaf - 24oz | 2 | ☐ |
| Canned Goods > Meats & Fish<br>- Spam - 7oz Can | 4 | ☐ |
| Bottled Goods & Condiments<br>- Best Mayonnaise - 11.75oz Squeeable Bottle | 1 | ☐ |
| Spices & Seasonings > Non-Baking<br>- Mrs. Dash Lemmon Pepper | 1 | ☐ |

[ Check All ] [ Uncheck All ]

[ Delete Checked ] [ Update Quantities ]

[ Add Additional Products ] [ Add Additional Product Categories ]

[ Add Categories of Checked to Todays Shopping List ]

[ Add Checked to Todays Shopping List ]

[ Shark Shop for Checked ]

Featured Stores!

*Logo*

▸ Shop Online with Basha's and Grocery Shark!

*Logo*

▸ NEW: Shop AJ's at GroceryShark!

*Logo*

▸ Shop With Grocery Shark, and Safeway Will Deliver!

FIG. 64

Hormel Meat - Spam - Canned

Hormel SPAM - a taste that the world has loved for more than 60 years.

7 oz.

Nutritional Information

Servings per Container: 6

|  | Amount Per Serving | % Daily Value |
|---|---|---|
| Calories | 280 | ***** |
| Calories from Fat | 40 | ***** |
| Total Fat | 5 g | 7 % |
| Saturated Fat | 1.5 g | 7 % |
| Polyunsaturated Fat | 1 g | ***** |
| Monounsaturated Fat | 1.5 g | ***** |
| Cholesterol | 25 mg | 8 % |
| Sodium | 520 mg | 8 % |
| Potassium | 340 mg | 10 % |
| Total Carbohydrate | 48 g | 16 % |
| Dietary Fiber | 3 g | 16 % |
| Sugars | 7 g | ***** |
| Protein | 11 g | ***** |
| Vitamin A | ***** | 4 % |
| Vitamin C | ***** | 4 % |
| Calcium | ***** | 15 % |
| Iron | ***** | 4 % |

*Product Image*

Back

Keyword Search

[ ] Go

Buy It Here...

*Logo*

▸ Safeway Guarantees Lowest Prices on Lean Cusine Frozne Enchiladas!

*Logo*

▸ AJ's Carries Lean Cusine Frozen Enchiladas-Click to Buy!

*Logo*

▸ Check your Local Basha's for Lean Cuisine Frozen Enchiladas!

FIG. 65

Advanced Store Selection

Find: All Stores / Albertsons / AJ's Fine Foods / Bashas

Within: 1 - 2 Miles of this Address/Intersection: 3301 30th Street

City: Boulder

State: CO

Zip Code: 80301

Find Stores

Featured Stores!

*Logo*

▸ Shop Online with Basha's and Grocery Shark!

*Logo*

▸ NEW: Shop AJ's at GroceryShark!

*Logo*

▸ Shop With Grocery Shark, and Safeway Will Deliver!

FIG. 67

Update Store Profile - Select Your Stores

Store Search Results [View Your Stores]

Stores Close to Your Location are Listed Below. To Find More Stores to Choose From, or Stores in a Different Area, Try an Advanced Store Search.

GroceryShark Stores in Your Area

| Store | Location | Distance | Add |
|---|---|---|---|
| A | Albertson's #65 - 2900 Iris Ave (30th Street & Iris) | 1.5 mi | ☑ |
|  | International Food Bazaar #3 - 2839 28th St (28th Street & Valmont Road) | 2.1 mi | ☐ |
| (S) | Safeway #72 - 2905 Pearl Street (29th Street & Pearl Avenue) | 4.4 mi | ☐ |

Add Checked Stores

Not finding the stores you want to shop at? Try an Advanced Store Search.

Your Current Store Selection

You currently have 3 stores in your Grocery Shark Profile. You can select additional stores from the list above titled "Store Search Results", or, you can perform an Advanced Search to find additional stores to choose from. To replace a store, delete it, and add new stores.

Your Stores

| Store | Preferred | Location | Distance | Delete |
|---|---|---|---|---|
| A | ☑ | Albertsons #21 - 10665 N Tatum Blvd (Tatum & Shea) | 1.7 mi | ☐ |
| (S) | ☑ | Safeway #231 - 10773 N Scottsdale Rd (Scottsdale & Shea) | 1.8 mi | ☐ |
| A | ☑ | Albertsons #22 - 6965 N Hayden Rd (Hayden & Indian Bend) | 3.3 mi | ☐ |
| B | ☐ | Bashas #15 - 10631 N 32nd St (Shea & 32nd Street) | 3.5 mi | ☐ |

Delete Checked Stores

Continue

---

Featured Stores!

*Logo*

▸ Shop Online with Basha's and Grocery Shark!

*Logo*

▸ NEW: Shop AJ's at GroceryShark!

*Logo*

▸ Shop With Grocery Shark, and Safeway Will Deliver!

FIG. 68

Update Store Profile - Select Your Stores

⚠ 1 Store Was Added to Your Profile

Store Search Results [View Your Stores]

Stores Close to Your Location are Listed Below. To Find More Stores to Choose From, or Stores in a Different Area, Try an Advanced Store Search.

GroceryShark Stores in Your Area

| Store | Location | Distance | Add |
|---|---|---|---|
|  | International Food Bazaar #3 - 2839 28th St<br>(28th Street & Valmont Road) | 2.1 mi | ☐ |
| (S) | Safeway #72 - 2905 Pearl Street<br>(29th Street & Pearl Avenue) | 4.4 mi | ☐ |

Add Checked Stores

Not finding the stores you want to shop at? Try an Advanced Store Search.

Your Current Store Selection

You currently have 3 stores in your Grocery Shark Profile. You can select additional stores from the list above titled "Store Search Results ", or, you can perform an Advanced Search to find additional stores to choose from. To replace a store, delete it, and add new stores.

Your Stores

| Store | Preferred | Location | Distance | Delete |
|---|---|---|---|---|
| (S) | ☐ | Safeway #231 - 10773 N Scottsdale Rd<br>(Scottsdale & Shea) | -- mi | ☐ |
| A | ☐ | Albertsons #22 - 6965 N Hayden Rd<br>(Hayden & Indian Bend) | -- mi | ☐ |
| B | ☐ | Bashas #15 - 10631 N 32nd St<br>(Shea & 32nd Street) | -- mi | ☐ |
| A | ☑ | Albertson's #65 - 2900 Iris Ave<br>(30th Street & Iris) | 1.5 mi | ☐ |

Delete Checked Stores

Continue

---

Featured Stores!

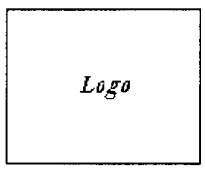

▶ Shop Online with Basha's and Grocery Shark!

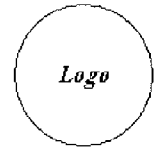

▶ NEW: Shop AJ's at GroceryShark!

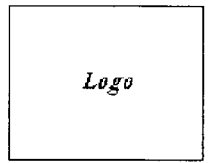

▶ Shop With Grocery Shark, and Safeway Will Deliver!

FIG. 69

Shark Shop Criteria

SharkShop Will Find the Lowest Priced Item for those you Selected at up to Three of Your Profile Stores. Select up to Three Stores Below, and click the SharkShop Button to Find the Best Price!

You Selected 10 Products(s) (a total of 24 Items) to SharkShop for.

Shark Shop at:
- Albertson's #21 - Tatum & Shea
- Albertson's #22 - Hayden & Indian Bend
- Basha's #15 - Shea & 32nd Street
- Safeway #231 - Scottsdale & Shea (Select up to 3 stores. To Select Multiple Stores Hold the CTRL Key).

[Add Stores to Profile]

[SharkShop]

Keyword Search
[____] [Go]

Shark Shop Stores

*Logo*

▶ Click Here to Shark Shop With the Basha's Closest to Your Home Address

*Logo*

▶ Click Here to Shark Shop With the AJ's Closest to Your Home Address

*Logo*

▶ Shark Shop the Closest Safeway to Your Home Address, and Safeway will Deliver!

FIG. 70

Today's Shopping List and Cart

⚠ You Just Added 10 Products to Your Shopping Cart

You Have No Items on Todays Shopping List [Add Additional Products]

Keyword Search [___] [Go]

Your Shopping Cart - 10 Products - 57.58 - You Save $8.23!

☑ 🛒 Items in Your Shopping Cart (10 Products)

| | | | | | | |
|---|---|---|---|---|---|---|
| ⚠ | Hershey Dark Chocolate Bars<br>View Other: Bakery & Sweet Shop > Candy Products | 1.55 oz<br>$.213/oz | $ .33 | [6] | $ 1.98 | ☐ |
| ⚠ | Kraft Marshmallows - 12oz<br>View Other: Baking Products | 12 oz<br>$.149/oz | $ 1.79 | [2] | $ 3.58 | ☐ |
| ⚠ | Bush's Baked Beans - 16oz Can<br>View Other: Dry Goods & Staples > Canned Goods Products | 16 oz<br>$.072/oz | $ 1.15 | [2] | $ 2.30 | ☐ |
| ⚠ | Fat Tire Beer - 6 Pack - 12oz Bottles<br>View Other: Tobbacco, Wine & Spririts > Beer Products | 6/12 fl oz<br>$.083/oz | $ 5.99 | [2] | $ 11.98 | ☐ |
| ⚠ | Green Giant Green Beans - 12oz Can<br>View Other: Dry Goods & Stapes > Canned Goods Products | 12 oz<br>$.083/oz | $ .99 | [4] | $ 3.96 | ☐ |
| ⚠ | Skinless & Boneless Chicken Breast<br>View Other: Meat & Seafood > Poultry Products | .5 lb<br>$2.90/lb | $ 1.45 | [10] | $ 14.50 | ☐ |
| ⚠ | Holsum Sandwich Bread - Loaf - 24oz<br>View Other: Bakery & Sweet Shop > Bread Products | 24 oz<br>$.070/oz | $ 1.69 | [2] | $ 3.38 | ☐ |
| ⚠ | Spam - 7oz Can<br>View Other: Canned Goods > Meat Products | 7 oz<br>$.341/oz | $ 2.39 | [4] | $ 9.56 | ☐ |
| ⚠ | Best Mayonnaise - 11.75oz Squeezable Bottle<br>View Other: Bottled Goods & Condiments Products | 11.75 oz<br>$.200/oz | $ 2.35 | [1] | $ 2.35 | ☐ |
| ⚠ | Mrs. Dash Lemmon Pepper<br>View Other: Spices & Seasonings > Non-Baking Products | 4.5 oz<br>$.887/oz | $ 3.99 | [1] | $ 3.99 | ☐ |

Total: 34  $ 57.58
Savings:  $ 8.23

Sort This Store's Shopping List By: [Product Category ▼]

[Delete Checked From Cart]  [Update Cart Quantities]

[Checkout]

FIG. 71

My Stores

▸ Safeway
25th Street West
Scottsdale, AZ 85257

▸ Albertsons
25th Street West
Scottsdale, AZ 85257

▸ Safeway
25th Street West
Scottsdale, AZ 85257

[ Edit Stores ]

☑ My Lists
Most Recent Lists Used:
Weekly Shopping List
Camping Necessities
In-Laws In Town ▸ View All Saved Lists ▦ My Menu Planner
Text About the Meal and Menu Planning Functionality:
▸ View Today's Menu
▸ View Menu Calendar
▸ View my Meals
▸ View my Menu Templates ◎ My Recipes
Text About Recipes Functionality:
▸ View My Recipes
▸ Create a Recipe ☺ My Diets
Text About Diets Functionality:
▸ View My Diets 🗊 My Pantry
Text About Pantry Functionality:
▸ View Items in My Pantry Keyword Search
[        ] [Go]

Stores & Specials!

*Product Image*

▸ Get Your Free Sample!

*Logo*

▸ NEW: Shop AJ's at GroceryShark!

*Product Image*

▸ Shop Purity Supreme's Brand

Recipe Search Results based on Your Pantry

Keyword Search [ ] Go

Recipes Matching Your Pantry Selections

| Recipe | Calories | Total Time |
|---|---|---|
| Apple Bread | 2200 | 25 Minutes |
| ($) Safeway Select Apple French Toast | 2201 | 26 Minutes |
| Chicken Cheese Bake | 2206 | 29 Minutes |
| Saucy Chicken Cheese Dip | 120 | 23 Minutes |
| Savory Chicken Bread Pudding | 212 | 45 Minutes |
| Apple Fondue | 87 | 12 Minutes |
| Fiesta Chicken Gorditas with Fruit Salsa | 125 | 35 Minutes |
| Grilled Chicken and Fruit Kabobs | 75 | 15 Minutes |
| Creamy Cheesy Chicken Soup | 100 | 20 Minutes |
| Apple Stuffed Chicken with Golden Cream Sauce | 237 | 37 Minutes |

Sort by [Recipe Name ▼]

Not finding what you're looking for? Try an Advanced Recipe Search.

Might We Suggest...

▸ Raisin-Apple Bread

▸ Chicken Spinich Calzone

FIG. 74

($) Safeway Select Apple French Toast

Keyword Search [ ] [Go]

Ingredients and Instructions

Might We Suggest...

Preparation Time: 10 Minutes    Cooking Time: 15 Minutes

Makes: [4] Servings [Scale Servings]

| ☐ | 1 | Each | Produce > Fresh Fruits > Apples<br>- Safeway Select ($) Apples (Individual) |
| ☐ | 4 | Slices | Bakery > Bread (national) > Sliced Bread<br>- Safeway Select ($) White Sandwich Bread |
| ☐ | 2 | Each | Dairy & Beverage > Eggs > Eggs<br>- Safeway Select ($) Farm Fresh Large Eggs |
| ☐ | 1/4 | Cup | Dairy & Beverage > Milk > Whole Milk<br>- Safeway Select ($) 2% Milk |
| ☐ | 2 | Tbs | Dry Goods & Staples > Spices > Nutmeg<br>- Safeway Select ($) Nutmeg |
| ☐ | 2 | Tbs | Dry Goods & Staples > Spices > Cinnamon<br>- Safeway Select ($) Cinnamon |
| ☐ | 1/4 | Lb | Dry Goods & Staples & Sugar > Granulated Sugar<br>- Safeway Select ($) Cane Sugar |
| ☐ | 1/4 | Cup | Dairy & Beverage > Butter & Margarine > Butter<br>- Safeway Select ($) Sweet Butter |

*Product Image*

▸ Add Aunt Jemima Lite Syrup to Your Shopping List

*Product Image*

▸ Crab Brie Omelette - A Grocery Shark Favorite! Sesame Dinner Rolls

[Check All] [Uncheck All]

[Convert to Metric]

[Add Checked to Today's List]

[Shark Shop for Checked Items]

Slice apples very thin and set aside. In a bowl, beat two eggs and add the milk. Mix together the sugar, cinnamon and nutmeg. Pour the sugar mixture onto a plate and set aside. Sauté the apples in the butter/margarine until soft. Dip the slices of bread into the milk mixture, then the sugar mixture. Place the egg dipped and dusted bread on top of the apples, cooking either side until golden brown. Serve warm with powdered sugar and or syrup. Makes 4 servings.

*Product Image*

[Back]

*Product Image*

▸ Add Albertson's Orange Juice Conentrate to Your Shopping List

▷ Nutritional Information

[Add to My Recipes]

FIG. 75

Apple French Toast

⬇ Apple French Toast Has Been Added to Your Recipes

Ingredients and Instructions

Preparation Time: 10 Minutes    Cooking Time: 15 Minutes

Makes: [4] Servings [Scale Servings]

| ☐ | 1 | Each | Produce > Fresh Fruits > Apples<br>- Safeway Select [$] Apples (Individual) |
| ☐ | 4 | Slices | Bakery > Bread (national) > Sliced Bread<br>- Safeway Select [$] White Sandwich Bread |
| ☐ | 2 | Each | Dairy & Beverage > Eggs > Eggs<br>- Safeway Select [$] Farm Fresh Large Eggs |
| ☐ | 1/4 | Cup | Dairy & Beverage > Milk > Whole Milk<br>- Safeway Select [$] 2% Milk |
| ☐ | 2 | Tbs | Dry Goods & Staples > Spices > Nutmeg<br>- Safeway Select [$] Nutmeg |
| ☐ | 2 | Tbs | Dry Goods & Staples > Spices > Cinnamon<br>- Safeway Select [$] Cinnamon |
| ☐ | 1/4 | Lb | Dry Goods & Staples & Sugar > Granulated Sugar<br>- Safeway Select [$] Cane Sugar |
| ☐ | 1/4 | Cup | Dairy & Beverage > Butter & Margarine > Butter<br>- Safeway Select [$] Sweet Butter |

[Check All] [Uncheck All]

[Convert to Metric]

[Add Checked to Today's List]

[Shark Shop for Checked Items]

Slice apples very thin and set aside. In a bowl, beat two eggs and add the milk. Mix together the sugar, cinnamon and nutmeg. Pour the sugar mixture onto a plate and set aside. Sauté the apples in the butter/margarine until soft. Dip the slices of bread into the milk mixture, then the sugar mixture. Place the egg dipped and dusted bread on top of the apples, cooking either side until golden brown. Serve warm with powdered sugar and or syrup. Makes 4 servings.

▷ Nutritional Information

[Add to My Recipes]

---

Keyword Search [   ] [Go]

Might We Suggest...

*Product Image*

▸ Add Aunt Jemima Lite Syrup to Your Shopping List

*Product Image*

▸ Crab Brie Omelette - A Grocery Shark Favorite!
Sesame Dinner Rolls

*Product Image*

▸ Add Albertson's Orange Juice Concentrate to Your Shopping List

*Product Image*

[Back]

FIG. 76

Create A Recipe

Grocery Shark allows members to save recipes, edit recipes, and shop for ingredients with a few simple clicks of the mouse. Become a member today and make your meal restaurant quality.

▸ Create a Recipe

Add Some Spice with Lemon Pepper Chicken

*Product Image*

Featured Recipes

*Product Image*

Fiesta Shrimp Appetizers

Spice up cooked shrimp by marinating in lime, cilantro and anaheim pepper. For even more heat, substitute 2 to 4 tablespoons chopped jalapeno

[View Recipe]

*Product Image*

Fiesta Shrimp Appetizers

This chocolate-cream cheese pie with a hazelnut crust and ruby-red berry sauce makes a stunning ending to a meal. To drizzle the melted chocolate, put it in a plastic sandwich bag, snip a corner

[View Recipe]

Keyword Search [  ] [Go]

Stores & Specials!

*Product Image*

▸ Get Your Free Sample!

*Product Image*

▸ NEW: Shop AJ's at GroceryShark!

*Product Image*

▸ Shop Purity Supreme's Brand

FIG. 77

Create a Recipe

Keyword Search [____] [Go]

Recipe Name: [Thea's Macaroni and Cheese]

Might We Suggest...

Ingredients and Instructions

Preparation Time: [15] Minutes   Cooking Time: [50] Minutes

Makes: [4] Servings   [Scale Servings]

*Product Image*

- ☐ [1] [0 ▼] [Pound(s) ▼]  Dry Goods & Staples > Pastas & Noodles > Pastas
  - Creamette large elbow macaroni 16oz
- ☐ [1] [0 ▼] [Each ▼]  Dairy & Beverage > Milk > Condensed & Evaporated
  - Carnation Evaporated Milk 5.5 oz
- ☐ [2] [0 ▼] [Each ▼]  Dairy & Beverage > Eggs > Eggs
  - Hickmans grade AA large eggs 1 Doz
- ☐ [1] [0 ▼] [Cup(s) ▼]  Dairy & Beverage > Cheese > American & Jack
  - Kraft monterey jack cheese 16oz ▶ Need Butter? Add Challenge Butter to Your Recipe!

*Product Image*

▶ Recipe Call for Garlic Salt? Try Lowry's!

[Check All] [Uncheck All]

[Delete Checked Items]

[Add Product Category]  [Add Product]

Cooking Instructions

Boil the elbow macaroni in salted water per package instruction (prepare the macaroni to a firm texture). Drain the pasta and return to the pot. Add the stick of butter to the macaroni, season the pasta with salt, onion powder and white pepper to taste. Next, add the entire can of

*Meal Image*

[Continue] [Cancel]

Upload Image:
[_____] [Browse]

FIG. 78

Add a Product Category to Your Recipe

| | | |
|---|---|---|
| Bakery & Sweet Shop ▶ | | |
| Dairy & Beverage ▶ | Butter_Margarine ▶ | |
| Delicatessan & Specialty Foods ▶ | Cheese | |
| | Cottage Cheese_Cream Cheese | |
| Floral & News Stand ▶ | | |
| Health & Beauty ▶ | Cream_Creamers | |
| Produce ▶ | Eggs | |
| Meat & Seafood ▶ | Juice ▶ | Apple Juice_Cider |
| Dry Goods & Staples ▶ | Ice Cream ▶ | Berry Juice |
| Home Maintenance & Supplies ▶ | Milk ▶ | Cranberry Juice |
| | Puddings_Gelatins | Frozen Juice |
| Infant & Child Care ▶ | Lactose-free Beverages | Fruit Punch |
| General Store ▶ | Yogurt | Gourmet Juice |
| | Coffee_Tea ▶ | Grape Juice |
| | Soda Pop_Ice Teas | Grapefruit Juice |
| | Water_Sports Drinks | Juice Concentrate |
| | | Lemon_Lime Juice |

View Today's Shopping List and Cart

Keyword Search
[    ] Go

Stores & Specials

*Product Image*

▶ Add Pilsbury's Best Flour to Your Recipe

*Product Image*

▶ Add Second Nature Egg Substitute to Your Recipe

*Product Image*

▶ Add Challenge Butter to Your Recipe!

FIG. 79

Select the Product(s) to Add to Thea's Macaroni and Cheese

Keyword Search [ ] [Go]

Dairy & Beverage > Cheese > Cheddar & Gouda   25 Results | Page: 1 2 3

Might We Suggest...

| Product | Size | |
|---|---|---|
| Kraft Cheddar Cheese Sharp | 16 oz | ☑ |
| Kraft Cheddar Cheese Medium | 8 oz | ☐ |
| Kraft Cheddar Cheese Cracker Barrel Extra Sharp | 10 oz | ☐ |
| Kraft Cheddar Cheese Old English Deli Deluxe | 8 oz | ☐ |
| Kraft Cheddar Cheese American Classic Melts | 8 oz | ☐ |
| Kraft Cheddar N Monterey Jack Cheese Cube | 8 oz | ☐ |
| Kraft Sharp Cheddar Cheese Mild Finely | 8 oz | ☐ |
| Kraft Shredded Cheese Cheddar Sharp Finely | 8 oz | ☐ |
| Kraft Shredded Cheese Mozarella Cheddar | 8 oz | ☐ |
| Kraft Shredded Mexican Style Cheese Blend | 8 oz | ☐ |

*Product Image*

▸ Add Kraft Cheddar 'n Monterey Cheese Cubes to Your Recipe!

*Product Image*

▸ Add Velveeta Cheese to Your Recipe!

Sort by [Product Name ▾]   25 Results | Page: 1 2 3

[Add Product to Recipe]  [Cancel]

FIG. 80

Classify Your Recipe

Select the Category and Subcategory That Best Describes Your Recipe

| Main Dish ▶ | Poultry ▶ | |
|---|---|---|
| Side Dish | Beef ▶ | |
| Appetizers ▶ | Fish ▶ | |
| Desserts ▶ | Pasta ▶ | Bake ▶ |
| Snacks ▶ | Pizza | Boil ▶ |
| Salads ▶ | | Broil |
| Vegetables ▶ | | Crockpot |
| Special Occasions & Holidays ▶ | | Fry |
| Foods by Region ▶ | | Grill |
| Beverages ▶ | | Microwave |
| | | Roast |

Not Finding the Recipe You're Looking For? Try an <u>Advanced Recipe Search</u>.

Keyword Search
[       ] Go

Shopping Options

*Product Image*

▶ When You're Through, Find These Products at AJ's!

Product Image

▶ Safeway Can Fill Your Order and Deliver!

FIG. 81

Create a Recipe

Recipe Name: Thea's Macaroni and Cheese

Recipe Classification

Recipe Categories

☐ Main Dish > Pasta > Bake

[Delete Checked Items] [Add Classification]

Nutritional Information

☐ Dispaly Nutritional Information

Serving Size: 1 Plate
Servings per Container: 4

| | Amount Per Serving | | % Daily Value | |
|---|---|---|---|---|
| Calories from Fat | 140 | | ***** | |
| Total Fat | 15 | g | 23 | % |
| Saturated Fat | 7 | g | 31 | % |
| Cholesterol | 30 | mg | 11 | % |
| Soldium | 800 | mg | 35 | % |
| Total Carbohydrate | 37 | g | 11 | % |
| Dietary Fiber | 2 | g | 7 | % |
| Sugars | 2 | g | ***** | |
| Protein | 17 | g | ***** | |
| Vitamin A | ***** | g | 25 | |
| Calcium | ***** | g | 25 | |
| Vitamin C | ***** | g | 44 | |
| Iron | ***** | g | 1 | |
| Calories | 350 | g | ***** | |

[Finish] [Cancel]

Keyword Search
[  ] [Go]

Shopping Options (Product Image)

▸ When You're Through, Find These Products at AJ's!

*Product Image*

▸ Safeway Can Fill Your Order and Deliver!

FIG. 82

| My Meal List | Meal Planner \| Menu Template \| Menu Calendar |

| Meals | Select | Featured Stores! |
|---|---|---|
| Morning Meals | Select | |
| Breakfast Burritos & OJ | ☐ | |
| Buttermilk Pancakes & Eggs | ☐ | LOGO |
| Mid-day Meals | Select | |
| Carnation Cobb Salad and Key Lime Pie | ☐ | ▸ Shop Online with Basha's and Grocery Shark! |
| Evening Meals | Select | |
| Baked Salmon with Garlic Mashed Potatoes and Wine | ☐ | |
| Snacks | Select | LOGO |
| Low-Fat Spinach Dip, Tortilla Chips, and Cuervo Margaritas | ☐ | |

[ Delete Checked Meals ]   [ Create New Meal ]

[ Add Checked to Todays Shopping List ]

▸ NEW: Shop AJ's at GroceryShark!

LOGO

▸ Shop With Grocery Shark, and Safeway Will Deliver!

FIG. 83

Create Meal

Meal Planner | Menu Template | Menu Calendar

Step 1 - Enter the Name of Your Meal

Meal Name: [Chicken Favorite]   Meal Type: [Evening ▼]

Step 2 - Select Ingredients and Quantities

Ingredients for this meal are listed below. To add product categories (such as 'milk') to your list, select the Add Product Categories option below. To add specific products (such as 'Albertsons 2% Milk'), select the Add Items option below.

Meal Product Categories and Items

You Currently Have No Items Associated With this Meal

[Delete Checked]  [Update Quantities]

[Add Product]  [Add Product Category]  [Add Recipe]

[Save Meal]

---

Add to Your Meal...

*Product Image*

▶ Add Nestle's Pesto Bread to Your Meal!

*Product Image*

▶ Start Dinner with A Low-Fat Caesar Salad!

FIG. 84

Create Meal

⬇ You Just Added Milk 2% to Your Meal

Meal Planner | Menu Template | Menu Calendar

Step 1 - Enter the Name of Your Meal

Meal Name: [Chicken Favorite]   Meal Type: [Evening ▼]

Step 2 - Select Ingredients and Quantities

Ingredients for this meal are listed below. To add product categories (such as 'milk') to your list, select the Add Product Categories option below. To add specific products (such as 'Albertsons 2% Milk'), select the Add Items option below.

Meal Product Categories and Items

| Product Category/Item | Qty | Select |
|---|---|---|
| Dairy & Beverage > Milk > Milk 2% | 1 | ☐ |

[Delete Checked]  [Update Quantities]

[Add Product]  [Add Product Category]  [Add Recipe]

[Save Meal]

Products and Recipes!

*Product Image*

▸ Add a Crab Cake Appetizer to Your Meal!

*Product Image*

▸ Would Bass Beer Compliment Your Meal?

FIG. 85

Add a Product Category to Your Meal

Keyword Search [ ] [Go]

Dry Goods & Staples > Canned Goods > Vegetables    25 Results | Page: 1 2 3

| Product | Size | |
|---|---|---|
| Del Monte - Green Beans Whole | 16.5 oz | ☑ |
| Del Monte - Mushrooms | 16.5 oz | ☐ |
| Good Day - Tomatoes | 16 oz | ☐ |
| Good Day - Beans | 16 oz | ☐ |
| Good Day - Beets | 16 oz | ☐ |
| S & W - Green Beans | 8 oz | ☐ |
| S & W - Mushrooms | 12 oz | ☐ |
| Rosarita - Green Chile and Lime Refried Beans | 12 oz | ☐ |
| Rosarita - Black Beans | 12 oz | ☐ |
| Rosarita - Vegetarian Refried Beans | 12 oz | ☐ |

Sort by [Product Name ▼]    25 Results | Page: 1 2 3

[Add Product to Meal] [Cancel]

Featured Items...

*Product Image*

▸ Add Del Monte Green Beans to Your Meal!

*Product Image*

▸ Add Rosarita Green Chile and Lime Refried Beans to Your Meal!

FIG. 86

Create Meal

⚠ You Just Added Del Monte - Green Beans Whole to Your Meal    Meal Planner | Menu Template | Menu Calendar

Step 1 - Enter the Name of Your Meal

Meal Name: [Chicken Favorite]    Meal Type: [Evening ▼]

Step 2 - Select Ingredients and Quantities

Ingredients for this meal are listed below. To add product categories (such as 'milk') to your list, select the Add Product Categories option below. To add specific products (such as 'Albertsons 2% Milk'), select the Add Items option below.

Meal Product Categories and Items

| Product Category/Item | Qty | Select |
|---|---|---|
| Dairy & Beverage > Milk > Milk 2% | 1 | ☐ |
| Dry Goods & Staples > Canned Goods > Vegetables<br>- Del Monte - Green Beans Whole | 1 | ☐ |

[Delete Checked]  [Update Quantities]

[Add Product]  [Add Product Category]  [Add Recipe]

[Save Meal]

Featured Stores!
..................

*Product Image*

▸ Add a Crab Cake Appetizer to Your Meal!

*Product Image*

▸ Would Bass Beer Compliment Your Meal?

*Product Image*

▸ Specify Good Day 2% Milk for Your Milk

FIG. 87

Add a Recipe to Your Meal

Keyword Search [ ] Go

| Main Dish | ▶ | Poultry | ▶ | Bake |
| Side Dish | ▶ | Beef | ▶ | Boil |
| Appetizers | ▶ | Fish | ▶ | Broil |
| Desserts | ▶ | Pasta | ▶ | Crockpot |
| Snacks | ▶ | Pizza | ▶ | Fry |
| Salads | ▶ | | | Grill |
| Vegetables | ▶ | | | Microwave |
| Special Occasions & Holidays | ▶ | | | Roast |
| Foods by Region | ▶ | | | |
| Beverages | ▶ | | | |

Might We Suggest...

*Product Image*

▶ Add Baked Fennel Au Gratin to Your Meal!

*Product Image*

▶ A Grocery Shark Favorite!
Add Mushroom Filled Ravioli to Your Meal!

Not Finding the Recipe You're Looking For? Try an Advanced Recipe Search.

FIG. 88

Recipe Search Results - Pick the Recipe(s) to Add to Your Meal

Keyword Search [    ] Go

Main Dish > Poutry > Bake

Might We Suggest...

| Recipe | Calories | Total Time | Select |
|---|---|---|---|
| Roast Chicken with Apples and Sage | 2200 | 25 Minutes | ✓ |
| Baked Chicken with Honey-Lemon Glaze | 2201 | 26 Minutes | ☐ |
| Chicken Breasts with Ginger-Orange Glaze | 1850 | 40 Minutes | ☐ |
| Chicken Breasts with Tarragon | 1209 | 42 Minutes | ☐ |
| Chicken Sausages with Sweet Onions & Grapes | 2010 | 35 Minutes | ☐ |
| Curried Chicken Breasts with Basmati Rice | 2315 | 15 Minutes | ☐ |
| Roasted Chicken with Onions and Potatoes | 1700 | 30 Minutes | ☐ |
| Chicken Breasts with Port Wine and Mushrooms | 1280 | 40 Minutes | ☐ |
| Chicken Loaf with Red Pepper Sauce | 1090 | 35 Minutes | ☐ |
| Baked Chicken with Tomato and Fennel | 1010 | 55 Minutes | ☐ |

Sort by [Recipe Name ▼]

[Back to Meal Plan]

*Product Image*

▸ Add Chicken Breasts with Tarragon to Your Meal!

*Product Image*

▸ Try Calypso Curried Chicken with Your Meal!

[Add Checked to Meal]

Not finding what you're looking for? Try an Advanced Recipe Search.

FIG. 89

Create Meal
⬇ Roast Chicken with Apples and Sage Added to Your Meal     Meal Planner | Menu Template | Menu Calendar

Step 1 - Enter the Name of Your Meal

Meal Name: [Chicken Favorite]   Meal Type: [Evening ▼]

Step 2 - Select Ingredients and Quantities

Ingredients for this meal are listed below. To add product categories (such as 'milk') to your list, select the Add Product Categories option below. To add specific products (such as 'Albertsons 2% Milk'), select the Add Items option below.

Meal Product Categories and Items

| Product Category/Item | Qty | Select |
|---|---|---|
| Dairy & Beverage > Milk > Milk 2% | 1 | ☐ |
| Dry Goods & Staples > Canned Goods > Vegetables<br>- Del Monte - Green Beans Whole | 1 | ☐ |
| Recipe: Main Dish > Poutry > Bake<br>- Roast Chicken with Apples and Sage | 1 | ☐ |

[Delete Checked]  [Update Quantities]

[Add Product]  [Add Product Category]  [Add Recipe]

[Save Meal]

Featured Stores!

▸ Add Almaden Chardonnay to Your Meal!

▸ Specify Good Day 2% Milk for Your Milk

▸ Start Dinner with A Low-Fat Caesar Salad!

FIG. 90

My Meal List
🛈 Chicken Favorite has Been Added to Your Meals    Meal Planner | Menu Template | Menu Calendar

| Meals | | Featured Stores! |
|---|---|---|
| Morning Meals | Select | |
| Breakfast Burritos & OJ | ☐ | |
| Buttermilk Pancakes & Eggs | ☐ | *LOGO* |
| Mid-day Meals | Select | |
| Carnation Cobb Salad and Key Lime Pie | ☐ | ▸ Shop Online with Basha's and Grocery Shark! |
| Evening Meals | Select | |
| Chicken Favorite | ☐ | |
| Baked Salmon with Garlic Mashed Potatoes and Wine | ☐ | *LOGO* |
| Snacks | Select | |
| Low-Fat Spinach Dip, Tortilla Chips, and Cuervo Margaritas | ☐ | ▸ NEW: Shop AJ's at GroceryShark! |

[ Delete Checked Meals ]   [ Create New Meal ]

[ Add Checked to Todays Shopping List ]

*LOGO*

▸ Shop With Grocery Shark, and Safeway Will Deliver!

Create Menu Template         Meal Planner | Menu Template | Menu Calendar

Step 1 - Enter the Name of Your Menu Template

Menu Template Name: [Easter Weekend]

Step 2 - Select Day and Meals

Days of this Menu Template are displayed below as well as Meals associated with the selected day. To add Meals to your list, select the Add Meal option below. To change days, select the applicable day. When complete, Save your Menu Template.

Meals for Day: 1 2 3 4 5 6 7

| Morning | [Add Meal] | Select |

You Currently Have No Morning Meals

| Mid-Day | [Add Meal] | Select |

You Currently Have No Mid-Day Meals

| Evening | [Add Meal] | Select |

You Currently Have No Evening Meals

[Delete Checked]

[Save Menu Template]  [View Template Summary]

Featured Stores!

LOGO

▶ Shop Online with Basha's and Grocery Shark!

LOGO

▶ NEW: Shop AJ's at GroceryShark!

LOGO

▶ Shop With Grocery Shark, and Safeway Will Deliver!

FIG. 93

My Meal List         Meal Planner | Menu Template | Menu Calendar

| Meals | |
|---|---|
| Morning Meals | Select |
| Breakfast Burritos & OJ | ☐ |
| Buttermilk Pancakes & Eggs | ☐ |
| Mid-day Meals | Select |
| Carnation Cobb Salad and Key Lime Pie | ☐ |
| Evening Meals | Select |
| Chicken Favorite | ☑ |
| Baked Salmon with Garlic Mashed Potatoes and Wine | ☐ |
| Snacks | Select |
| Low-Fat Spinach Dip, Tortilla Chips, and Cuervo Margaritas | ☐ |

[ Delete Checked Meals ]  [ Create New Meal ]

Add Checked Meals to Menu Template

*Featured Stores!*

LOGO

▸ Shop Online with Basha's and Grocery Shark!

LOGO

▸ NEW: Shop AJ's at GroceryShark!

LOGO

▸ Shop With Grocery Shark, and Safeway Will Deliver!

FIG. 94

Create Menu Template
⬇ Chicken Favorite has Been Added to Your Menu Template          Meal Planner | Menu Template | Menu Calendar

Step 1 - Enter the Name of Your Menu Template

Menu Template Name: [Easter Weekend]

Step 2 - Select Day and Meals

Days of this Menu Template are displayed below as well as Meals associated with the selected day. To add Meals to your list, select the Add Meal option below. To change days, select the applicable day. When complete, Save your Menu Template.

Meals for Day: 1 2 3 4 5 6 7

| Morning | [Add Meal] | Select |
|---|---|---|

You Currently Have No Morning Meals

| Mid-Day | [Add Meal] | Select |
|---|---|---|

You Currently Have No Mid-Day Meals

| Evening | [Add Meal] | Select |
|---|---|---|

Chicken Favorite                                                    ☐

[Delete Checked]

[Save Menu Template]   [View Template Summary]

Featured Stores!

LOGO

▸ Shop Online with Basha's and Grocery Shark!

LOGO

▸ NEW: Shop AJ's at GroceryShark!

LOGO

▸ Shop With Grocery Shark, and Safeway Will Deliver!

FIG. 95

Create Menu Template

⬜ Chicken Favorite has Been Added to Your Menu Template     Meal Planner | Menu Template | Menu Calendar Step 1 - Enter the Name of Your Menu Template Menu Template Name: [EasterWeekend]

Step 2 - Select Day and Meals

Days of this Menu Template are displayed below as well as Meals associated with the selected day. To add Meals to your list, select the Add Meal option below. To change days, select the applicable day. When complete, Save your Menu Template.

Meals for Day: 1 2 3 4 5 6 7

| Morning | [Add Meal] | Select |
|---|---|---|
| Breakfast Burritos & OJ | | ☐ |
| Mid-Day | [Add Meal] | Select |
| Carnation Cobb Salad & Key Lime Pie | | ☐ |
| Evening | [Add Meal] | Select |
| Baked Salmon with Garlic Mashed Potatoes and Wine | | ☐ |

[Delete Checked]

[Save Menu Template]   [View Template Summary]

Featured Stores!

LOGO

▸ Shop Online with Basha's and Grocery Shark!

LOGO

▸ NEW: Shop AJ's at GroceryShark!

LOGO

▸ Shop With Grocery Shark, and Safeway Will Deliver!

FIG. 96

Easter Weekend Menu Template　　　　　　　Meal Planner | Menu Template | Menu Calendar

Meals for Day: 1

Evening

Chicken Favorite

Meals for Day: 2

Morning

Breakfast Burritos & OJ

Mid-Day

Carnation Cobb Salad & Key Lime Pie

Evening

Baked Salmon with Garlic Mashed Potatoes and Wine

[ Menu Template List ]　[ Edit Template ]　[ Save Template ]

Featured Stores!

LOGO

▸ Shop Online with Basha's and Grocery Shark!

LOGO

▸ NEW: Shop AJ's at GroceryShark!

LOGO

▸ Shop With Grocery Shark, and Safeway Will Deliver!

FIG. 97

Saved Menu Templates
⚠ Easter Weekend Template Saved                     Meal Planner | Menu Template | Menu Calendar

Templates

| Template Name | Calendar Start Date | | | Select |
|---|---|---|---|---|
| In-Laws in Town | March | 4 | 2002 | ☑ |
| Romantic Cabin Getaway | March | 14 | 2002 | ☑ |
| Pre-Race Hi-Carb | -- | -- | ------ | ☐ |
| Easter Weekend | March | 30 | 2002 | ☑ |

[ Delete Checked Templates ]    [ Create New Template ]

Add Checked to Menu Calendar

Add Checked to Todays Shopping List

Featured Stores!

LOGO

▸ Shop Online with Basha's and Grocery Shark!

LOGO

▸ NEW: Shop AJ's at GroceryShark!

LOGO

▸ Shop With Grocery Shark, and Safeway Will Deliver!

FIG. 98

Menu Calendar
◄ March 2002 ►

Meal Planner | Menu Template | Menu Calendar

| Sunday | Monday | Tuesday | Wednesday | Thursday | Friday | Saturday |
|---|---|---|---|---|---|---|
|  |  |  |  |  | 1 | 2 |
| 3 | ☐ In-Laws in Town Menu Template → 4 | ☐ 5 | ☐ 6 | ☐ 7 | ☐ 8 | ☐ 9 |
| ☐ 10 | 11 | 12 | 13 | ☐ Romantic Cabin Getaway Template → 14 | ☐ 15 | ☐ 16 |
| 17 | 18 | 19 | 20 | 21 | 22 | 23 |
| 24 | 25 | 26 | 27 | 28 | 29 | ☐ "Easter Weekend" → 30 |
| ☐ 31 |  |  |  |  |  |  |

[ Delete Checked ]

[ Add a Menu Template ]  [ Add Checked to Todays List ]  [ View Checked ]

FIG. 99

Find the Best Product Price - Select Product

Keyword Search [___] Go

Brand: Holsum
Product: [Thin White Sandwich Bread ▼]

Within: [My Preferred Stores Only ▼]

of this Address/Intersection: [___]
City: [___]
State: [Select One ▼]
Zip Code: [___]

[Back]

[Continue]

Stores & Specials

LOGO

▸ Check Prices on Sunbeam Bread!

LOGO

▸ Save - Try Albertson's Store Brand!

LOGO

▸ Great Taste, Great Price! Check Prices on Weber Sandwich Bread

FIG. 101

Stouffers Lean Cusine - Frozen Entree - Chicken Enchilada

Corn tortilla wrapped around chicken, onions and green chilies. Topped with a sour cream sauce and shredded cheese. Accompanied by a side of rice seasoned with green chilies, red peppers and corn.

9 oz.

Nutritional Information

Servings per Container: 1

|  | Amount Per Serving | % Daily Value |
|---|---|---|
| Calories | 280 | ***** |
| Calories from Fat | 40 | ***** |
| Total Fat | 5 g | 7 % |
| Saturated Fat | 1.5 g | 7 % |
| Polyunsaturated Fat | 1 g | ***** |
| Monounsaturated Fat | 1.5 g | ***** |
| Cholestorol | 25 mg | 8 % |
| Sodium | 520 mg | 8 % |
| Potassium | 340 mg | 10 % |
| Total Carbohydrate | 48 g | 16 % |
| Dietary Fiber | 3 g | 16 % |
| Sugars | 7 g | ***** |
| Protein | 11 g | ***** |
| Vitamin A | ***** | 4 % |
| Vitamin C | ***** | 4 % |
| Calcium | ***** | 15 % |
| Iron | ***** | 4 % |

Product Image

Back

Keyword Search
[      ] Go

Buy It Here...

LOGO

▸ Safeway Guarantees Lowest Prices on Lean Cusine Frozne Enchiladas!

LOGO

▸ AJ's Carries Lean Cusine Frozen Enchiladas-Click to Buy!

LOGO

▸ Check your Local Basha's for Lean Cuisine Frozen Enchiladas!

FIG. 105

INTERACTIVE INTERNET SHOPPING AND DATA INTEGRATION METHOD AND SYSTEM

CROSS-REFERENCES TO RELATED APPLICATIONS

The present application is related to applicant's prior U.S. Provisional Application No. 60/297,207, filed Jun. 7, 2001, entitled "Interactive Internet Shopping and Data Integration Method and System", the contents of all of which are hereby herein incorporated by reference and are not admitted to be prior art with respect to the present invention by their mention in this cross-reference section.

BACKGROUND

The present invention relates generally to shopping for goods and services, and more particularly, to a method and system for interactively shopping for groceries, especially on the Internet, where the user, among other things, is offered the opportunity to create a shopping list, shop for items from the list at one or more selected Grocery Storey stores, arrange for pick up or delivery of the selected items and payment, print the list, or download the list into a personal digital assistant or like device for use in the store, etc.

Recently, a wide range of interactive devices has been developed to provide information to a variety of users via communications networks. These interactive devices include, for example, computers connected to various computer on-line services, interactive kiosks, interactive television systems, a variety of other wired and wireless devices, such as personal data assistants (PDA's), and the like. In particular, the popularity of computer on-line services has grown immensely in popularity over the last decade. Computer on-line services are provided by a wide variety of different companies.

In general, most computer on-line services are accessed via the Internet. The Internet is a global network of computers. One popular part of the Internet is the World Wide Web, or the "Web." The World Wide Web contains computers that display graphical and textual information. Computers that provide information on the World Wide Web are typically called "Web sites." A Web site is defined by an Internet address that has an associated electronic page, often called a "home page." Generally, a home page is an electronic document that organizes the presentation of text, graphical images, audio and video into a desired display. These Web sites are operated by a wide variety of entities, which are typically called "providers."

A user may access the Internet via a dedicated high-speed line or by using a personal computer (PC) equipped with a conventional modem or a variety of other wired and wireless devices. Special interface software, called "browser" software, is installed within the PC or other access device. When the user wishes to access the Internet by normal telephone line, an attached modem is automatically instructed to dial the telephone number associated with the local Internet host server. The user can then access information at any address accessible over the Internet. Two well-known web browsers, for example, are the Netscape Navigator browser marketed by Netscape Communications Corporation and the Internet Explorer browser marketed by Microsoft Corporation.

Information exchanged over the Internet is typically encoded in HyperText Mark-up Language (HTML) format. The HTML format is a scripting language that is used to generate the home pages for different content providers. In this setting, a content provider is an individual or company that places information (content) on the Internet so that others can access it. As is well known in the art, the HTML format is a set of conventions for marking different portions of a document so that each portion appears in a distinctive format. For example, the HTML format identifies or "tags" portions of a document to identify different categories of text (e.g., the title, header, body text, etc.). When a web browser accesses an HTML document, the web browser reads the embedded tags in the document so it appears formatted in the specified manner.

An HTML document can also include hyperlinks, which allow a user to move from one document to another document on the Internet. A hyperlink is an underlined or otherwise emphasized portion of text that, when selected using an input device such as a mouse, activates a software connection module that allows the user to jump between documents or pages (i.e., within the same Web site or to other Web sites). Hyperlinks are well known in the art, and have been sometimes referred to as anchors. The act of selecting the hyperlink is often referred to as "clicking on" the hyperlink.

Some grocery shopping utilizing Internet-based web sites has been available for five or more years, allowing the user to select and purchase for delivery, or pick up, items offered by retailers. Typically these web sites have either been specific to a particular retailer, traditional or web-based, or, more recently, for a limited number of retailers in a particular geographic area.

Despite the availability of these shopping methods, it is well known that users have frequently been unwilling to use these methods for their routine grocery shopping. For example, users must utilize a cumbersome and rigidly structured hierarchical menu to select items for purchase. This approach is counter to the way most people approach grocery shopping, identifying items individually or by relatedness, such as selecting ingredients from a recipe. Additionally, users have been unable to price-compare like items between stores, making it difficult to decide where to shop. In addition users often wish to price-compare brands in the same store quickly, a feature not heretofore readily provided.

Furthermore, it is rarely within the users' coupon resources to locate the specific coupons for most or all of the items on their grocery list for a particular shopping experience. To date, users must select coupons from the newspaper or from Internet-based coupon sources and manually match the coupons to their purchases. This approach of manually matching coupons to purchases results in significant missed opportunities for users. In addition, when users have matched the coupons with their purchases there have been limited methods for redeeming the coupons, except at the time of purchase by physical presentation of the coupon.

Most importantly, Internet grocery shopping has based its revenue generation on delivery fees and charging more for the products purchased by the user. Most, if not all, grocers create separate warehouses for their Internet-based grocery establishments, and therefore, offer a limited selection of items at a higher cost to the user. As evidenced by the number of failures of Internet grocery shopping web sites this arrangement has been largely unsuccessful. Further evidence of the difficulties with existing methods has been the limited number of users attracted to grocery shopping on the Internet.

Finally, users have not been presented with opportunities to utilize other tools to make the shopping effort more efficient and effective. Particularly, users have had to manually maintain reminders, capture items for purchase on scraps of paper or elsewhere to reuse what they need. They have been required to transcribe items required from their own recipes and meal plans onto the previously available web sites. Similarly, they have been required to transcribe quantities from recipes, meal plans and weekly menu plans which can be time consuming and result in items being missed.

OBJECTS OF THE INVENTION

It is an object and feature of the present invention to provide a solution to these above-mentioned problems of the prior art by presenting a new and effective system for interactively shopping for groceries on the Internet—a new approach to grocery shopping by thinking "out of the box".

It is a further object and feature of the invention to require users to register on the web site and provide specific demographic information to be eligible to receive the benefits of use of the web site such as menu creation and coupon downloads; this invention not only stores exact/specific demographic information, but also impels the user to the grocery store (brick and mortar) committed and prepared to shop.

It is a further object and feature of this invention to provide to users the ability to create shopping lists from a simple set of input screens using common text terms (milk, eggs, butter, etc.) and specific products (such as Kraft Sharp Cheddar 4 oz., etc.). It is a further object and feature of this invention that the user can also select relevant products to purchase from a previously completed shopping list.

It is a further object and feature of this invention that the user may elect to have coupons related to the products selected for purchase downloaded for printing or downloaded to the user's "savings card" for the Grocery Store where the selected products will be purchased. Thus, receiving coupons for the selected items is an automatic feature which saves the user time by eliminating the extra effort to create the list by reviewing and selecting coupons; the user automatically receives all available coupons applicable to their purchases.

It is a further object and feature hereof that items are suggested to the user based upon the user's prior shopping habits, and the items with which the user has chosen to create a shopping list (e.g., you select potatoes, butter and chives—the system presents an advertisement for a brand of sour cream). It is a further object and feature of the invention to automatically suggest products to the user based on best regular price or retailer's specials.

Moreover, it is an additional object and feature of this invention to provide users the opportunity to view recipes provided from a variety of sources including food Manufacturers and diet plans and to input and store their own recipes. And it is another object and feature of another aspect hereof to provide users the ability to alter recipes to meet numbers of servings or dietary requirements, including identifying specific products that meet selected dietary preferences whether medical or national popular diet plans or religious, e.g., Kosher, Islamic, etc., and store the changes for future use. And it is another object and feature of another aspect hereof to provide users the ability to include ingredients of any recipe in their current shopping list or to convert a recipe into a shopping list, including converting the user's own recipes into a shopping list.

It is yet another object and feature of another aspect hereof to provide the user the ability to include any recipe, theirs or others, in a meal or menu plan that is stored for the user on the web site. And it is another object and feature of another aspect hereof to provide the user the ability to include any required ingredients of a meal or menu plan in their current shopping list.

It is a further object and feature of the invention to present to users manufacturer's advertisements, grocers' promotion and related item retailer's promotions based on the items included in the user's current shopping list, providing the user the opportunity to take advantage of savings on related products. It is a further object and feature of the invention to allow the user to compare prices and availability of specific products for different retailers or different brands at a single retailer location.

It is a further object and feature of the invention to allow the user to indicate items from the user's shopping list to be included in the user's pantry. It is a further objective and feature of the invention that pantry items may be included on the user's shopping list when the user concludes the items should be purchased.

Moreover, it is another object and feature of another aspect this invention to make available certain diet plans for review and reference by the user, and if the user chooses, to have a selected diet plan's criteria, such as low fat, low salt or specified products, to be used to suggest items as the user selects products based on their shopping list; and, in this manner, the user's grocery list can be filtered (by computer) by dietary requirements and items best matched to the user's needs by the system. And it is a further object and feature hereof to permit the user to view nutritional-content labels for products without having to create a shopping list.

It is a further object and feature of the invention to provide users with the ability to select products as they are shopping and designate them as charitable contributions and to provide the user a summary of the dollar value their total contributions on request, thus making the opportunity to so give to charity effortless. It is a further object and feature of the invention that products selected as charitable contributions be communicated to the retailer for distribution to the selected charitable organization by the retailer.

It is a further object and feature of the invention that all user profiles and purchase history be stored in a database. It is a further object and feature of the invention that analyses of the user profile information and purchasing history are provided to retailers, Manufacturers, coupon clearinghouses, and diet plans and possibly others on a fee basis. It is an additional feature of the invention that users will be allowed to utilize the web site at no charge to them as method for increasing overall usage of the invention.

It is a further object and feature of the invention to utilize a user's personal digital assistant or similar device for collecting shopping list items and uploading those items to the user's storage area on the company's website. It is a further object and feature of the invention to utilize a user's personal digital assistant or similar device for downloading a user's shopping list or the list of specific products to be purchased, organized according to the store's layout, to allow the user to simplify the user's shopping experience at the retailer. It is a further object and feature of the invention to allow the user to print either the shopping list or the specific product list, organized according to the store's layout, including the grocer's code numbers.

It is a still further object and feature of this invention that kiosks are provided within the store for use by customers to do those things of the system of this invention at the store that they might do at their home computer.

And it is a feature of this invention to provide each and every feature and advantage and business method and computer system described, mentioned or suggested anywhere in this application, including all tables, figures, and other material therein, especially including the within Summary of the Invention.

SUMMARY OF THE INVENTION

In accordance with a preferred embodiment thereof, this invention provides Internet web site shopping method and system comprising: database means for storing at least one organized listing of a plurality of grocery item general descriptions; database means for storing information describing at least two unrelated grocery stores; computer processor means for relating at least one particular grocery item to at least one grocery item general description from such at least one organized listing of a plurality of grocery item general descriptions; interface means for user selecting of such at least two unrelated grocery stores; interface means for user selecting of such at least one grocery item general description from such at least one organized listing of a plurality of grocery item general descriptions; computer processor means for presenting such comparison information for such at least one particular grocery item available in such selected at least two grocery stores related to such selected at least one grocery item general description; and interface means for user selecting of such at least one particular grocery item to be purchased at such at least one selected grocery store. Additionally, this invention provides such a system comprising: computer processor means for adding such selected at least one grocery item general description to at least one shopping list; database means for storing such at least one shopping list; interface means for user selecting of such at least one shopping list; interface means for user selecting such at least one grocery item general description from such selected at least one shopping list; and computer processor means for removing such at least on grocery item general description from such at least one shopping list.

Moreover, this invention provides such a system further comprising: computer processor means for receiving at least one recipe from at least one grocery item manufacturer; database means for storing such at least one recipe; computer processor means for displaying such at least one recipe; interface means for user inputting of such at least one recipe; computer processor means for adding such at least one grocery item general description to such at least one recipe; computer processor means for adding such at least one particular grocery item to such at least one recipe; interface means for user selecting of such at least one recipe; computer processor means for adding such at least one grocery item general description from such selected at least one recipe to such at least one shopping list; and computer processor means for adding such at least one particular grocery item from such selected at least one recipe to such at least one shopping list. It also provides such a system further comprising: interface means for user inputting of meal plans; database means for storing meal plans; computer processor means for adding such at least one recipe to such at least one meal plan; computer processor means for adding such at least one grocery item general description to such at least one meal plan; computer processor means for adding such at least one particular grocery item to such at least one meal plan; interface means for user selecting of such at least one meal plan; computer processor means for adding such at least one grocery item general description from such selected at least one meal plan to such at least one shopping list; and computer processor means for adding such at least one particular grocery item from such selected at least one meal plan to such at least one shopping list. And it provides such a system further comprising: interface means for user inputting of menu plans; database means for storing menu plans; computer processor means for adding such at least one meal plan to such at least one menu plan; interface means for user selecting of such at least one menu plan; computer processor means for adding such at least one particular grocery item from such selected at least one menu plan to such at least one shopping list; and computer processor means for adding such at least one grocery item general description from such selected at least one menu plan to such at least one shopping list.

Moreover, this invention provides such a system further comprising: computer processor means for receiving such information describing such at least two unrelated grocery stores; and, also, further comprising: computer processor means for receiving, for each of such at least two grocery stores, such at least one particular grocery item comparison information; and computer processor means for receiving, for each of such at least two grocery stores, shelf location information related to such at least one particular grocery item. And it provides such a system further comprising: computer processor means for adding such selected at least one particular grocery item to at least one purchases list; computer processor means for transferring such at least one purchases list to such selected at least one grocery store; and interface means for permitting user access to at least one shopping web site for such selected at least one grocery store. It also provides such a system further comprising: computer processor means for adding such selected at least one particular grocery item to at least one purchases list; computer processor means for transferring such at least one purchases list to such selected at least one grocery store; interface means for permitting user access to at least one shopping web site for such selected at least one grocery store; interface means for user selecting of such at least one shopping list; interface means for user selecting of at least one such particular grocery item from such selected shopping list; interface means for user selecting of such at least one grocery store; computer processor means for adding such at least one particular grocery item to purchases list for such selected grocery store; and database means for storing such at least one purchases list for such selected grocery store.

Additionally, this invention provides such a system wherein such interface means for user selecting of such at least two grocery stores comprises: interface means for user selecting of at least one preferred shopping area; and interface means for user selecting of such at least two unrelated grocery stores within such at least one preferred shopping area; and, also, further comprising computer processor means for receiving such information describing such at least two unrelated grocery stores; ans, also, further comprising: computer processor means for receiving, for each of such at least two grocery stores, such at least one particular grocery item comparison information; and computer processor means for receiving, for each of such at least two grocery stores, shelf location information related to such at least one particular grocery item. And it provides such a system further comprising: computer processor means for adding such selected at least one particular grocery item to at least one purchases list; computer processor means for transferring such at least one purchases list to such selected at least one grocery store; and interface means for permitting user access to at least one shopping web site for such selected at least one grocery store; and, also, further comprising computer processor means for transferring such at least one purchases list to at least one PDA; and, also, further comprising printer means for printing such at least one purchases list; and, also, further comprising computer processor means for saving such at least one purchases list as such at least one shopping list.

Yet in addition, the present invention provides such a system further comprising: computer processor means for saving such at least one purchases list as at least one pantry list; database means for storing such at least one pantry list; interface means for user selecting of such at least one particular grocery item to be added to such at least one pantry list; interface means for user selecting of such at least one particular grocery item to be removed from such at least one pantry list; interface means for user selecting of such at least one particular pantry list; and computer processor means for adding such at least one particular grocery item from such selected at least one pantry list to such at least one shopping list. And it provides such a system further comprising: interface means for user designating of such at least one particular grocery item included in such at least one purchases list as a charitable donation; and computer processor means for transferring such charitable donation information to such at least one such selected at least one grocery store; and, also, further comprising: interface means for registering such at least one user; database means for storing demographic information of such at least one user; and computer processor means for recording such at least one particular grocery item selected for purchase by such at least one user.

Even further, this invention provides such a system further comprising: computer processor means for receiving at least one grocery item manufacturers' coupon related to such at least one particular grocery item; computer processor means for storing such at least one grocery item manufacturer's coupon information related to such at least one particular grocery item; interface means for displaying such at least one grocery item manufacturer's coupons related to such at least one particular grocery item; computer processor means for transferring such at least one grocery item manufacturer's coupons related to such at least one particular grocery item selected for purchase by such at least one user to such selected at least one grocery store; computer processor transferring such at least one grocery item manufacturer's coupon related to such at least one particular grocery item selected for purchase by such at least one user to at least one PDA; and printer means printing such at least one grocery item manufacturer's coupon related to such at least one particular grocery item selected for purchase by such at least one user. It also provides such a system further comprising: computer processor means for receiving at least one diet plan; database means for storing such at least one diet plan; computer processor means for receiving at least one dietary requirement related to such at least one diet plan; database means for storing such at least one dietary requirement related to such at least one diet plan; interface means for user selecting of such at least one diet plan; computer processor means for relating such at least one dietary requirement of such selected at least one diet plan to such at least one particular grocery item; and computer processor means for presenting such at least one particular grocery item related to both such at least one dietary requirement of such selected at least one diet plan and to such selected at least one grocery item general description ahead of such at least one particular grocery item related only to such selected at least one grocery item general description. And it provides such a system comprising: computer processor means for receiving advertising information; computer processor means for relating such advertising information to such at least one particular grocery item selected for purchase; and computer processor means for presenting to such at least one user such advertising information related to such at least one particular grocery item selected for purchase.

Moreover, according to a preferred embodiment thereof, this invention provides Internet web site shopping method and system comprising the steps of: making arrangements with management of at least two unrelated grocery stores in at least one geographic area to provide descriptive grocery store information for such at least two grocery stores; making arrangements with management of such at least two unrelated grocery stores to provide comparison information for at least one particular grocery item for at least two grocery stores; storing at least one organized listing of a plurality of grocery item general descriptions; retrieving from such at least two unrelated grocery stores such grocery store description information; retrieving from such at least two grocery stores such comparison information for such at least one particular grocery item; storing linkage between at least one such grocery item general description from such at least one organized listing of such plurality of such grocery item general descriptions and such comparison information for such at least one particular grocery item; permitting user selection of such at least two unrelated grocery stores; permitting user selection of such at least one grocery item general description from such at least one organized listing of a plurality of grocery item general descriptions; displaying such comparison information for such at least one particular grocery item available in such selected at least two grocery stores related to such selected at least one grocery item general description; permitting user selection of such at least one particular grocery item to be purchased at such at least one selected grocery store; and storing such selected at least one particular grocery item to be purchased at such at least one selected grocery store as a purchases list.

Also, this invention provides such a system wherein the step of permitting user selection of such at least two unrelated grocery stores further comprises the steps of: permitting user selection of at least one preferred shopping area; and permitting user selection of such at least two unrelated grocery stores within such at least one preferred shopping area. And it provides such a system wherein the step of permitting user selection of such at least one grocery item general description from such at least one organized listing of a plurality of grocery item general descriptions further comprises the steps of: adding such selected at least one grocery item general description to at least one shopping list; and storing such at least one shopping list. It also provides such a system further comprising the steps of: permitting user selection of such at least one shopping list; and permitting user selection of such at least one grocery item general description from selected such at least one shopping list. And it provides such a system further comprising the steps of: recruiting such at least one user; registering such at least one user; storing demographic information of such at least one user; and recording such at least one particular grocery item selected for purchase by such at least one user as user purchases history. And it provides such a system further comprising the step of making arrangements with management of such at least two unrelated grocery store to receive such user purchases history. And it provides such a system further comprising the steps of making arrangements with management of such at least two unrelated grocery stores to provide compensation for receiving such user purchases history; and making arrangements with management of such at least two unrelated grocery stores to provide compensation for display of such at least one particular grocery item available at such at least two unrelated grocery stores.

Yet moreover, this invention provides such a system further comprising the steps of: making arrangements with management of such at least two unrelated grocery stores to accept such at least one purchases list containing such selected at least one particular grocery item; making arrangements with management of such at least two unrelated grocery stores to accept at least one user discount card enrollment information; and making arrangements with management of such at least two unrelated grocery stores to allow such at least one user access to grocery shopping web sites of such at least two unrelated grocery stores. And it provides such a system further comprising the steps of: making arrangements with management of at least one particular grocery item manufacturer to provide nutrition labeling information for such at least one particular grocery item; and making arrangements with management of at least one particular grocery item manufacturer to provide at least one recipe prepared by such at least one particular grocery item manufacturer. And it provides such a system further comprising the steps of: retrieving such nutrition labeling information for such at least one particular grocery item; displaying such nutrition labeling information for such selected at least one particular grocery item; making arrangements with management of such at least one particular grocery item manufacturer to receive user purchases history; and making arrangements with management of such at least one particular grocery item manufacturer to provide compensation for receiving such user purchases history; and making arrangements with management of such at least one particular grocery item manufacturer to provide compensation for presenting such recipe prepared by such at least one particular grocery item manufacturer. And it provides such a system further comprising the steps of: making arrangements with management of at least one coupon clearinghouse to provide coupon information related to such at least one particular grocery item; retrieving such coupon information from such at least one coupon clearinghouse related to such selected such at least one particular grocery item; displaying such coupon information from such at least one coupon clearinghouse related to such selected such at least one particular grocery item; making arrangements with management of such at least two unrelated grocery stores to accept such coupon information related to such selected such at least one particular grocery item; making arrangements with such management of such at least one coupon clearinghouse to receive such user purchases history; and making arrangements with management of such at least one particular grocery coupon clearing house to provide compensation for providing such user purchases history. And it provides such a system further comprising the step of transferring such at least one such coupon information to at least one PDA; and, also, further comprising the step of printing such at least one such coupon information; and, also, further comprising the step of making arrangements with management of such at least two unrelated grocery stores to associate such coupon information related to such selected at least one particular grocery item with such at least one user discount card.

And it provides such a system further comprising the steps of: making arrangements with management of at least one Diet Plan Provider to use at least one diet plan; making arrangements with management of at least one Diet Plan Provider to provide general plan information related to such at least one diet plan; making arrangements with management of at least one Diet Plan Provider to provide at least one dietary requirement related to such at least one diet plan; receiving such general plan information related to such at least one diet plan; receiving such at least one dietary requirement related to such at least one diet plan; storing such general plan information related to such at least one diet plan; storing such at least one dietary requirement related to such at least one diet plan; permitting user selection of such at least one diet plan; relating such at least one dietary requirement of such selected at least one diet plan to such at least one particular grocery item; presenting such at least one particular grocery item related to both such at least one dietary requirement of such selected at least one, diet plan and to such at least one grocery item general description ahead of such at least one particular grocery item related only to such at least one grocery item general description; making arrangements with such management of such at least one Diet Plan Provider to receive user usage pattern information for such at least one diet plan; making arrangements with such management of such at least one Diet Plan Provider to receive such user purchases history; making arrangements with management of such at least one particular Diet Plan Provider to provide compensation for providing such user usage pattern information for such at least one diet plan; and making arrangements with management of such at least one particular Diet Plan Provider to provide compensation for providing such user purchases history. And it provides such a system further comprising the steps of: making arrangements with management of at least one advertising server to receive advertising information related to grocery shopping; making arrangements with management of at least one advertising server to receive advertising information related to such at least one particular grocery item; presenting such advertising information related to grocery shopping; presenting such advertising information related to such at least one particular grocery item relating to such at least one particular grocery item selected for purchase; permitting user selection of such at least one particular grocery item related to such advertising information related to such at least one particular grocery item; and adding such selected at least one particular grocery item to such at least one shopping list.

Even further, this invention provides such a system further comprising the steps of: saving such at least one purchases list as such at least one pantry list; storing such at least one pantry list; permitting user selection of such at least one particular grocery item to be added to such at least one pantry list; permitting user selection of such at least one particular grocery item to be removed from such at least one pantry list; permitting user selection of such at least one particular pantry list; and adding such at least one particular grocery item from such selected at least one pantry list to such at least one shopping list. And it provides such a system further comprising the steps of: permitting user selection of such at least one shopping list; permitting user selection of at least one such particular grocery item from such selected shopping list; permitting user selection of such at least one grocery store; adding such plurality of grocery items to purchases list for such selected grocery store; and storing such at least one purchases list for such selected grocery store. And it provides such a system further comprising the steps of: making arrangements with management of at least two unrelated grocery stores to accept charitable donation information related to such at least one particular grocery item; permitting user designation of such at least one particular grocery item included in such at least one purchases list as a charitable donation; and transferring such charitable donation information to such at least one grocery store. And it provides such a system further comprising the steps of: permitting user input of at least one user recipe; permitting user addition of such at least one grocery item general description to such at least one user recipe; permitting user addition of such at least one particular grocery item to such at least one user recipe; permitting user selection of such at least one user recipe; adding such at least one grocery item general description from such selected at least one user recipe to such at least one shopping list; and adding such at least one particular grocery item from such selected at least one user recipe to such at least one shopping list. And it provides such a system further comprising the steps of: making arrangements with management of at least one particular grocery item manufacturer to provide nutrition labeling information for such at least one particular grocery item; and making arrangements with management of at least one particular grocery item manufacturer to provide at least one recipe prepared by such at least one particular grocery item manufacturer.

Yet in addition, this invention provides such a system further comprising the steps of: displaying such at least one recipe provided by such at least one particular grocery item manufacturer; permitting user selection of such at least one recipe provided by such at least one particular grocery item manufacturer; permitting user modification of such selected at least one recipe provided by such at least one particular grocery item manufacturer; permitting user saving modified such selected at least one recipe provided by such at least one particular grocery item manufacturer as such at least one user recipe; adding such at least one grocery item general description from such selected at least one recipe provided by such at least one particular grocery item manufacturer to such at least one shopping list; and adding such at least one particular grocery item from such selected at least one recipe provided by such at least one particular grocery item manufacturer to such at least one shopping list. And it provides such a system further comprising the steps of: permitting user inputting of at least one meal plan; storing such at least one meal plan; permitting user selection of such at least one user recipe; adding of such selected at least one user recipe to such at least one meal plan; permitting user selection of such at least one recipe provided by such at least one particular grocery item manufacturer; adding such selected at least one recipe prepared by such at least one particular grocery item manufacturer to such at least one meal plan; permitting user addition of such at least one grocery item general description to such at least one meal plan; permitting user addition of such at least one particular grocery item to such at least one meal plan; permitting user selection of such at least one meal plan; permitting user addition of such at least one grocery item general description from such selected at least one meal plan to such at least one shopping list; and permitting user addition of such at least one particular grocery item from such selected at least one meal plan to such at least one shopping list. And it provides such a system further comprising the steps of: permitting user input of at least one menu plan; storing such at least one menu plan; permitting user addition of such at least one meal plan to such at least one menu plan; permitting user selection of such at least one menu plan; adding such at least one particular grocery item from such selected at least one menu plan to such at least one shopping list; and adding such at least one grocery item general description from such selected at least one menu plan to such at least one shopping list. And it provides such a system wherein comparison information for such at least one particular grocery item comprises grocery item manufacturer UPC coding for such at least one particular grocery item; and price information such at least one particular grocery item; and, also, wherein comparison information for such at least one particular grocery item further comprises grocery store shelf location information such at least one particular grocery item; and, also, further comprising the step of transferring such at least one purchases list to at least one PDA; and, also further comprising the step of printing such at least one purchases list.

Even additionally, according to a preferred embodiment hereof, this invention provides a computer software system having a set of instructions for an Internet web site shopping system, such instructions enabling the steps of: storing at least one organized listing of a plurality of grocery item general descriptions; storing information describing at least two unrelated grocery stores; relating at least one particular grocery item to at least one grocery item general description from such at least one organized listing of a plurality of grocery item general descriptions; storing, for each of such at least two unrelated grocery stores, comparison information relating to such at least one particular grocery item; assisting user selection of such at least two unrelated grocery stores; assisting selecting of such at least one grocery item general description from such at least one organized listing of a plurality of grocery item general descriptions; presenting such comparison information for such at least one particular grocery item available in such selected at least two grocery stores related to such selected at least one grocery item general description; and assisting user selection of such at least one particular grocery item to be purchased at such at least one selected grocery store. And it provides such a system further comprising: adding such selected at least one grocery item general description to at least one shopping list; storing such at least one shopping list; assisting user selection of such at least one shopping list; assisting user selection such at least one grocery item general description from selected such at least one shopping list; and removing such at least on grocery item general description from such at least one shopping list. And it provides such a system 2 further comprising: receiving at least one recipe from at least one grocery item manufacturer; storing such at least one recipe; displaying such at least one recipe; assisting user input of such at least one recipe; adding such at least one grocery item general description to such at least one recipe; adding such at least one particular grocery item to such at least one recipe; assisting user selection of such at least one recipe; adding such at least one grocery item general description from such selected at least one recipe to such at least one shopping list; and adding such at least one particular grocery item from such selected at least one recipe to such at least one shopping list.

Yet moreover, this invention provides such a system further comprising: assisting user input of meal plans; storing meal plans; adding such at least one recipe to such at least one meal plan; adding such at least one grocery item general description to such at least one meal plan; adding such at least one particular grocery item to such at least one meal plan; assisting user selection of such at least one meal plan; adding such at least one grocery item general description from such selected at least one meal plan to such at least one shopping list; and adding such at least one particular grocery item from such selected at least one meal plan to such at least one shopping list. And it provides such a system further comprising: assisting user input of menu plans; storing menu plans; adding such at least one meal plan to such at least one menu plan; assisting user selection of such at least one menu plan; adding such at least one particular grocery item from such selected at least one menu plan to such at least one shopping list; and adding such at least one grocery item general description from such selected at least one menu plan to such at least one shopping list. And it provides such a system further comprising receiving such information describing such at least two unrelated grocery stores. And it provides such a system further comprising: receiving, for each of such at least two grocery stores, such at least one particular grocery item comparison information; and receiving, for each of such at least two grocery stores, shelf location information related to such at least one particular grocery item; and, also, further comprising adding such selected at least one particular grocery item to at least one purchases list; transferring such at least one purchases list to such selected at least one grocery store; and assisting user access to at least one shopping web site for such selected at least one grocery store. And it provides such a system further comprising the steps of: assisting user selection of such at least one shopping list; assisting user selecting of a plurality of such particular grocery items from such selected shopping list; assisting user selection of such at least one grocery store; adding such plurality of grocery items to purchases list for such selected grocery store; and storing such at least one purchases list for such selected grocery store. And it provides such a system wherein such at least one computer interface system structured and arranged to assist user selection of such at least two grocery stores comprises: assisting user selection of at least one preferred shopping area; and assisting user selection of such at least two unrelated grocery stores within such at least one preferred shopping area; and, also, further comprising receiving such information describing such at least two unrelated grocery stores.

Still further, this invention provides such a system further comprising: receiving, for each of such at least two grocery stores, such at least one particular grocery item comparison information; and receiving, for each of such at least two grocery stores, shelf location information related to such at least one particular grocery item. And it provides such a system further comprising: adding such selected at least one particular grocery item to at least one purchases list; transferring such at least one purchases list to such selected at least one grocery store; and assisting user access to at least one shopping web site for such selected at least one grocery store; and, also further comprising transferring such at least one purchases list to at least one PDA; and, also, further comprising printing such at least one purchases list; and, also, further comprising saving such at least one purchases list as such at least one shopping list. And it provides such a system further comprising: saving such at least one purchases list as at least one pantry list; storing such at least one pantry list; assisting user selection of such at least one particular grocery item to be added to such at least one pantry list; assisting user selection of such at least one particular grocery item to be removed from such at least one pantry list; assisting user selection of such at least one particular pantry list; and adding such at least one particular grocery item from such selected at least one pantry list to such at least one shopping list. And it provides such a system further comprising: assisting user designation of such at least one particular grocery item included in such at least one purchases list as a charitable donation; and transferring such charitable donation information to such at least one such selected at least one grocery store. And it provides such a system further comprising: assisting registering such at least one user; storing demographic information of such at least one user; and recording such at least one particular grocery item selected for purchase by such at least one user.

Still in addition, this invention provides such a system further comprising: receiving at least one grocery item manufacturers' coupon related to such at least one particular grocery item; storing such at least one grocery item manufacturer's coupon information related to such at least one particular grocery item; assisting displaying such at least one grocery item manufacturer's coupons related to such at least one particular grocery item; transferring such at least one grocery item manufacturer's coupons related to such at least one particular grocery item selected for purchase by such at least one user to such selected at least one grocery store; transferring such at least one grocery item manufacturer's coupon related to such at least one particular grocery item selected for purchase by such at least one user to at least one PDA; and printing such at least one grocery item manufacturer's coupon related to such at least one particular grocery item selected for purchase by such at least one user. And it provides such a system further comprising: receiving at least one diet plan; storing such at least one diet plan; receiving at least one dietary requirement related to such at least one diet plan; storing such at least one dietary requirement related to such at least one diet plan; assisting user selection of such at least one diet plan; relating such at least one dietary requirement of such selected at least one diet plan to such at least one particular grocery item; and presenting such at least one particular grocery item related to both such at least one dietary requirement of such selected at least one diet plan and to such selected at least one grocery item general description ahead of such at least one particular grocery item related only to such selected at least one grocery item general description. And it provides such a system further comprising: receiving advertising information; relating such advertising information to such at least one particular grocery item selected for purchase; and presenting to such at least one user such advertising information related to such at least one particular grocery item selected for purchase.

Definitions, Acronyms and Cross-References

Client-Server—This term is sometimes used herein to refer to a model of interaction in a distributed system in which a program at one site sends a request to a program at another site and waits for a response. The requesting program is called the "client," and the program, which responds to the request, is called the "server." In the context of the World Wide Web, the client is typically a "Web browser", which runs on a user's computer; the program which responds to Web browser requests at a Web site is commonly referred to as a "Web server."

Coupon—This term is sometimes used herein to refer to discounts offered by Manufacturers and others as an incentive to purchase any particular grocery item. Coupons typically include restrictions such as period of validity, quantity of product that must be purchased, and package size limitations Diet Plan Provider—This term is sometimes used herein to refer to companies with develop and market diet plans.

Diet Plan—This term is sometimes used herein to refer to weight loss programs, nutritional programs or other programs designed to manage one or more aspects of food consumption by humans.

Diet Plan Requirement—This term is sometimes used herein to refer to specific directions to be followed by individuals adhering to any particular diet plan. Examples, of diet plan requirements include, but are not limited to, the following: low fat, no fat, low sugar, no sugar, no salt, no carbohydrates, etc. Diet plan requirements may also include specific grocery items such as Weight Watchers brand products.

Domain Name System (DNS)—This term is sometimes used herein to refer to an Internet service that translates domain names (which are alphabetic identifiers) into IP addresses (which are numeric identifiers for machines on a TCP/IP network).

Grocery item—This term is sometimes used herein to refer to specific products commonly sold by Grocery Storey stores. A grocery item is not necessarily limited to food products. Examples may include Kraft Sharp Cheddar Cheese, Miller Lite Beer, etc.

Grocery Item Comparison Information—This term is sometimes used herein to refer to information about a specific grocery item. Comparison information includes, but is not limited to, manufacturer, brand name, product name, container size, price, price per unit, discounts, special offer pricing and nutrition information.

Grocery Item General Description—This term is sometimes used herein to common terms used to refer to grocery items without reference to manufacturer or container size. Examples include: milk, eggs, butter, cheese, green beans, corn, cereal, etc.

Grocery store—This term is sometimes used herein to refer to retail outlets whose primary business is sale of food products to the public from a geographic location. These retail outlets may be owned and managed as a single stores, or owned and managed as group or "chain" of stores.

HyperText Markup Language (HTML)—This term is sometimes used herein to refer to a standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

HyperText Transport Protocol (HTTP)—This term is sometimes used herein to refer to the standard World Wide Web client-server protocol used for the exchange of information (such as HTML documents, and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

Internet—This term is sometimes used herein to refer to a collection of interconnected (public and/or private) networks that are linked together by a set of standard protocols to form a distributed network. While this term is intended to refer to what is now commonly known as the Internet, it is also intended to encompass variations, which may be made in the future, including changes and additions to existing standard protocols.

LAN (Local Area Network)—This term is sometimes used herein to refer to a system that links together electronic office equipment, such as computers and word processors, and forms a network within an office or building.

Meal Plan—This term is sometimes used herein to refer to a list of items to be served for a meal. The list of items to be served may include any or all of the following: typical grocery item descriptions (milk, eggs, etc.), specific grocery items (Kraft Sharp Cheddar Cheese, etc.), recipes by name.

Menu Plan—This term is sometimes used herein to refer to a list of meals to be served on a date or series of dates. A menu plan may include any or all of the following: named meal plans, recipes by name, typical grocery item descriptions, specific grocery items.

PDA (Personal Digital Assistant)—This term is sometimes used herein to refer to a small hand held computer with or without wireless access to the Internet. A lightweight, hand-held, usually pen-based computer used as a personal organizer.

Purchases List—This term is sometimes used herein to refer to a list of specific grocery items the user intends to purchase. The list may include, but is not limited to, the following: brand name, product, UPC code, number of items, package size price per package, extended price, shelf location, etc. The term shopping cart is also sometimes used with the same meaning.

Purchasing Method—This term is sometimes used herein to refer to method used by a shopper to acquire their selected items from any particular store. These methods may include, but are not limited to, delivery, selected items pre-packed and ready for pick up, or a shopping list organized by store which may be printed or downloaded to a PDA.

Recipe—This term is sometimes used herein to refer to a list of ingredients and quantities required to prepare a food item such as macaroni and cheese or turkey tetrazinni. Recipes also generally contain preparation instructions. The list of ingredients my include, but is not limited to, typical grocery item descriptions and specific grocery items.

Shopping Area—This term is sometimes used herein to refer to a geographic area, selected by a user, in which the user wishes to shop for groceries. A shopping area may be based on a specified distance from particular zip code, a specified distance from a specified intersection of streets or the boundaries of specified city, or some other method of selecting a shopping area.

Shopping Cart—This term is sometimes used herein to refer to a list of specific grocery items the user intends to purchase. The list may include, but is not limited to, the following: brand name, product, UPC code, number of items, package size price per package, extended price, shelf location, etc. The term purchases list is also sometimes used with the same meaning.

Shopping List—This term is sometimes used herein to refer to a list of containing grocery items general descriptions and specific grocery items used by users to find and select specific grocery items at selected grocery stores. Items on the shopping list may come from user input, inclusion of recipe ingredients, meal plan grocery items and menu plan grocery items.

Grocery Shopping Web Site Server—This term is sometimes used herein to refer to the web site server on which applicant's system is installed and on which users conduct their shopping.

Transmission Control Protocol/Internet Protocol (TCP/IP)—This term is sometimes used herein to a standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, Internetworking with TCP/IP, Prentice Hall, Inc., ISBNs 0-13-468505-9 (vol. I), 0-13-125527-4 (vol. II), and 0-13-474222-2 (vol. III).

Uniform Resource Locator (URL)—This term is sometimes used herein to refer to a unique address which fully specifies the location of a file or other resource on the Internet. The general format of a URL is protocol://machine address:port/path/filename. The port specification is optional, and if none is entered by the user, the Web browser defaults to the standard port for whatever service is specified as the protocol. For example, if HTTP is specified as the protocol, the Web browser will use the HTTP default port. The machine address in this example is the domain name for the computer or device on which the file is located.

UPC (Universal Product Code)—This term is sometimes used herein to refer to a combination of a bar code and numbers by which a scanner can identify a product and usually assign a price. UPCs are managed by the Uniform Code Council which maintains standards and controls issuance of the manufacturer identification number portion of the code. Each manufacturer is responsible for managing the remainder of the code.

WAN (Wide Area Network)—This term is sometimes used herein to refer to a communications network that uses such devices as telephone lines, satellite dishes, or radio waves to span a larger geographic area than can be covered by a LAN.

Web Site Operator—This term is sometimes used herein to refer to either an entity which has rights to operate the Grocery Shopping Web Site server in the manner intended by this invention under agreement with applicant or to the applicant.

World Wide Web ("Web")—This term is sometimes used herein to refer to generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "World Wide Web" and "Web" are intended to encompass future markup languages and transport protocols that may be used in place of or in addition to the HyperText Markup Language and the HyperText Transfer Protocol.

BRIEF DESCRIPTION OF THE DRAWINGS

FIG. 7 is a use case description of the web site log in process, according to the preferred embodiment of the present invention.

FIG. 8 is a use case description of a product search within a particular zip code process, according to the preferred embodiment of the present invention.

FIG. 9 is a use case description of a user account sign up process, according to the preferred embodiment of the present invention.

FIG. 10 is a use case description of a zip code and store selection process, according to the preferred embodiment of the present invention.

FIG. 11 is a use case description of a shopping list creation process, according to the preferred embodiment of the present invention.

FIG. 12 is a use case description of a saved shopping list access process, according to the preferred embodiment of the present invention.

FIG. 13 is a use case description of a print a shopping list process, according to the preferred embodiment of the present invention.

FIG. 14 is a use case description of a download a shopping list to a personal digital assistant process, according to the preferred embodiment of the present invention.

FIG. 15 is a use case description of a save the current shopping list to a user's account process, according to the preferred embodiment of the present invention.

FIG. 16 is a use case description of a send a shopping list to a store to place an order process, according to the preferred embodiment of the present invention.

FIG. 17 is a use case description of a shopping list item nutritional information request process, according to the preferred embodiment of the present invention.

FIG. 18 is a use case description of an in-store sales and promotions information request process, according to the preferred embodiment of the present invention.

FIG. 19 is a use case description of a request available manufacturer's coupons process, according to the preferred embodiment of the present invention.

FIG. 20 is a use case description of a download or print any manufacturer's coupons process, according to the preferred embodiment of the present invention.

FIG. 21 is a use case description of a sign up for a store savings card process, according to the preferred embodiment of the present invention.

FIG. 22 is a use case description of a look up nutritional content of a food item process, according to the preferred embodiment of the present invention.

FIG. 23 is a use case description of a browse recipes process, according to the preferred embodiment of the present invention.

FIG. 24 is a use case description of a recipe creation process, according to the preferred embodiment of the present invention.

FIG. 25 is a use case description of an edit/delete a recipe process, according to the preferred embodiment of the present invention.

FIG. 26 is a use case description of a define a meal for a menu plan process, according to the preferred embodiment of the present invention.

FIG. 27 is a use case description of a create a meal plan process, according to the preferred embodiment of the present invention.

FIG. 28 is a use case description of an edit/delete a meal process, according to the preferred embodiment of the present invention.

FIG. 29 is a use case description of an alert when food is running low process, according to the preferred embodiment of the present invention.

FIG. 30 is a use case description of a disable/modify alert when food is running low process, according to the preferred embodiment of the present invention.

FIG. 31 is a use case description of a PDA software installation on a personal digital assistant process, according to the preferred embodiment of the present invention.

FIG. 32 is a use case description of a PDA shopping list creation process, according to the preferred embodiment of the present invention.

FIG. 33 is a use case description of a PDA shopping list edit/delete process, according to the preferred embodiment of the present invention.

FIG. 34 is a use case description of a PDA shopping list upload to user account process, according to the preferred embodiment of the present invention.

FIG. 36 illustrates a sample screen presented to the user to log in for complete web site access, according to a preferred embodiment of the present invention.

FIG. 37 illustrates a sample screen presented to the user for completing web site registration, according to a preferred embodiment of the present invention.

FIG. 38 illustrates a sample screen presented to the user for selecting the preferred stores where the user wishes to shop, according to a preferred embodiment of the present invention.

FIG. 39 illustrates a sample screen presented to the user showing the results of selecting preferred stores, according to a preferred embodiment of the present invention.

FIG. 40 illustrates a sample screen presented to the user providing more detailed information about one of the preferred stores, according to a preferred embodiment of the present invention.

FIG. 41 illustrates a sample screen presented to the user for searching for a store using one of several search criteria, according to a preferred embodiment of the present invention.

FIG. 42 illustrates a sample screen presented to the user showing the results of using the search criteria, according to a preferred embodiment of the present invention.

FIG. 43 illustrates a sample screen presented to the user showing selection of an additional preferred store, according to a preferred embodiment of the present invention.

FIG. 44 illustrates a sample screen presented to the user displaying the diet plans available on the web site, according to a preferred embodiment of the present invention.

FIG. 45 illustrates a sample screen presented to the user providing more detailed information about an offered diet plan, according to a preferred embodiment of the present invention.

FIG. 46 illustrates a sample screen presented to the user indicating which diet plan has been selected as preferred, according to a preferred embodiment of the present invention.

FIG. 47 illustrates a sample screen presented to the user after successful completion of the registration process, according to a preferred embodiment of the present invention.

FIG. 48 illustrates a sample screen presented to the user for applying for a store savings card, according to a preferred embodiment of the present invention.

FIG. 49 illustrates a sample screen presented to the user after successfully registering for an in-store savings card, according to a preferred embodiment of the present invention.

FIG. 50 illustrates a sample screen used to search for in-store specials and promotion at a selected store, according to a preferred embodiment of the present invention.

FIG. 51 illustrates a sample screen presented to the user showing the in-store specials for a selected store, according to a preferred embodiment of the present invention.

FIG. 52 illustrates a sample screen used by the user to find available coupons, according to a preferred embodiment of the present invention.

FIG. 53 illustrates a sample screen presented to the user showing the results of a search for available coupons, according to a preferred embodiment of the present invention.

FIG. 56-A illustrates a sample screen used to select grocery item general descriptions for addition to user's shopping list, according to a preferred embodiment of the present invention.

FIG. 56-B illustrates a sample screen which indicates the result of selecting and adding a particular grocery item to the user's shopping list from a product advertisement, according to a preferred embodiment of the present invention.

FIG. 57 illustrates a sample screen presenting a current shopping list to the user, according to a preferred embodiment of the present invention.

FIG. 58 illustrates a sample screen which presents the particular grocery items related to a grocery item general description on the user's current shopping list to the user, according to a preferred embodiment of the present invention.

FIG. 59 illustrates a sample screen presenting a completed purchases list showing the selected particular grocery items and remaining grocery item general descriptions which have not been resolved to the user, according to a preferred embodiment of the present invention.

FIG. 61 illustrates a sample screen indicated to the user that the purchases list has been used to update the user's pantry list, according to a preferred embodiment of the present invention.

FIG. 62 illustrates a sample screen a printed version of a purchases list and related coupons for a preferred store, according to a preferred embodiment of the present invention.

FIG. 63 illustrates a sample screen which presents a list of saved shopping list to the user, according to a preferred embodiment of the present invention.

FIG. 64 illustrates a sample screen presenting the detail of grocery item general descriptions and particular grocery items contained in a specific saved shopping list, according to a preferred embodiment of the present invention.

FIG. 65 illustrates a sample screen providing nutritional information for a product as requested by the user, according to a preferred embodiment of the present invention.

FIG. 67 illustrates a sample screen presented to the user for searching for a store using one of several search criteria, according to a preferred embodiment of the present invention.

FIG. 68 illustrates a sample screen which allows the user to select which stores will be added to the user's list of preferred stores, according to a preferred embodiment of the present invention.

FIG. 69 illustrates a sample screen which presents the result of adding an additional preferred store to the user's list of preferred stores, according to a preferred embodiment of the present invention.

FIG. 70 illustrates a sample screen where the user has selected which stores will be searched for the lowest prices for selected items, according to a preferred embodiment of the present invention.

FIG. 71 illustrates a sample screen displaying the purchases list of particular items to be purchased at a specific store, according to a preferred embodiment of the present invention.

FIG. 72 illustrates a sample screen for the user account home page (My Shark), according to a preferred embodiment of the present invention.

FIG. 73 illustrates a sample screen presents a list of the items currently in the user's pantry list, according to a preferred embodiment of the present invention.

FIG. 74 illustrates a sample screen presenting suggested recipes matching the items checked from the pantry list, according to a preferred embodiment of the present invention.

FIG. 75 illustrates a sample screen presents the details of one of the suggested recipes matching the items checked from the pantry list, according to a preferred embodiment of the present invention.

FIG. 76 illustrates a sample screen which confirms that a manufacturer's recipe has been added to the user's recipe list, according to a preferred embodiment of the present invention.

FIG. 77 illustrates a sample screen presenting the recipes home page to the user, according to a preferred embodiment of the present invention.

FIG. 78 illustrates a sample screen used by a user to create a recipe and save it on the web site, according to a preferred embodiment of the present invention.

FIG. 79 illustrates a sample screen for adding a grocery item general description to user's recipe, according to a preferred embodiment of the present invention.

FIG. 80 illustrates a sample screen for adding a particular grocery item to user's recipe, according to a preferred embodiment of the present invention.

FIG. 81 illustrates a sample screen for classifying a user's recipe for ease of searching later, according to a preferred embodiment of the present invention.

FIG. 82 illustrates a sample screen shows the results of classifying a specific user's recipe, according to a preferred embodiment of the present invention.

FIG. 83 illustrates a sample screen presenting a user's list of meals stored by the system, according to a preferred embodiment of the present invention.

FIG. 84 illustrates a sample screen which supports the user's creation of a new meal, according to a preferred embodiment of the present invention.

FIG. 85 illustrates a sample screen shows the result of adding a grocery item general description to a selected meal, according to a preferred embodiment of the present invention.

FIG. 86 illustrates a sample screen shows the result of adding a particular grocery item to a selected meal, according to a preferred embodiment of the present invention.

FIG. 87 illustrates a sample screen shows the combined result of adding items to the selected meal the user, according to a preferred embodiment of the present invention.

FIG. 88 illustrates a sample screen for searching for a recipe that may be added to a meal, according to a preferred embodiment of the present invention.

FIG. 89 illustrates a sample screen presents the results of searching for a recipe that may be added to a meal, according to a preferred embodiment of the present invention.

FIG. 90 illustrates a sample screen showing the result of adding a recipe to a meal, according to a preferred embodiment of the present invention.

FIG. 91 illustrates a sample screen presents an updated meal list after a meal has been saved, according to a preferred embodiment of the present invention.

FIG. 92 illustrates a sample screen presenting a list of menu templates for a user, according to a preferred embodiment of the present invention.

FIG. 93 illustrates a sample screen presenting a user's list of menu templates stored by the system, according to a preferred embodiment of the present invention.

FIG. 94 illustrates a sample screen showing a list of meals that may be added to a menu template, according to a preferred embodiment of the present invention.

FIG. 95 illustrates a sample screen showing the result of adding a selected meal to the menu template, according to a preferred embodiment of the present invention.

FIG. 96 illustrates a sample screen showing a competed plan for a specific day in the menu template, according to a preferred embodiment of the present invention.

FIG. 97 illustrates a sample screen that presents a summary of the meals planned for each day covered by the menu template, according to a preferred embodiment of the present invention.

FIG. 98 illustrates a sample screen presenting the results of saving the updated menu template, according to a preferred embodiment of the present invention.

FIG. 99 illustrates a sample screen presents a calendar form summarizing all dates for which a menu template has been prepared and saved, according to a preferred embodiment of the present invention.

FIG. 101 illustrates a sample screen showing product selection as the second step in finding the best price for a particular grocery item, according to a preferred embodiment of the present invention.

FIG. 105 illustrates a sample screen presenting the results of searching for the nutrition information on a particular grocery item, according to a preferred embodiment of the present invention.

DETAILED DESCRIPTION OF THE PREFERRED EMBODIMENTS OF THE INVENTION

Figure 1:
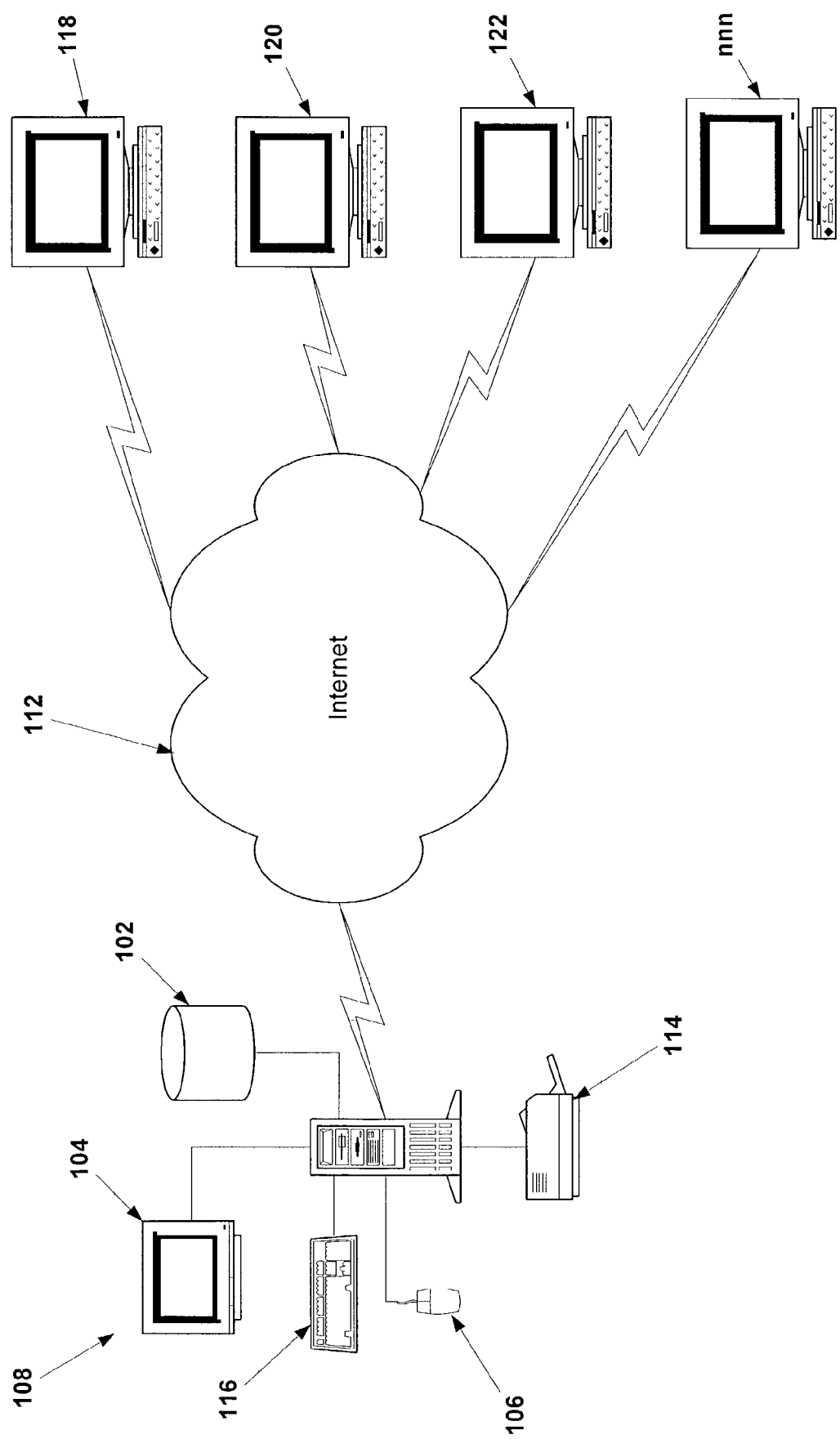
FIG. 1 illustrates an overview of the hardware architecture of the Internet.

According to a preferred embodiment of the present invention, a business method and software system is described with features for interactively shopping for groceries and related household products, especially on the Internet, where the user may create a shopping list, shop for items from the list at one or more selected Grocery Store stores, arrange for pick up or delivery of the selected items and payment, print the list, or download the list into a PDA or like device for use in the store, etc.

System and Method Overview

In various embodiments of the system of the present invention, which may embody an appropriate method, apparatus, system configuration and/or computer software (defined as a computer readable medium, for example CD ROM, DVD ROM, floppy disk), are provided which implement the system of grocery shopping described herein.

According to one preferred embodiment of this invention, this system provides the means for a user to create, maintain and utilize personal shopping lists using common text terms (milk, eggs, butter, etc.) and specific products (such as Kraft Sharp Cheddar 4 oz., etc.) that, in turn, are used to select the desired products and services from selected retailers, the list of selected products may then be downloaded to the retailers' system or printed by the user for use in personally purchasing the selected products.

Selected items downloaded to the retailers' system will include instructions as to whether the products should be delivered or packed for pick up by the user. According to a preferred embodiment of the present invention, the shopping list is sent to the store's system and the store takes it from there, including payment, delivery time, availability of items being delivered/picked-up, etc. Further, according to a preferred embodiment hereof, the present system preferably divides the list into perishables and non-perishables and then sends the list to the store system; then the store verifies items to be gathered and sets up a pick-up time. The present system permits the user to print the shopping list which is divided into perishables and non-perishables, so the user knows which perishables the user needs to pick up in addition to those bagged.

All user payments for selected products, whether for delivery or packed for pick up, are arranged through the retailers' e-commerce or similar system. Shopping on the Internet and e-commerce are well known, but within the grocery segment of retailing many attempts have failed because the approaches did not adequately consider users' needs or how users prepare for a trip to the supermarket. To enlarge and enhance the user's shopping experience and make use of the users' normal shopping habits and facilitate the use of such systems, users must be provided a number of simple and powerful tools that support and extend the grocery buying experience.

According to an additional preferred embodiment of this invention, this system provides the functions outlined above and includes functions: to access predefined recipes, to create personal recipes, to modify any recipe, to create, modify and delete meal plans and menu plans, to access diet plans, to select a specific diet plan and for the selected recipes, meal and menu plans and diet plans to update the user's shopping list.

According to another preferred embodiment of this invention, the system provides the functions outlined above and provides functions to display the availability of coupons that can then be automatically linked to the products selected, then the coupons can either be printed or downloaded to the user's savings card for the retailer for deduction at the time of payment by the user. Functions are provided to facilitate access to nutrition label information and price comparisons of the same product for multiple retailers and price comparison of similar products at a particular retailer location.

Certain embodiments of the present invention will now be described with reference to the figures.

Internet Environment

Referring now to FIG. 1, an overview of the computer hardware environment of a preferred embodiment of the present invention is shown. The present invention preferably comprises a computer system 108. The computer system 108 comprises input and output devices as is well known in the art. For example, the computer system 108 preferably comprises a display screen or monitor 104, a keyboard 116, a printer 114, a mouse 106, etc. The computer system 108 further preferably comprises a database 102 for storage of the data and software comprising preferred embodiments of the present invention. The computer system 108 is preferably connected to the Internet 112 that serves as the presently preferred communications medium. The Internet 112, as previously discussed, comprises a global network of networks and computers, public and private. The Internet 112 is the preferable connection method by the users 118, 120, 122 and nnn in preferred embodiments of the present invention.

Figure 2:
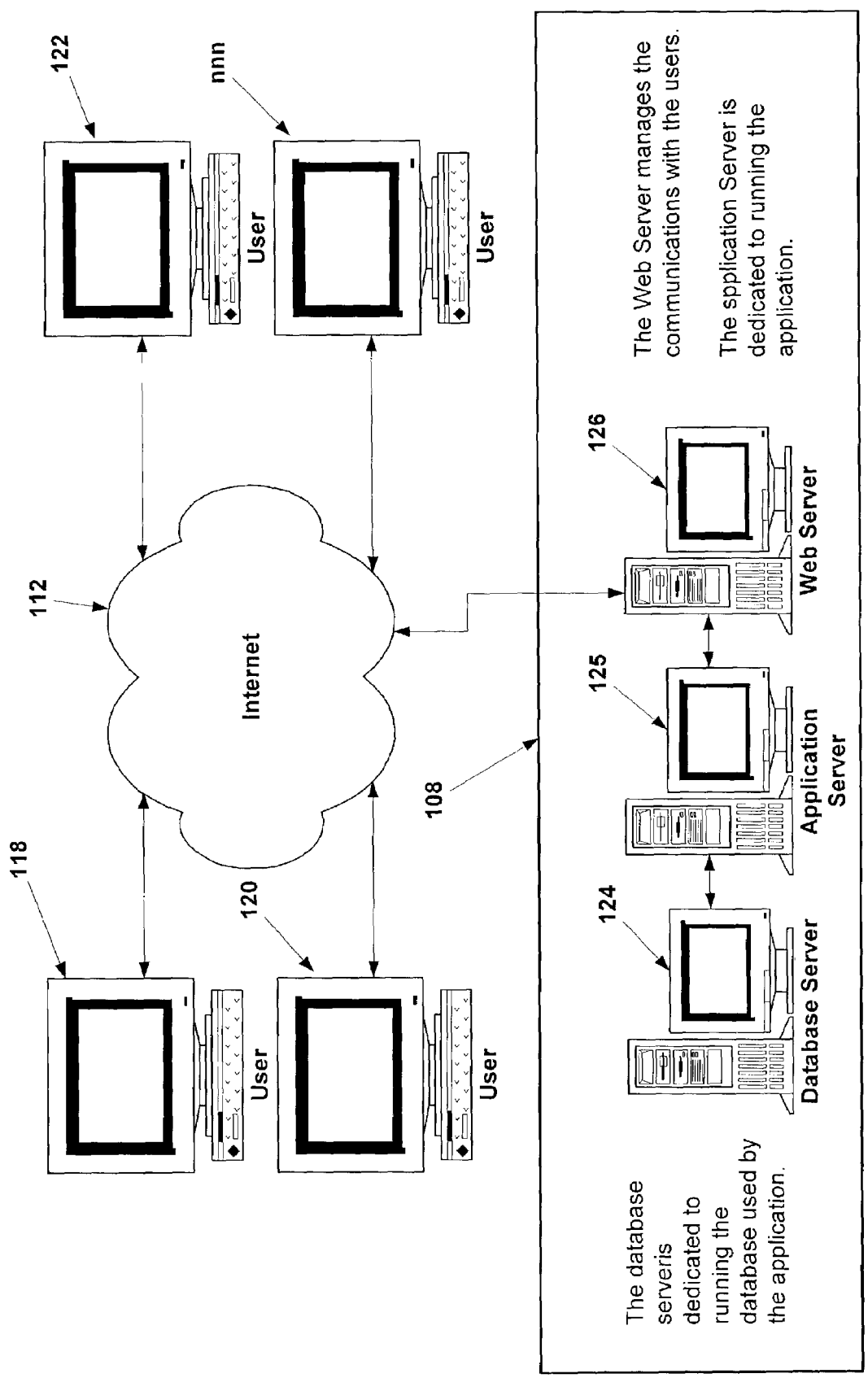
FIG. 2 illustrates a typical hardware structure of a typical website where the primary web site functions are shared between three computers.

Referring now to FIG. 2, the computer system 108 is shown in more detail. The computer system 108 in a preferred embodiment comprises a database server 124, an application server 125 and a web server 126. The database server 124 preferably runs the database engine. The application server 125 preferably manages the preferred application software. The web server 126 also preferably operates only as the web server.

Figure 3:
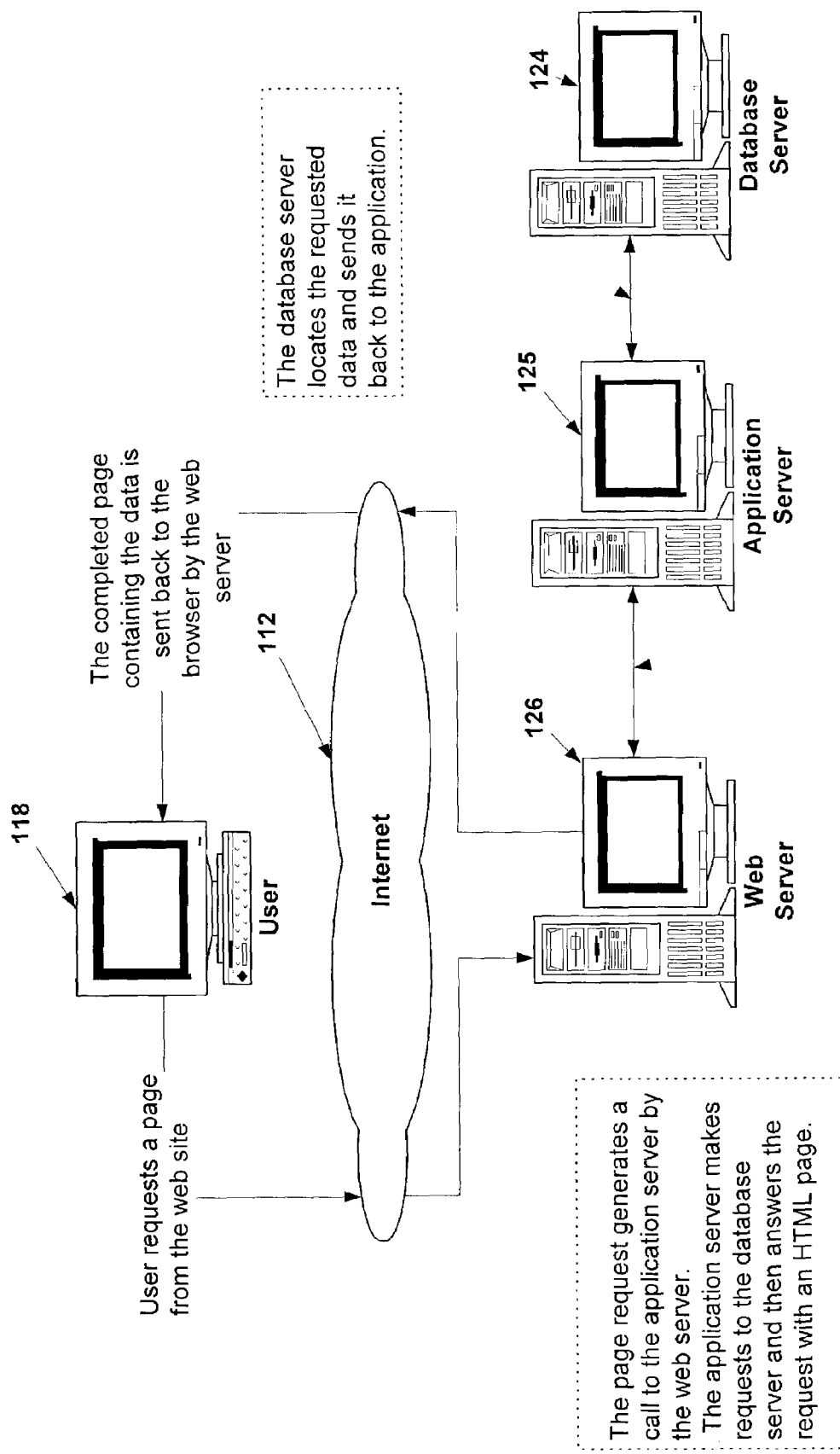
FIG. 3 illustrates the typical communications between the web site components and the user's workstation.

Referring to FIG. 3, a simplified functional diagram of a preferred embodiment of the present invention is shown. This figure shows the preferred relationships between a user 118 (exemplary of any number of users 118, 120, 122, nnn), the internet 112, the web server 126, the application server 125 and the database server 124. As shown, a user 118 requests a page from the web site of the present invention. The user 118 is preferably connected via the internet 112, and the web page request initiates a call to the present invention. The present invention then makes at least one request to the database server 124, and generates an HTML page for transmission to the user 118 following the database server's completion of the present invention's request and transmission of the requested data back to the web server 126. The web server 126 transmits the completed HTML page containing the data requested by the user 118 through the Internet 112 to the user 118.

System Architectures

Figure 4:
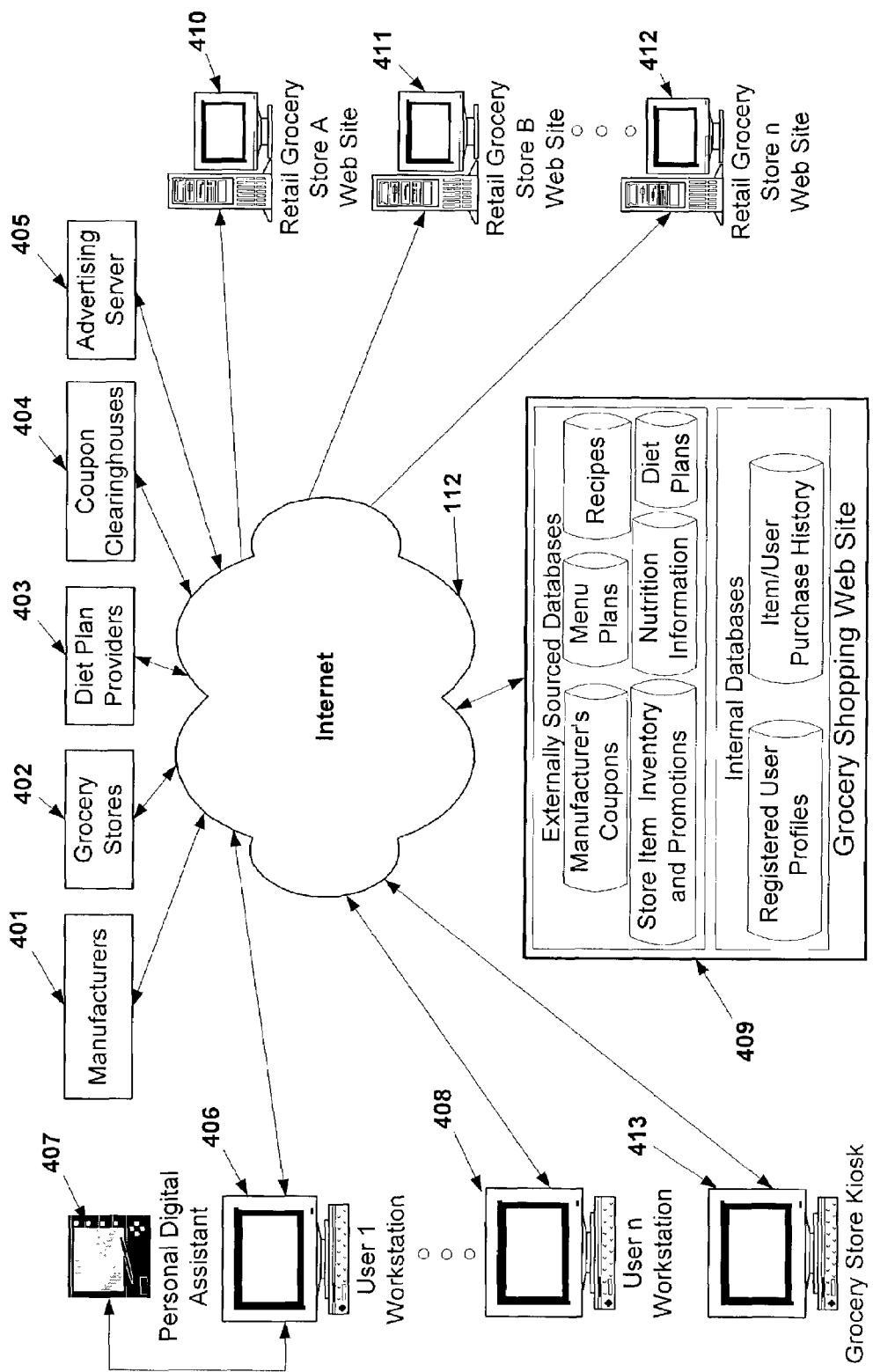
FIG. 4 illustrates an overview of the web site shopping system implemented in an Internet environment, according to a preferred embodiment of the present invention.

The system architecture of a preferred embodiment of the present invention is illustrated with reference to FIG. 4. As shown in FIG. 4, this system includes the Grocery Shopping Web Site server 409 and required data bases, configured to communicate with one or more users' workstations 406, kiosks 413 at the located grocery store, or similar devices capable of accessing web sites 408 and the providers of the advertising (Advertising Server 405), diets (Diet Plans 403), nutrition information and recipes (Manufacturers 401), store item inventory and promotions (Grocery Stores) and manufacturers' coupons (Coupon Clearinghouses 404) for providing advertising and information to users based on demographics and shopping list items, and retailer grocer web sites 410 411 412 for exchange of products selected for purchase (collectively nodes). Each node is preferably connected directly or indirectly to the web site server via a connection to a network, such as a local area network (LAN), a wide area network (WAN), the Internet or the like, via a public switched phone network, dedicated data line, cellular network, Personal Communication System, microwave, satellite networks, cable or the like. Additionally, in a preferred embodiment of the present invention, personal digital assistants 407 may be configured to communicate with users' workstations 406 for sending and receiving shopping lists information.

According to a preferred embodiment, applicant's Grocery Shopping Web Site server 409 is implemented as a single general-purpose computer as described below. In another embodiment, the functionality of the Grocery Shopping Web Site server 409 is distributed over a plurality of computers. In that embodiment, the Grocery Shopping Web Site server 409 is configured in a distributed architecture, wherein the database and processors are housed in separate units or locations and connected via a network connection such as those discussed above. Those skilled in the art will appreciate that an almost unlimited number of controllers may be supported. This arrangement provides a more dynamic and flexible system, which is less prone to catastrophic hardware failures affecting the entire system.

In the embodiment shown in FIG. 4 the Grocery Shopping Web Site server 409 is preferably implemented as a single general purpose computer including a central processing unit (CPU), random access memory (RAM), read-only memory (ROM), an input device, a communications port, a clock, and a mass storage device for storing the Registered User Profiles database, the Menu Plans database, the Diet Plans database, the Item/User Purchase History database, the Nutrition Information database, the Recipes database, the Store Inventory and Promotions database, and the Manufacturer's coupons database. The CPU comprises a conventional microprocessor such as an Intel Pentium processor electrically coupled to each of the other components of the Grocery Shopping Web Site server 409.

The CPU executes program code stored in one or more of ROM, RAM and mass storage devices to carry out the functions and acts described in connection with the Grocery Shopping Web Site server 409. The CPU comprises at least one high-speed digital data processor adequate to execute program modules for all application functions including, but not limited to executing user login, shopping list creation, presentation of information from the various databases, downloading to retailers and other devices, capturing item and user purchase history, interacting with other external databases for retrieval and distribution of data, and reporting processes. The modules are further described in connection with FIGS. 7-105. The CPU interacts with ROM, RAM and the mass storage device to execute stored program code according to conventional data processing techniques.

According to one embodiment of the invention, as shown in FIG. 4, each user workstation device is a browser based system implemented as a single interactive visual display device, audio device or other like interactive device such as a general purpose computer, phone, or interactive television system. There are many commercial software programs that can enable the communications required by the user workstations with the Grocery Shopping Web Site server 409, the primary function being transmission and reception of data through the Internet and presentation of data to the user. Examples of such software programs include the Netscape Navigator browser by Netscape Corporation and the Internet Explorer browser by Microsoft Corporation.

Each user workstation 406 408 is capable of communicating directly and indirectly with the Grocery Shopping Web Site server 409. Communication between the user workstation and the Grocery Shopping Web Site server 409 is electronic, preferably by means of the Internet, and preferably includes conventional high-speed connection employing known communication protocols, such as TCP/IP, and is capable of decrypting and encrypting data received and transmitted between nodes.

According to a preferred embodiment of the invention, as shown in FIG. 4, communication between the Grocery Shopping Web Site server 409 and the Grocery Storey Store Web Site servers is usual for networks such as the Internet and is conducted as those skilled in the art will, under appropriate circumstances, deem efficient.

According to a preferred embodiment of the invention, as shown in FIG. 4, communication between the user workstation 406 408 and the personal digital assistant 407 is usual for peripheral connections and is conducted as those skilled in the art will, under appropriate circumstances, deem efficient.

According to one embodiment of the invention, as shown in FIG. 4, communication between the Grocery Shopping Web Site server 409 and the providers of the advertising (Advertising Server 405), diets (Diet Plans 403), nutrition information and recipes (Manufacturers 401), grocery stores item inventory and promotions and manufacturer's coupons (Coupon Clearinghouses 404) databases for downloading and updating is usual for networks such as the Internet and is conducted as those skilled in the art will, under appropriate circumstances, deem efficient.

Business Method

Figure 5:
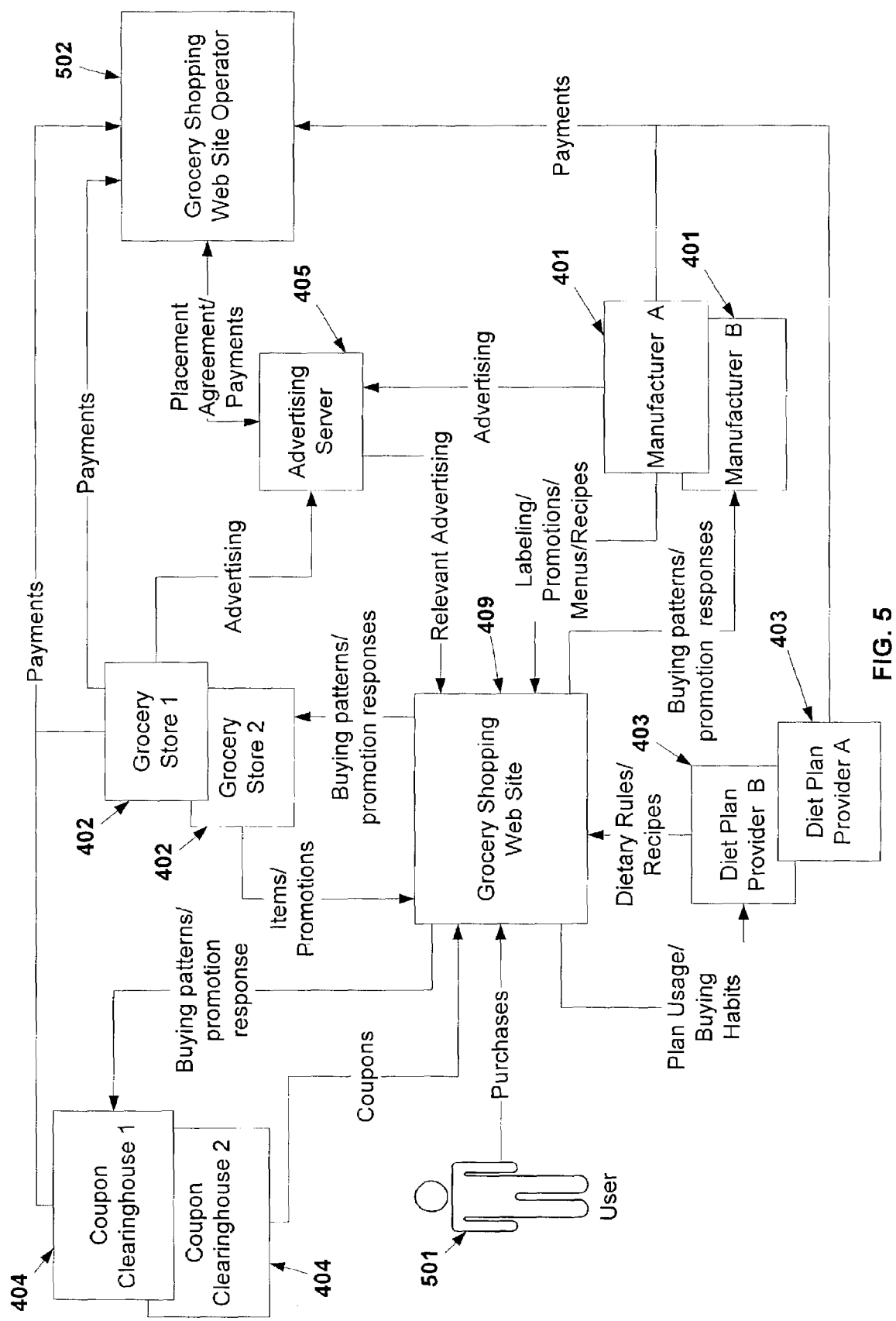
FIG. 5 illustrates applicant's business method of an Internet web site shopping system, according to a preferred embodiment of the present invention.

The business method of one embodiment of the present invention is illustrated with reference to FIG. 5. As shown in FIG. 5, the method preferably includes the company (e.g., Grocery Shopping Web Site Operator), its web site and a variety of business and data relationships, which provide data to and receive data from the web site for the purpose of providing an on-line interactive grocery shopping service to users as described above. Each of the business and data sharing relationships are further described below.

In a preferred embodiment of the invention, the Grocery Shopping Web Site Operator 502 will preferably provide users 501 access to the Grocery Shopping Web Site 409 (as an example for use in this application), upon providing certain demographic information as part of a registration process, for the purpose of completing shopping lists, redeeming coupons, planning menus and meals, assisting users 501 with dietary maintenance, viewing recipes, selecting specific products or services from a selected Grocery Store and arranging payment and receipt of the selected items. Registered users 501 will preferably have access to all the Grocery Shopping Web Site 409 services at no charge.

In a preferred embodiment of the invention, the Grocery Shopping Web Site Operator 502 will preferably complete a business relationship with one or more Coupon Clearinghouses 404 which will have the effect of the Coupon Clearinghouses 404 providing current manufacturer's coupon data to the Grocery Shopping Web Site 409 for reference and use by users 501 as part of their shopping process on the Shopping website. As a further aspect of the business relationship with the Coupon Clearinghouse 404, the Grocery Shopping Web Site Operator 502 will optionally provide market analysis data including information regarding demographic profiles of users 501, their responses to particular promotions, coupon campaigns and related data about their buying patterns. As a further aspect of the business relationship with the Coupon Clearinghouses 404, the Grocery Shopping Web Site Operator 502 will receive payment for the market analysis information provided to the Coupon Clearinghouses 404.

In a preferred embodiment of the invention, the Grocery Shopping Web Site Operator 502 will preferably complete a business relationship with one or more Grocery Stores 402, which may be individual stores or supermarket chains as the opportunities are presented, which will have the effect of the Grocery Stores 402 providing detailed information regarding product inventory, pricing and promotion and item location data to the Grocery Shopping Web Site 409 for reference and use by users 501 as part of their shopping process on the Shopping website. As a further aspect, the Grocery Store 402 will preferably permit the Grocery Shopping Web Site Operator 502 to interface with the systems of the Grocery Stores 402 for the transfer of information regarding items purchased, savings card sign up and coupons being redeemed so that the user 501 may complete their shopping process with the Grocery Store 402 as efficiently as possible. As another aspect of the business relationship with the Grocery Stores 402, the Grocery Shopping Web Site Operator 502 will optionally provide market analysis data including information regarding demographic profiles of users 501, their responses to particular promotions, coupon campaigns and related data about their buying patterns. As a further aspect of the business relationship with the Grocery Stores 402, the Grocery Shopping Web Site Operator 502 will preferably receive payment for the market analysis information provided to the Grocery Stores 402 and for each savings card user 501 that is registered on the Grocery Shopping Web Site 409. Payments for Store positioning of products in the shopping list In a preferred embodiment of the invention, the Grocery Shopping Web Site Operator 502 will preferably complete a business relationship with one or more Diet Plan Providers 403 (such as Weight Watchers, Atkins, or Jenny Craig) which will have the effect of the Diet Plan Providers 403 providing their current diet plan and recipe data to the Grocery Shopping Web Site 409 for reference and use by users 501 as part of their shopping process on the Shopping website, thus creating a cross-marketing between The Grocery Shopping Web Site Operator 502 and Diet Plan Providers 403. The Grocery Shopping Web Site Operator 502 will also assist users 501 of Diet Plan Provider 403 in making their diets "a way of life", the goal of the diet plan company. As a further aspect of the business relationship with the Diet Plan Providers 403, the Grocery Shopping Web Site Operator 502 will optionally provide market analysis data including information regarding demographic profiles of users 501, their responses to particular plan and recipe usage, product (if any) purchases and related data about their buying patterns. As a further aspect of the business relationship with the Diet Plan Providers 403, the Grocery Shopping Web Site Operator 502 will preferably receive payment for providing this market analysis information to the Diet Plan Providers 403.

In a preferred embodiment of the invention, the Grocery Shopping Web Site Operator 502 will preferably complete a business relationship with one or more Manufacturers 401 (of grocery products and related items sold by Grocery Stores 402) which will preferably have the effect of the Manufacturer's providing current manufacturer's product promotions, nutrition labeling and recipe data to the Grocery Shopping Web Site 409 for reference and use by users 501 as part of their shopping process on the Shopping website. As a further aspect of the business relationship with the Manufacturer, the Grocery Shopping Web Site Operator 502 will optionally provide market analysis data including information regarding demographic profiles of users 501, their responses to particular promotions, coupon campaigns and related data about their product buying patterns. As a further aspect of the business relationship with the Manufacturers 401, the Grocery Shopping Web Site Operator 502 will preferably receive payment for providing the market analysis information to the Manufacturers 401.

In a preferred embodiment of the invention, the Grocery Shopping Web Site Operator 502 will preferably complete a business relationship with one or more Advertising Servers 405 (such as Open AdStream, DoubleClick and others) which will preferably have the effect of the Advertising Servers 405 providing current Manufacturer's product and other promotional advertising to the Grocery Shopping Web Site 409 for reference and use by users 501 as part of their shopping process on the Shopping website. As a further aspect of the business relationship with the Advertising Servers 405, the Grocery Shopping Web Site Operator 502 will optionally provide market analysis data including information regarding demographic profiles users 501, their responses to particular promotions, coupon campaigns and related data about their buying patterns. As a further aspect of the business relationship with the Advertising Servers 405, the Grocery Shopping Web Site Operator 502 will preferably receive payment for providing the market analysis information provided to the Advertising Servers 405.

System Processes Overview

Figure 6:
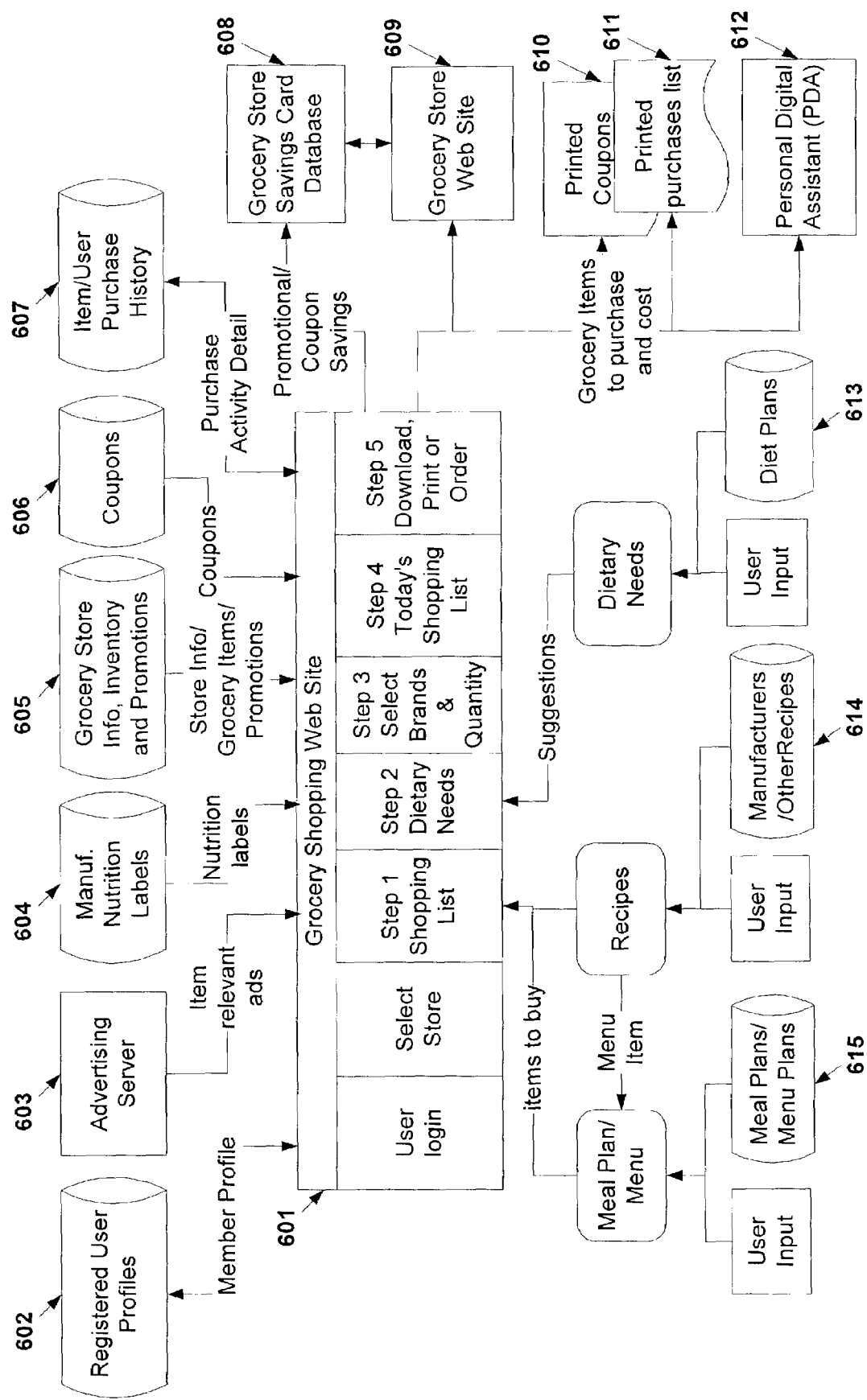
FIG. 6 illustrates the overall shopping flow for a user using applicant's Internet web site shopping system and method, according to a preferred embodiment of the present invention.

The system processes of a preferred embodiment of the present invention are illustrated with reference to FIG. 6. FIG. 6 illustrates the primary process for users to utilize the Grocery Shopping Web Site 601 to shop for groceries utilizing all the relevant information available from their workstation connected to the Internet or any workstation anywhere that is connected to the Internet.

As shown in FIG. 6, the system may manage any or all of (1) user registration and login referencing and/or updating Registered User Profiles 602, (2) user's selection of a preferred grocery store, (3) Step 1 user creation of a shopping list, (4) Step 2, along with item 13 of the list of this paragraph, the user's consideration of special dietary needs as they relate to products to be purchased from the shopping list, (5) Step 3 user's selection of specific products to satisfy to shopping list requirements, (6) Step 4 presentation to the user of the products selected and total cost, (7) Step 5 the user's decision as to whether the selected products will be sent to the selected Grocery Store Web Site 609, or a purchases list 611 printed or downloaded to a Personal Digital Assistant 612 for use by the user in the store, (8) the download of completed shopping list to the selected Grocery Store Web Site 609 for delivery to the user or bagging and pickup by the user, (9) the download of the list of products to a PDA 612, (10) printing of the purchases list 611 on the user's printer, (11) downloading, storing and managing manufacturers' and others' meal plans and menu plans 615 and user's creation and storage of meal plans and menu plans and the insertion of items required into the user's current shopping list, (12) user's creation and storage of personal recipes and the insertion of items required into the user's current shopping list, (13) user's selection of a diet plan which may preferably be used to suggest particular grocery items that satisfy the diet plan requirements, for example low-sodium and/or low-fat particular grocery items, during shopping, (14) creation of pantry lists from purchases lists or through user input to server as shopping reminders, (15) requesting, receiving and management of advertising 603 presented to the user which is relevant to items appearing on the user's current shopping list, (16) downloading, storing, managing and presenting manufacturer's nutrition label information 604 to any user on request of the user, (17) downloading, storing and managing each participating store's information, particular item inventory information and in-store promotion 605, (18) downloading, storing and managing coupons 606 from manufacturer's coupon and special promotion information for presentation and use by the user, (19) downloading user's savings from coupons to the selected grocery store's savings card database 608 for update by the grocery store of the user's savings card which then can be applied as a reduction in the user's total cost at the time of payment, (20) printing of the coupons 610 on the user's printer, and/or (21) collection and storage of all relevant purchasing history of the user, products, advertising and coupons 607 for use in reporting and analysis of user's buying habits and patterns.

Detail of System Processes

Each of the numbered items identified above is further discussed here, arranged in "scenarios" which demonstrate the preferably significant aspects of the system and method.

Registration (Items (1), (2), (13))

Figure 35:
FIG. 35 illustrates a sample web site home page screen presented to the user, according to a preferred embodiment of the present invention.

A user preferably begins a session by accessing the web site home page which is illustrated in FIG. 35. Preferably a user my access most functions of the without being logged in, but preferably can not complete the shopping process by transferring their purchases list to a selected grocery store of save any of their work. Therefore, users are preferably encouraged to register and log in each time. As shown in FIG. 36 preferably the user is given the option of logging in using an assigned ID and password, if previously registered, or registering for the first time. The preferred steps of the use case "Web site log in" are illustrated in FIG. 7. To register, as shown in FIG. 37 a new user is required to complete specific demographic information identify their preferred grocery store, pick an ID and password and agree to the user agreement. The preferred registration steps of the "User account sign up" use case are provided in FIG. 9. Preferably, after successful completion of registration users are provided the opportunity to select specific grocery stores location near the address they entered as illustrated in FIG. 38. Preferably, selection of particular stores associates them with a user's profile and the selected stores are used as defaults for the user's further shopping. The association of selected grocery stores with a user's profile is illustrated in FIG. 39. The preferred steps of the "Zip code and store selection" use case are provided in FIG. 10. A user may preferably request additional information, including a location map, about a particular store by selected the store's name as illustrated in FIG. 40.

If users wish to find other stores, for instance not near their entered addresses, preferably they will use the Advanced Store Search as illustrated in FIG. 41. This function preferably allows the location and selection of stores which might be used when traveling or for shopping for a family member in another city. The results of the Advanced Store Search are shown in FIG. 42. Users may select a store from the list of stores found by the Advanced Store Search as an additional preferred grocery store as illustrated in FIG. 43.

Finally, users are given the opportunity to review the various diet plans offered on the web site as illustrated in FIG. 44. An example of the preferred types of information provided is shown in FIG. 45. Preferably, users may optionally choose to add the selected diet to their profile, for reference during shopping, after reviewing the diet information. The result of choosing to add a diet to a profile is demonstrated in FIG. 46. After considering the diet plans available on the grocery shopping web site, the registration process is preferably complete as illustrated by FIG. 47. After completing the registration process users may access all user functions of the grocery shopping web site.

Savings Card Application/In-Store Savings/Manufacturer Coupon Use Case 21

Figure 48:
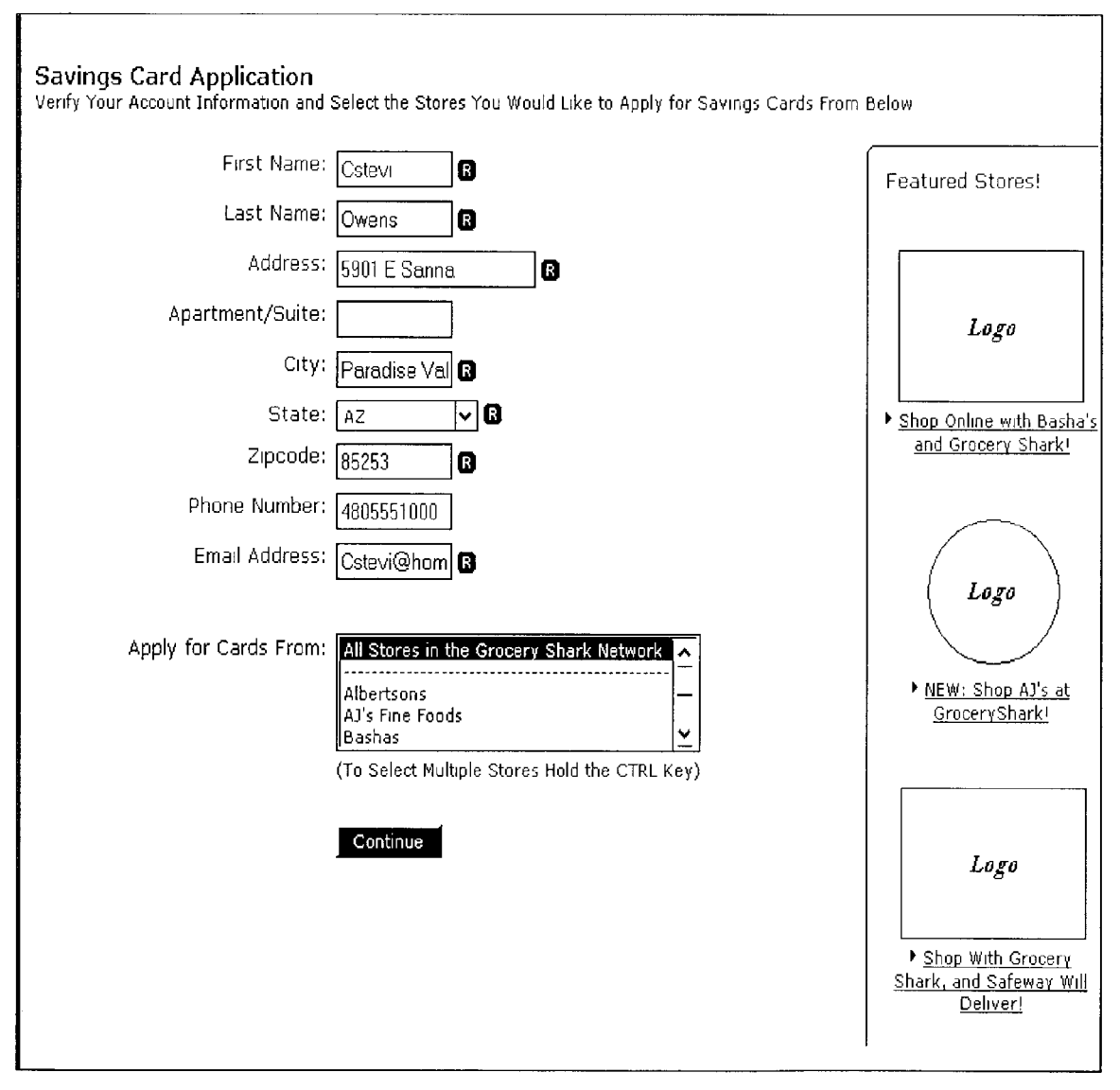
Figure 49:
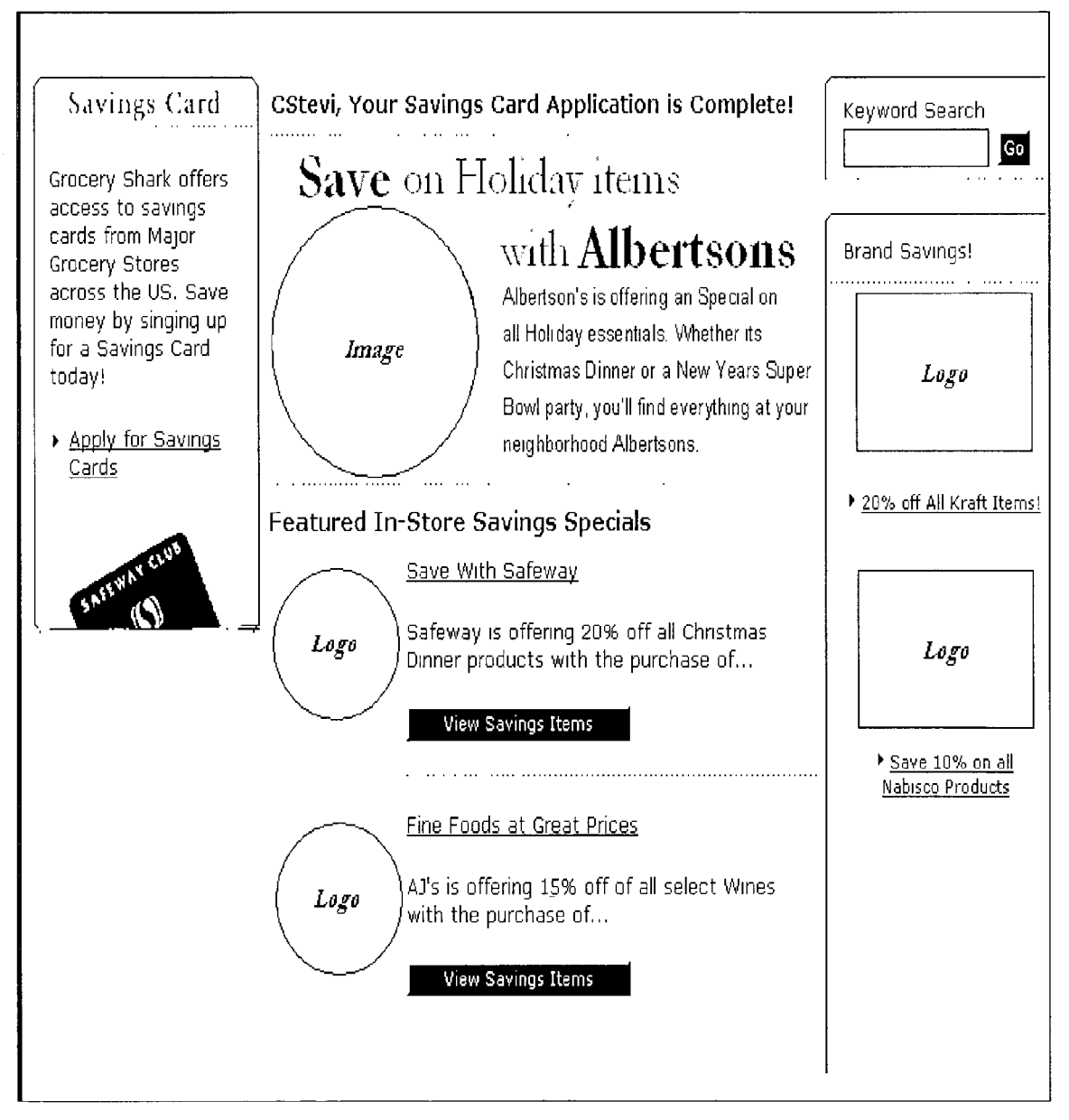

According to a preferred embodiment of the present invention registered users may sign up for grocery store savings card or input their existing grocery story savings card information. Preferably signing up for a grocery store savings card may allow coupons to automatically be applied to purchases made through the grocery shopping web site at the issuing grocery store. The sign up process steps are illustrated in use case "Sign Up For Store Savings Card", FIG. 21 and a preferred input screen is shown in FIG. 48. After successful completion of the grocery store savings card application users are preferably provided an opportunity to review the in-store promotions available as shown in FIG. 49. The user preferably starts the search by selecting the store for which the in-store promotions are of interest as demonstrated in FIG. 50. Preferably, once the user has selected a store the in-store specials are listed for user review as shown in FIG. 51. Additionally, as shown, on FIG. 51 users may preferably add any selected particular grocery item to their shopping cart. The opportunity to review in-store specials is preferably available throughout the shopping process by selecting the Savings tab and the In-Store Specials secondary navigation link. The preferred steps for reviewing in-store sales and promotions are provided in use case "Store sales and promotions information request", provided in FIG. 18.

Figure 54:
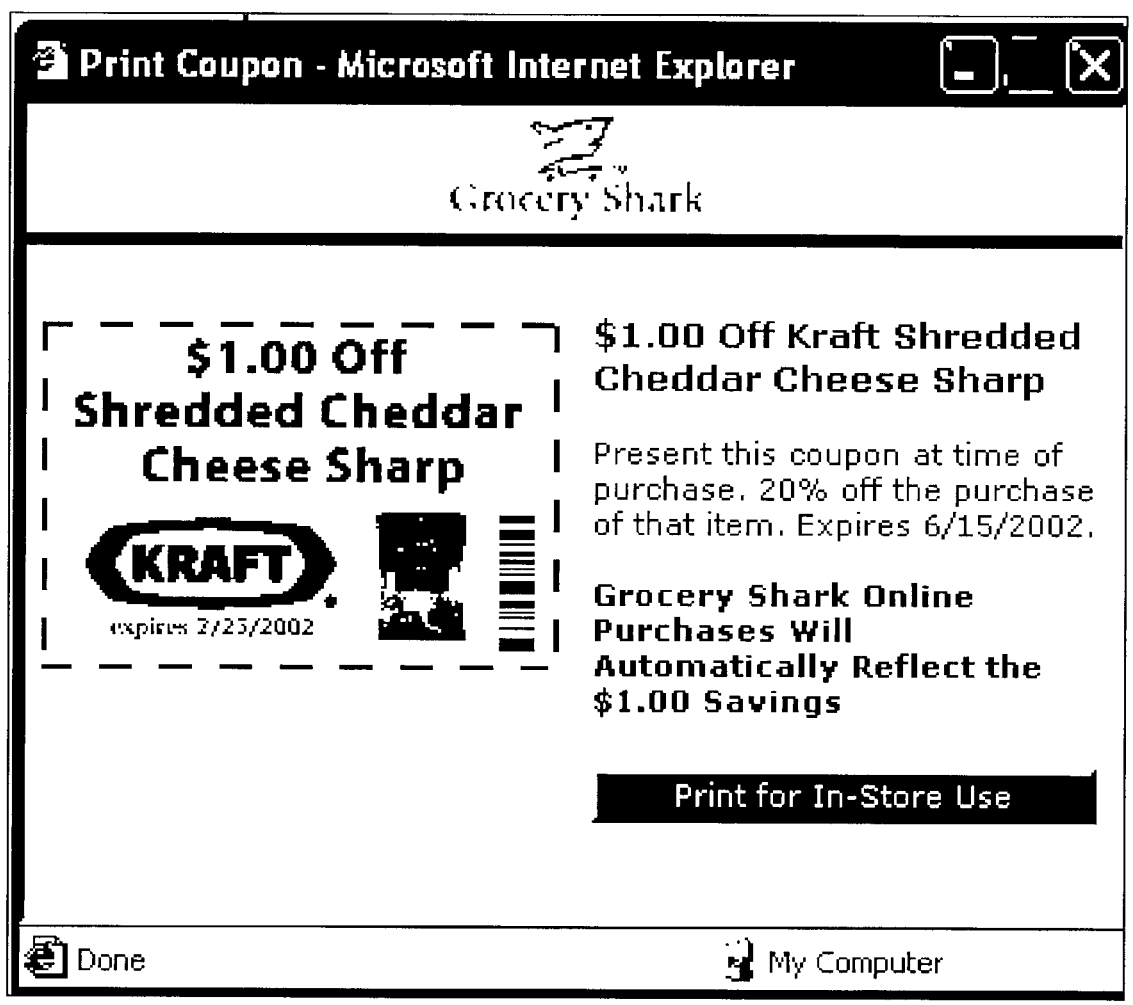
FIG. 54 illustrates a sample screen showing coupon detail to the user, according to a preferred embodiment of the present invention.

Preferably, coupon information is available to users by selecting the Coupons secondary navigation link in the Savings Section of the grocery shopping web site. The coupon search process preferably requires user input of the manufacturer's brand name and Savings Category or keyword as illustrated in FIG. 52. The coupon search results are illustrated in FIG. 53. Particular grocery items returned from the coupon search may preferably be add to the user's shopping list. As noted, coupons for items purchased are preferably automatically saved for either printing, downloading to a user's PDA or transfer to the grocery store where the particular grocery item will be purchased. Preferably, a user may see the details of any coupon found by selecting the item; a sample coupon is shown in FIG. 54. Preferably, if the user desires the coupon may be printed.

The preferred steps for reviewing available coupons are provided in use case "Request available manufacturer's coupon", provided in FIG. 19 and in use case "Download or print any manufacturer's coupons" provided in FIG. 20.

Shopping (Items (3), (4), (5), (6), (7), (8), (9), (10), (14), (20))

Figure 55:
FIG. 55 illustrates a sample screen which presents the shopping area home page of the web site to the user, according to a preferred embodiment of the present invention.

According to a preferred embodiment of the present invention users may access the shopping functions from the Shopping Home Page, illustrated in FIG. 55, which is reached by selecting the main Shopping Tab from any screen on the Grocery Shopping Web Site. Preferably, users may select the secondary navigation link "Build Your Shopping List" to begin creation of a new shopping list (Step 1). The preferred primary screen for building a new shopping list is shown in FIG. 56-A. Each user will preferably use the three tier menu of grocery categories and sub-categories to select grocery item general descriptions which they desire to purchase. Preferably, each selection of an end point of the menu adds the grocery item general description to the user's shopping list. Preferably, after each selection of a grocery item general description its addition to the shopping list is confirmed as illustrated in FIG. 56-B. Alternatively, a user may choose to select a product image displayed as an advertisement and add the particular grocery item to the shopping list. Preferably, at any time during the selection of grocery item general descriptions a user may view the shopping list by selecting the "Today's Shopping List" link. A preferred example of a shopping list display is shown in FIG. 57. FIG. 11 provides the use case "Shopping list creation" which sets out preferred user steps for creating a shopping list.

Preferably a user may, at any time, search for all related particular grocery items related to the grocery item general description included in the shopping list (Step 2 and Step 3). An example of the preferred particular grocery item search results for a grocery item general description is shown in FIG. 58. Preferably this search results screen allow a user to select the particular grocery item and quantity desired at the desired grocery store. This screen preferably allows a user to review all particular grocery items available at each selected grocery store, compare the current prices and select the most desirable particular grocery item at the most convenient grocery store. Preferably, particular grocery items matching dietary requirements of a selected diet plan will be presented ahead of particular grocery items not matching the dietary requirements of a selected diet plan. Preferably, selecting particular grocery items automatically adds them to the shopping cart list for the selected grocery store and accumulates any coupons and sums the total amount of planned purchases.

FIG. 59 illustrates the result of completing the process of selecting particular grocery items for selected grocery stores. This screen, preferably presents the particular grocery items intended for purchase at which grocery store the total expected cost, any expected savings and any remaining grocery item general descriptions not yet resolved.

Figure 60:
FIG. 60 illustrates a sample screen presenting the completed purchases list summarized by preferred store to the user, according to a preferred embodiment of the present invention.

When a user chooses the checkout button at the completion of choosing particular grocery items preferably, a summary of the particular grocery items in the shopping cart for each of the selected grocery stores is displayed (Step 4), as shown in FIG. 60. A user may preferably choose to either print the shopping cart for each selected grocery store, including any related coupons or, a user my choose to purchase the particular grocery items from a selected grocery store by transferring the shopping cart to the web site and completing the purchase using the selected grocery store's e-commerce capabilities (Step 5). A preferred example of a printed shopping cart list and coupons is shown in FIG. 62. Preferably, transferring the shopping cart will also transfer any related coupons. Once a user chooses to transfer a shopping cart list to a selected grocery store's shopping web site they will utilize that grocery store's web site capabilities to determine how the particular grocery items will be obtained, by delivery or pickup, and how payment will be rendered. FIG. 16 provides the use case "Send a shopping list to the store to place an order" which describes the preferred steps for transferring a shopping cart list to a selected grocery store shopping web site.

Preferably, the user may also choose to download any or all of the shopping carts to a PDA. Additionally, preferably a user may choose combinations of actions such as printing the shopping cart for a selected store and choosing to transfer the related coupons to the user's grocery store savings card, thereby preferably eliminating the need to print the coupons; or downloading the shopping cart to a PDA and choosing to transfer the related coupons to the user's grocery store savings card. FIG. 13 provides the use case "Print a shopping list" which describes the preferred user steps for printing a shopping cart list. FIG. 14 provides the, use case "Send a shopping list to personal digital assistant (PDA)" which sets out the preferred user steps for downloading a shopping cart list to a PDA.

Optionally, a user may preferably choose to save a shopping cart list as a shopping list for future use. This is especially helpful for special event (Easter dinner) shopping, where many of the same particular grocery items are purchased each time. A user may also preferably choose to save a shopping list of grocery item general descriptions for future use. FIG. 15 provides a use case "Save current shopping list to user's account" which describes the preferred steps for saving a shopping list or shopping cart list for a registered user. Preferably, a user may also optionally save the shopping cart lists to a pantry list which can be used as a reminder in the future of the items in their physical pantry. Also, preferably a user can use a saved pantry list to suggest possible recipes for a meal.

Additionally, the user will preferably be presented with the opportunity to select and designate products they wish to have contributed to a specified local charity or food bank. Items designated for contribution will be included in the user's total bill and accumulated for later reporting of the total quarterly or annual contributions to the user.

Additionally, a user will preferably be presented with particular grocery item advertisements that are relevant to the particular grocery items entered into the user's shopping cart list. Additionally, the system may suggest particular grocery item based on the best price or other similar store promotion. Additionally, the system may suggest particular grocery items that have been identified as "going well with" a selected particular grocery item for consideration by the user for inclusion in his/her shopping cart list of selected items.

Finally, the user may optionally choose to compare the price of a particular product at the selected store with the price of the product at other stores in the geographic area.

During the selection process preferably the user may optionally view the standard nutrition label information and other information for any particular grocery item.

Shark Shop

According to a preferred embodiment of the present invention users may access the shopping functions from the Shopping Home Page, illustrated in FIG. 55, which is reached by selecting the main Shopping Tab from any screen on the Grocery Shopping Web Site. Preferably, users may access a saved shopping list by selecting the "Start Shopping Using a Saved List" text link. FIG. 63 illustrates a list of saved shopping lists that may preferably be returned. The use case "Saved shopping list access" provided in FIG. 12 further describes the steps that may preferably be followed by a user to access a saved shopping list. As shown, each saved list preferably has been meaningfully named by the user to ease selection of a saved list the meets the user's needs. Preferably, each saved list may preferably be reviewed by selecting the name of the list which is a link to a display of the items contained in the list; such a display is presented in FIG. 64. From this detail list a user may preferably choose to add additional grocery item general descriptions or particular grocery items to the list, in the manner described above, before comparison shopping at the user's preferred stores.

Additionally, a user may preferably choose the review the detail product and nutritional information for any particular grocery item on the list by selecting the particular grocery item name, Preferably, the particular grocery item name is a link to the detail product and nutritional information display, as illustrated in FIG. 65. Furthermore, use case "Shopping list item nutritional information request" shown in FIG. 17 further describes the user actions preferably required to view the detail product and nutritional information for a particular grocery item. The ability to access the detail product and nutritional information for a particular grocery item is preferably available from any screen where the name of a particular grocery item is displayed.

At this point, a user may preferably choose to "Shark Shop" if all the list items are resolved to particular grocery items. "Shark Shop" is preferably a process of the system which will automatically select the particular grocery item from the preferred grocery store where it is priced lowest. In other words, the "Shark Shop" process preferably automatically comparison shops for the items for the user.

Figure 66:
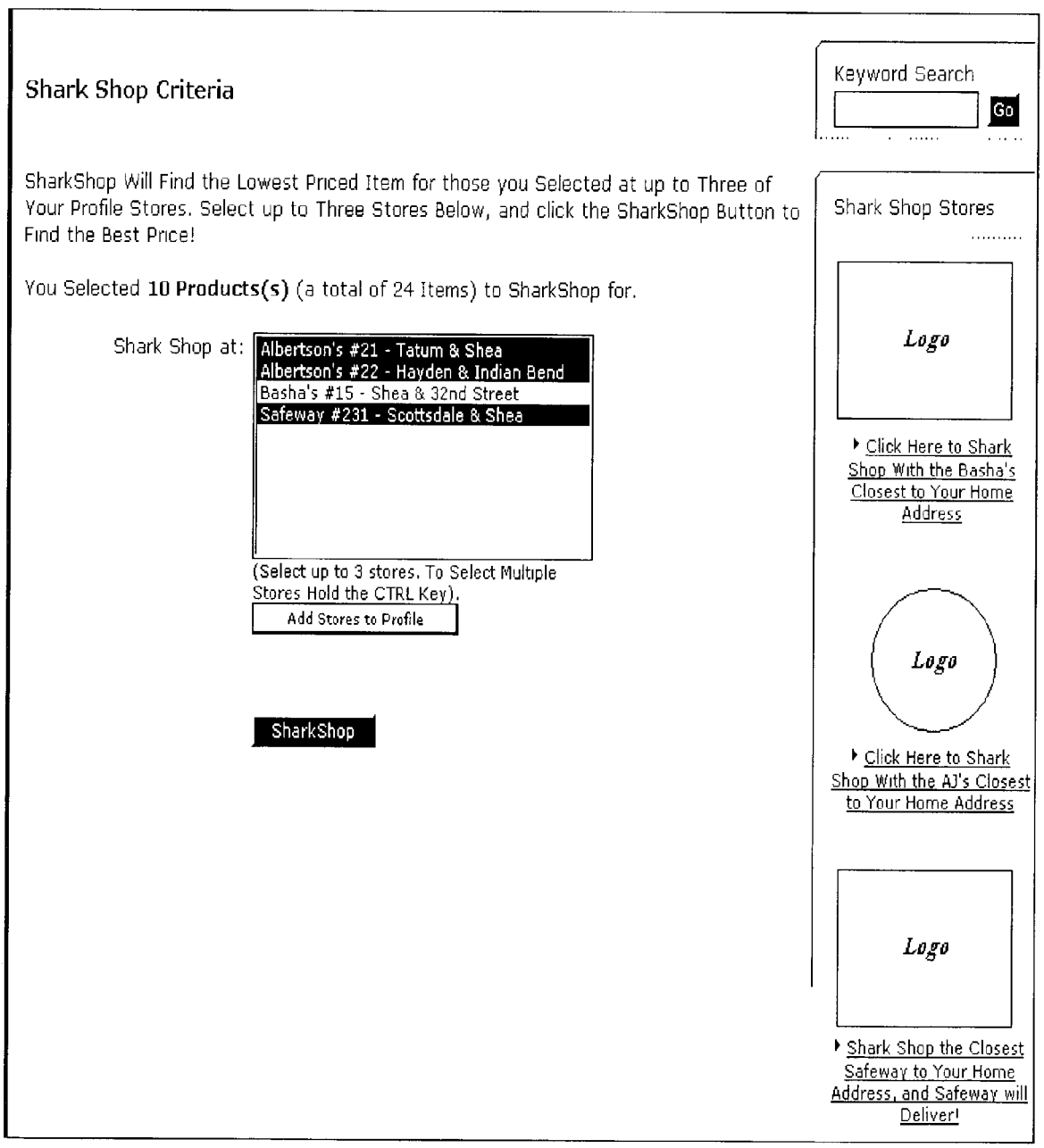
FIG. 66 illustrates a sample screen where the user may select which stores will be searched for the lowest prices for selected items or search for additional stores, according to a preferred embodiment of the present invention.

The first step in the "Shark Shop" process after selecting a saved shopping list is preferably to select the preferred stores to be shopped by selecting the button "Shark Shop for Checked". The grocery store selection screen is illustrated by FIG. 66. While it is not required, users may preferably choose to add another grocery store to their profiles by selecting the "Add stores to Profile" button which presents the Advanced Store Selection screen as shown in FIG. 67. This process preferably permits a user to search for stores within a user determined radius of an address or zip code, or to search within a particular city. Selecting the "Find Stores" button will preferably cause the system to search for stores within the entered criteria. The results of the search are preferably presented on a screen as illustrated in FIG. 68. Preferably, a user may now select a grocery store to be added their profile and clicking on the "Add Checked Stores" button. The result of this action is shown in FIG. 69. Clicking on the "Continue" will preferably return the user may to the screen for selecting which preferred store will be used for the "Shark Shop" process. The preferred store selection screen is demonstrated in FIG. 70.

The second step is preferably begun when the "Shark Shop" button is selected after selecting the "Shark Shop" grocery stores as instructed. The "Shark Shop" process will result in all items on the shopping list being preferably automatically placed in a shopping cart for the preferred grocery store with the lowest price for the particular grocery item. An example of this is shown in FIG. 71.

The final step is preferably completed by selecting the "Checkout" button which allows the user to decide the method for purchasing the items. The purchase options for the user are preferably the same as presented earlier.

My Pantry

Figure 73:
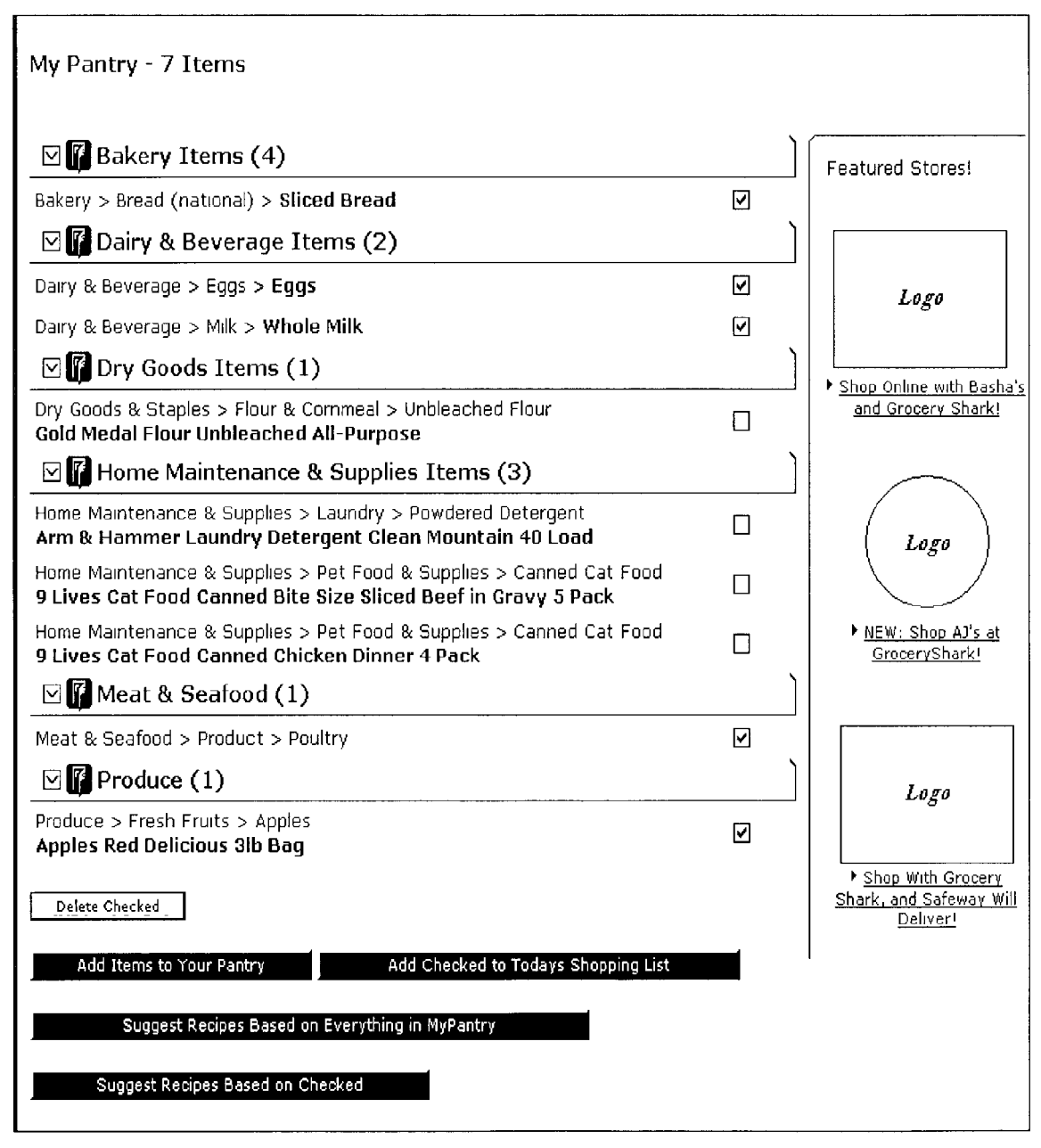

According to a preferred embodiment of the present invention users may select the "My Shark" tab from any screen to access all the personal information stored by the system for their account. The "My Shark" home page is illustrated in FIG. 72. A user may preferably choose to view the list of grocery item general descriptions and particular grocery items previously saved in "My Pantry" by selecting the text link "View Items in My Pantry". The resulting screen is illustrated by FIG. 73. "My Pantry" is preferably intended as an inventory of the items kept by users in their homes. A user's pantry list may preferably be used for a variety of purposes including adding items to a shopping list and suggesting recipes based on some or all of the pantry items.

Preferably by checking specific items on the pantry list and by clicking on the "Suggest Recipes Based on Checked" button users will be presented with a list of recipes that can be prepared using from the checked items as illustrated in FIG. 74. The search results preferably presents a list of recipes which then can be reviewed by a user by selecting the name of a recipe which is a text link to the recipe details. An example of the recipe details that are displayed are shown in FIG. 75. At this point a user preferably has several standard recipe options as shown on the screen, including adding the recipe items to a shopping list or "Shark Shopping" for the items and the option to add the recipe to the user's personal recipe list.

Preferably, by selecting the button "Add to My Recipes" the system will save a copy of the recipe in the user's account. The outcome of this action is illustrated in FIG. 76.

Alternate preferred user steps for managing user's pantry items if provided in use case "Alert when food is running low" provided in FIG. 29 and use case "Disable/modify alert when food is running low" provided in FIG. 30.

Recipes (Item 12)

According to a preferred embodiment of the present invention users my select the "Recipes" tab from any screen to access all the recipes available on the Grocery Shopping Web Site. Users may preferably view a directory of recipes, view only featured recipes from particular grocery item manufacturers and others, find a particular recipe or create a recipe.

A user may preferably select the "Create a Recipe" text link to begin the process of creation and storage of a user's personal recipe. The initial screen for creation of a recipe preferably permits a user to name the recipe, describe the preparation instruction, and identify the recipe's ingredients. A user may preferably identify the ingredients as either grocery item general descriptions or as particular grocery items their unit of measure and required quantity.

Preferably a user will select the "Add Product Category" button which will preferably assist a user in the insertion of grocery item general descriptions, or categories of items, in the ingredient list. A user will select the appropriate grocery item general descriptions from the same three tier menu used to create shopping lists. Selection of an end item on the three tier menu will preferably automatically add the grocery item general description to the recipe and return the user to the Recipe Creation screen. An example of the screen used for selecting grocery item general descriptions is shown in FIG. 79. A user may also preferably add a particular grocery item to a recipe by selecting the "Add Product" button. Selecting the "Add Product" button preferably allows the user to search for the desired particular grocery item with the same process used when adding particular grocery items to a shopping cart. An example of the search result is illustrated in FIG. 80. Clicking on the "Add Product to Recipe" will preferably add the checked particular grocery item to the ingredient list of the recipe being created.

The next step in recipe creation preferably requires the user to classify the recipe to facilitate easy retrieval. The classification process is preferably accomplished using a three tier recipe classification menu as illustrated in FIG. 81. As with other three tier menus used in the system a user clicks on the end point of which best classifies the recipe. Clicking on the end point of the menu will preferably automatically return the user to an updated recipe detail screen as illustrated in FIG. 82.

Alternative preferred user steps are described in use cases "Browse recipes" provided in FIG. 23, "Recipe creation" provided in FIG. 24 and "Edit/delete a recipe" provided in FIG. 25.

Menu and Meal Plans (Item 11)

According to a preferred embodiment of the present invention users may select the "My Shark" tab from any screen to access all the personal information stored by the system for their account. The "My Shark" home page is illustrated in FIG. 72. A user may preferably choose the "My Meals" text link to view all the meals they have saved as illustrated by FIG. 83. From this screen a user preferably may choose any of several options, including viewing the contents of any meal by clicking on the meal name, adding all the contents of a meal to a shopping list by selecting the meal and clicking on the button "Add Checked to Today's Shopping List, deleting a meal or creating a new meal.

The process for creating a new meal involves several steps which are similar to other functions of the system such as creating a recipe or creating a shopping list. However, meals may preferably contain recipes as well as grocery item general descriptions, and particular grocery items. Selecting the "Create Meal" button is the first step in the process. The screen, as shown in FIG. 84, allows the user to name the meal, identify its meal type and begin selecting its contents. Selecting the "Add Product Category" button preferably provide the user the opportunity to use the previously described three tier menu structure to select grocery item general descriptions to be included in the meal. Likewise, selecting the "Add Product" button preferably provides the user the opportunity to use the previously described particular grocery item selection process to identify particular grocery items to be included in the meal. A preferred meal contents screen displaying the results of adding a grocery item general description is presented in FIG. 85. The preferred screen displaying the search results for a particular grocery item is presented in FIG. 86. The preferred meal contents screen displaying the results for adding a particular grocery item is presented in FIG. 87. Finally, selecting the "Add Recipe" button provides the user the opportunity add a saved or manufacturer's recipe to the meal.

Preferably, to add a recipe to a meal a user will use the three tier recipe classification menu to browse the recipes available in a user's preferred recipe classification; such as shown in FIG. 88. After select a desired end point in the three tier recipe classification menu the user is preferably presented with a list recipes as shown in FIG. 89. At this point, the user may preferably check the desired recipe and click on the "Add Checked to Meal" button to add the recipe to the meal. The resulting meal is now presented in an updated meal display as shown in FIG. 90. Once the user is satisfied with the content of the meal it may preferably be saved in the user's list of meals by clicking on the "Save Meal" button. After saving the new meal the user's meal list is updated and the result is displayed, as shown in FIG. 91.

Alternative preferred user steps for meals are described in use cases "Define a meal for a menu plan" provided in FIG. 26, "Create a meal plan" provided in FIG. 27 and "Edit/delete a meal" provided in FIG. 28.

Figure 92:
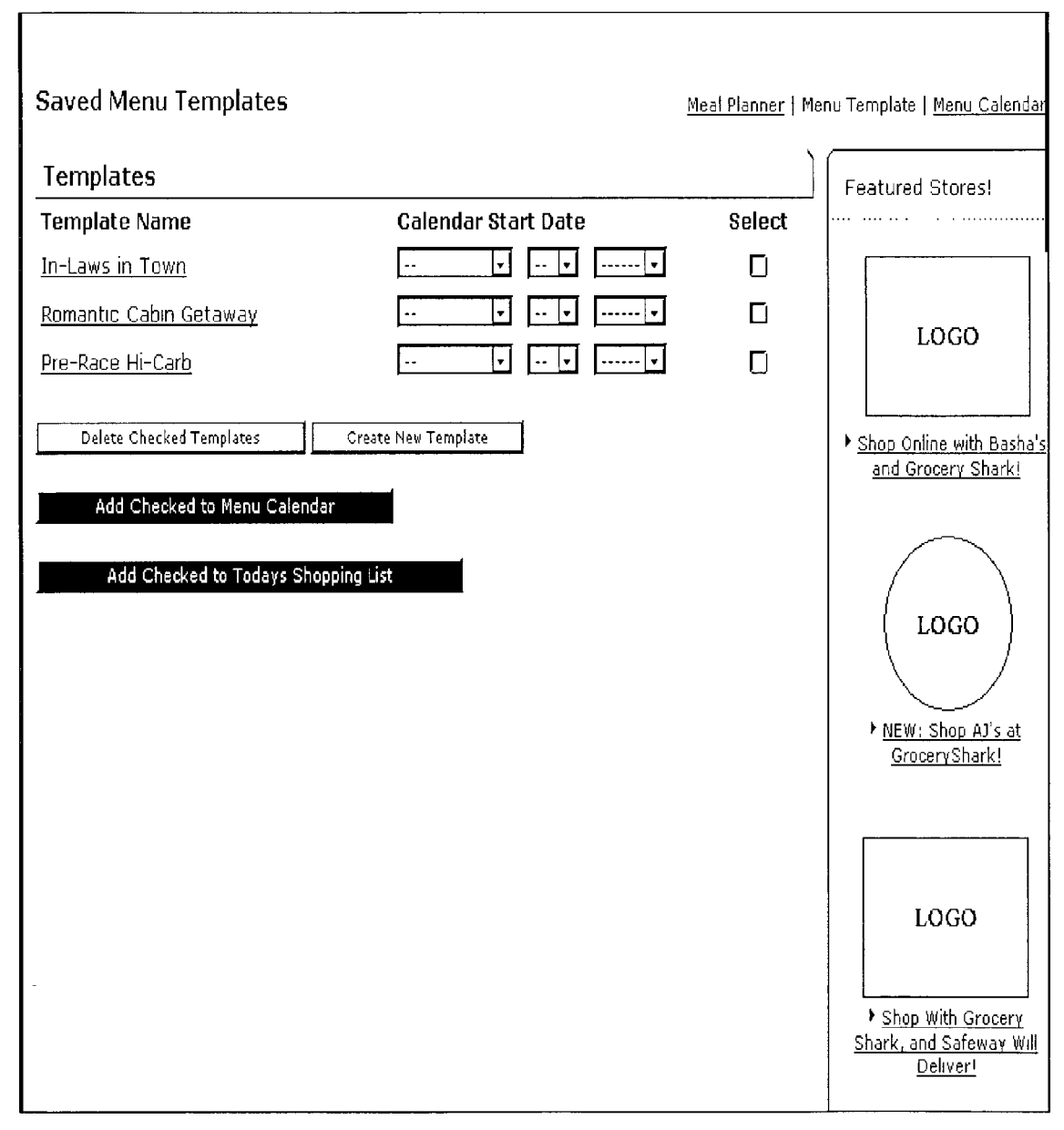

According to a preferred embodiment of the present invention menu plans may be prepared by users from any combination of meals. Additionally, it is preferable for menus plans to span a specified time period which may be a day, multiple days up to a maximum of seven. Creation of a menu plan preferably requires several steps. Preferably, the first step is to view the current list of saved menu templates as shown in FIG. 92. Preferably, this screen may be accessed from a variety of other screens including the "My Shark" home page shown in FIG. 72 and from the "My Meal List" screen shown in FIG. 91. From the Saved Menu Templates" screen preferably a user may view the contents of any saved menu plan, create a menu plan, delete a menu plan, a selected menu plan to the menu calendar or add the contents of a menu plan to a shopping list. To create a menu plan a user will click on the "Create New Template" button which will result in the presentation of "Create Menu Template" screen as shown in FIG. 93. This screen preferably allows the user the name the menu template for future reference, add meals for any time of day and for any day of the menu plan, as well as save the template or view a summary of the template. Selecting the "Add Meal" button for any time of day will preferably result in a list of meals organized by type of meal as illustrated in FIG. 94. Preferably, a user may check specific meals from the list and click on the "Add Checked Meals to Menu Template" button to add one of more to the menu plan. The result of these actions preferably will return the user to the "Create Menu Template" screen which is updated for the additional meals. An example of the preferred screen is shown in FIG. 95. Users may preferably repeat this described process until all the desired meals have been added to the menu template. When all desired meals have been added to a menu template a summary of the meals for a day of the menu plan preferably may be reviewed as shown in FIG. 96. A user may also request to see a summary list of all meals included in a menu plan by selecting the "View Template Summary" button. The preferred resulting list of meals is organized by meal type within menu plan day, as illustrated in FIG. 97. At completion of the process of adding a menu template preferably an updated "Saved Menu Templates" screen is displayed for the user as shown in FIG. 98.

Preferably, a user may add any menu template to the menu calendar from the "Saved Menu Templates" screen. Preferably, by checking a menu template, specifying a starting date and clicking the "Add Checked to Menu Calendar" a menu template can be placed on the Menu Calendar. As illustrated in FIG. 99 the Menu Calendar preferably displays all schedule menu plans in a calendar format. Preferably, a user may delete a day's menu from the calendar or view the meals planned for any day. Additionally, a user may preferably add all the grocery item general descriptions and particular grocery items required to prepare the meals planned for any day to a shopping list.

Best Price Lookup

Figure 100:
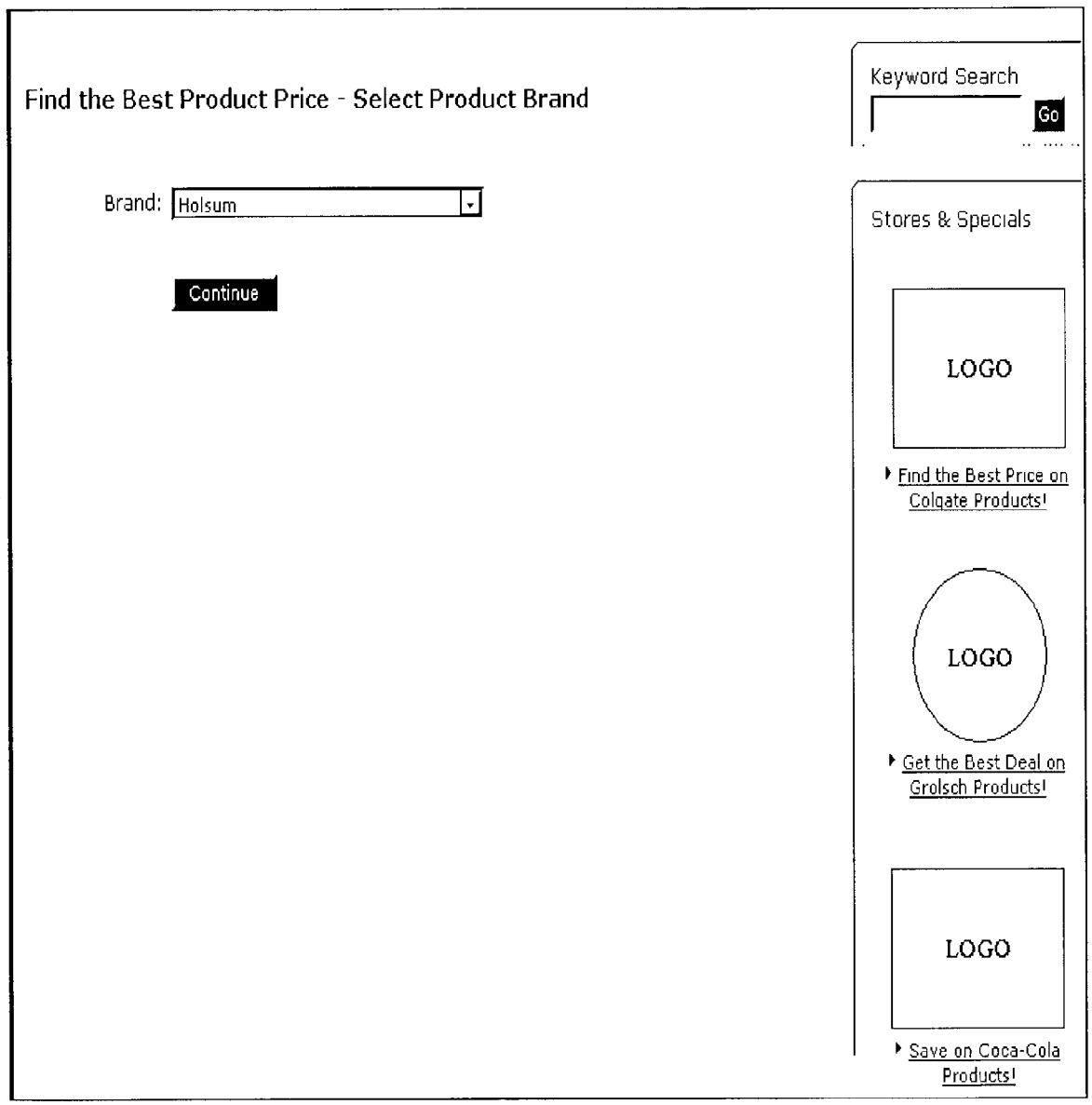
FIG. 100 illustrates a sample screen showing brand selection as the first step in finding the best price for a particular grocery item, according to a preferred embodiment of the present invention.
Figure 102:
FIG. 102 illustrates a sample screen presents the results of searching the user's preferred stores for the best price on a particular grocery item, according to a preferred embodiment of the present invention.

According to a preferred embodiment of the present invention users may preferably search for the best price for any particular grocery item at a number of selected stores. Preferably, this capability may be accessed from the "Shop" home page by clicking on the "Find the Best Price" secondary text link. Preferably a user must specify the specific particular grocery item to find its best price by first selecting the manufacturer's brand name as shown in FIG. 100. Next, preferably a user must specify the specific product and preferably choose to search preferred grocery stores or other selected stores as shown in FIG. 101. Preferably, the results of the search will be displayed as a comparative list sorted in ascending order by price as shown in FIG. 102. Alternative preferred user steps are described in use case "Product search within a particular ZIP code" provided in FIG. 8.

Nutritional Information Lookup

Figure 103:
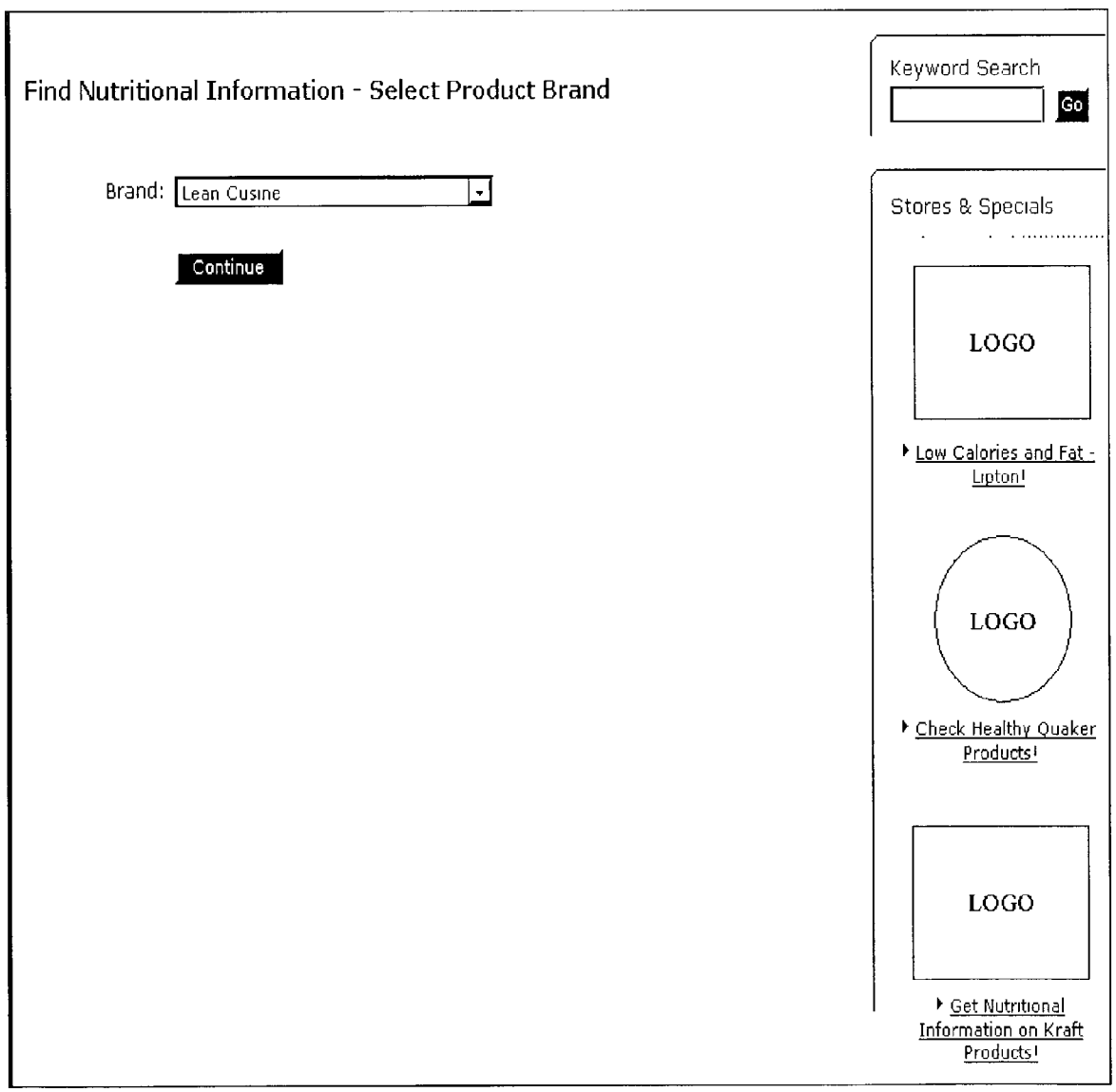
FIG. 103 illustrates a sample screen showing brand selection as the first step in finding the nutritional information for a particular grocery item, according to a preferred embodiment of the present invention.
Figure 104:
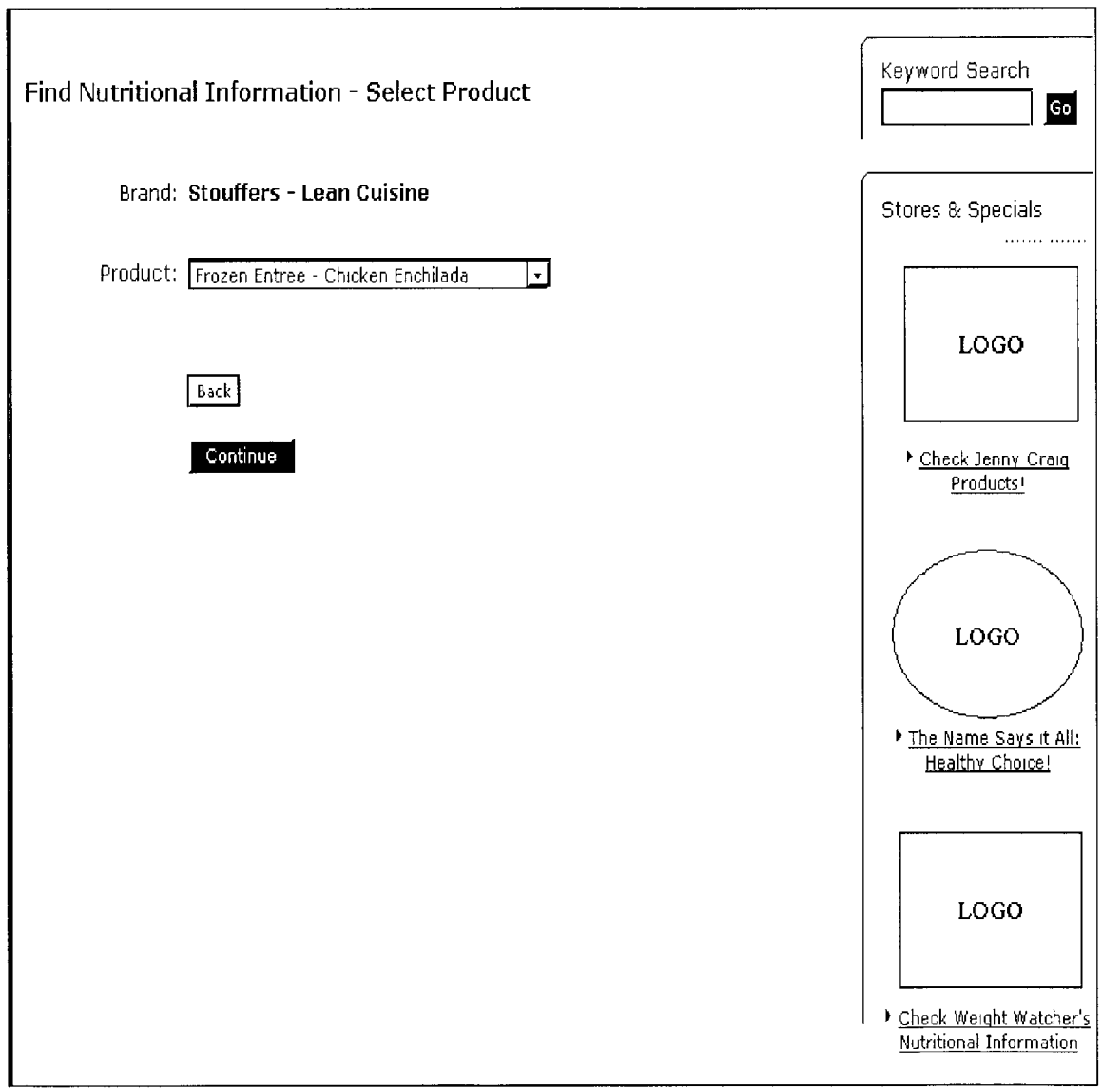
FIG. 104 illustrates a sample screen showing product selection as the second step in finding the nutritional information for a particular grocery item, according to a preferred embodiment of the present invention.

According to a preferred embodiment of the present invention users a user may preferably choose the review the detail product and nutritional information for any particular grocery item. Preferably, this capability may be accessed from the "Shop" home page by clicking on the "Nutritional Information" secondary text link. Preferably a user must specify the specific particular grocery item to find its best price by first selecting the manufacturer's brand name as shown in FIG. 103. Next, preferably a user must specify the specific product and preferably choose to search preferred grocery stores or other selected stores as shown in FIG. 104. Preferably, the results of the search will be displayed as a comparative list sorted in ascending order by price as shown in FIG. 105. Furthermore, use case "Look up the nutritional content of a food item" as provided in FIG. 22 further describes alternate preferred user actions required to view the detail product and nutritional information for a particular grocery item. Alternatively, preferably access to the detail product and nutritional information on a particular grocery item is preferably available from any screen where the name of a particular grocery item is displayed. PDA According to a preferred embodiment of the present invention users may preferably accomplish a number of functions using a PDA. These may preferably include creating shopping lists, editing shopping lists and transferring shopping lists through the user's computer which is connected to the Internet to the Grocery Shopping Web Site. The user steps preferred to accomplish these functions are described in use cases "PDA (Personal Digital Assistant) software installation" provided in FIG. 31, "PDA shopping list creation" provided in FIG. 32, "PDA shopping list edit/delete" provided in FIG. 33 and "PDA shopping list upload to user account" provided in FIG. 34.

External Information Processes (Items 15, 16, 17, 18, 19 21)

According to a preferred embodiment of the present invention an Internet-based interface will preferably be provided to permit requesting, receiving and management of advertising presented to the user which is relevant to items appearing on the user's current shopping list. As is common practice, the agreements preferably will provide for the placement of advertising in return for payment to the Grocery Shopping Web Site Operator based on a display volume measure. The processes employed under each alternative will employ standard industry practices and conventions for data requests, transfers and storage.

According to a preferred embodiment of the present invention the Grocery Shopping Web Site Operator will preferably complete agreements with manufacturers for downloading, storing, managing and presenting manufacturer's nutrition label information. Under appropriate circumstances the information may also preferably be provided via Internet-based requests rather than downloading, storing, managing the data. Additionally, these agreements may preferably include downloading, storing and managing meal plans and menu plans. The processes employed under each alternative will employ standard industry practices and conventions for data requests, transfers and storage. Agreements with manufacturers may also preferably include payments to the Grocery Shopping Web Site Operator for preferential placement of products in search result lists and payment for providing relevant purchasing history of users, products, advertising and coupon usage for use in reporting and analysis of user's buying habits and patterns.

According to a preferred embodiment of the present invention the Grocery Shopping Web Site Operator will preferably complete agreements with grocery stores for downloading, storing and managing each participating store's information, particular grocery item inventory information and in-store promotions. Under appropriate circumstances the information may also preferably be provided via Internet-based requests rather than downloading, storing, managing the data. The processes employed under each alternative will employ standard industry practices and conventions for data requests, transfers and storage. Agreements with grocery stores may also preferably include payments to the Grocery Shopping Web Site Operator for preferential placement of grocery store logo and products in search result lists and payment for providing relevant purchasing history of users, products, advertising and coupon usage for use in reporting and analysis of user's buying habits and patterns.

According to a preferred embodiment of the present invention the Grocery Shopping Web Site Operator will preferably complete agreements with coupon clearinghouses for downloading, storing and managing manufacturer's coupon and special promotion information. Under appropriate circumstances the information may also preferably be provided via Internet-based requests rather than downloading, storing, managing the data. The processes employed under each alternative will employ standard industry practices and conventions for data requests, transfers and storage. Agreements with coupon clearinghouses may also preferably include payments to the Grocery Shopping Web Site Operator for providing relevant purchasing history of users, products, advertising and coupon usage for use in reporting and analysis of user's buying habits and patterns.

According to a preferred embodiment of the present invention the Grocery Shopping Web Site Operator will preferably complete agreements with grocery stores for downloading user's savings from coupons to the selected grocery store's savings card database which then can be applied as a reduction in the user's total cost at the time of payment. Under appropriate circumstances the information may also preferably be provided via Internet-based process rather than downloading, the data. The processes employed under each alternative will employ standard industry practices and conventions for data requests, transfers and storage.

According to a preferred embodiment of the present invention the Grocery Shopping Web Site Operator will preferably complete agreements with diet plan providers for downloading, storing and managing diet plan information. Under appropriate circumstances the information may also preferably be provided via Internet-based requests rather than downloading, storing, managing the data. The processes employed under each alternative will employ standard industry practices and conventions for data requests, transfers and storage. Agreements with diet plan providers may also preferably include payments to the Grocery Shopping Web Site Operator for providing relevant purchasing history of users, products, advertising, diet plan usage and coupon usage for use in reporting and analysis of user's buying habits and patterns.

The present invention is described in terms of the above examples and embodiments. While certain preferred embodiments of the invention have been described, these embodiments have been presented by way of example only, and are not intended to limit the scope of the present invention. Additional advantages and modifications will readily occur to those skilled in the art from the above descriptions and the below claims. Accordingly, departures may be made from details described herein without departing from the spirit or scope of the general inventive concepts.

What is claimed:

1. A computer-readable medium, having a set of computer-executable instructions to perform method steps for an Internet web site shopping system, the method steps comprising:
    a) storing at least one organized listing of a plurality of grocery item general descriptions;
    b) storing information describing at least two unrelated grocery stores;
    c) relating at least one particular grocery item to at least one grocery item general description from such at least one organized listing of a plurality of grocery item general descriptions;
    d) storing, for each of such at least two unrelated grocery stores, comparison information relating to such at least one particular grocery item;
    e) assisting user selection of such at least two unrelated grocery stores;
    f) assisting selecting of such at least one grocery item general description from such at least one organized listing of a plurality of grocery item general descriptions;
    g) presenting such comparison information for such at least one particular grocery item available in such selected at least two grocery stores related to such selected at least one grocery item general description;
    h) assisting user selection of such at least one particular grocery item to be purchased at such at least one selected grocery store;
    i) receiving at least one diet plan;
    j) storing such at least one diet plan;
    j) receiving at least one dietary requirement related to such at least one diet plan;
    k) storing such at least one dietary requirement related to such at least one diet plan;
    l) assisting user selection of such at least one diet plan;
    m) relating such at least one dietary requirement of such selected at least one diet plan to such at least one particular grocery item; and
    n) presenting such at least one particular grocery item related to both such at least one dietary requirement of such selected at least one diet plan and to such selected at least one grocery item general description ahead of such at least one particular grocery item related only to such selected at least one grocery item general description.

2. The method according to claim 1 further comprising:
    a) adding such selected at least one grocery item general description to at least one shopping list;
    b) storing such at least one shopping list;
    c) assisting user selection of such at least one shopping list;
    d) assisting user selection of such at least one grocery item general description from selected such at least one shopping list; and
    e) removing such at least on grocery item general description from such at least one shopping list.

3. The method according to claim 2 further comprising:
    a) receiving at least one recipe from at least one grocery item manufacturer;
    b) storing such at least one recipe;
    c) displaying such at least one recipe;
    d) assisting user input of such at least one recipe;
    e) adding such at least one grocery item general description to such at least one recipe;
    f) adding such at least one particular grocery item to such at least one recipe;
    g) assisting user selection of such at least one recipe;
    h) adding such at least one grocery item general description from such selected at least one recipe to such at least one shopping list; and
    i) adding such at least one particular grocery item from such selected at least one recipe to such at least one shopping list.

4. The method according to claim 2 further comprising:
    a) assisting user input of meal plans;
    b) storing meal plans;
    c) adding such at least one recipe to such at least one meal plan;
    d) adding such at least one grocery item general description to such at least one meal plan;
    e) adding such at least one particular grocery item to such at least one meal plan;
    f) assisting user selection of such at least one meal plan;
    g) adding such at least one grocery item general description from such selected at least one meal plan to such at least one shopping list; and
    h) adding such at least one particular grocery item from such selected at least one meal plan to such at least one shopping list.

5. The method according to claim 2 further comprising:
    a) assisting user input of menu plans;
    b) storing menu plans;
    c) adding such at least one meal plan to such at least one menu plan;
    d) assisting user selection of such at least one menu plan;
    e) adding such at least one particular grocery item from such selected at least one menu plan to such at least one shopping list; and
    f) adding such at least one grocery item general description from such selected at least one menu plan to such at least one shopping list.

6. The method according to claim 2 further comprising:
    a) receiving such information describing such at least two unrelated grocery stores.

7. The method according to claim 2 further comprising:
    a) receiving, for each of such at least two grocery stores, such at least one particular grocery item comparison information; and
    b) receiving, for each of such at least two grocery stores, shelf location information related to such at least one particular grocery item.

8. The method according to claim 2 further comprising:
    a) adding such selected at least one particular grocery item to at least one purchases list;

b) transferring such at least one purchases list to such selected at least one grocery store; and c) assisting user access to at least one shopping web site for such selected at least one grocery store.

9. The method according to claim 8 further comprising:

a) transferring such at least one purchases list to at least one PDA.

10. The method according to claim 8 further comprising:

a) printing such at least one purchases list.

11. The method according to claim 8 further comprising:

a) saving such at least one purchases list as such at least one shopping list.

12. The method according to claim 8 further comprising:

a) saving such at least one purchases list as at least one pantry list;

b) storing such at least one pantry list;

c) assisting user selection of such at least one particular grocery item to be added to such at least one pantry list;

d) assisting user selection of such at least one particular grocery item to be removed from such at least one pantry list;

e) assisting user selection of such at least one particular pantry list; and f) adding such at least one particular grocery item from such selected at least one pantry list to such at least one shopping list.

13. The method according to claim 8 further comprising:

a) assisting user designation of such at least one particular grocery item included in such at least one purchases list as a charitable donation; and b) transferring such charitable donation information to such at least one such selected at least one grocery store.

14. The method according to claim 1 further comprising:

a) receiving such information describing such at least two unrelated grocery stores.

15. The method according to claim 1 further comprising:

a) receiving, for each of such at least two grocery stores, such at least one particular grocery item comparison information; and b) receiving, for each of such at least two grocery stores, shelf location information related to such at least one particular grocery item.

16. The method according to claim 1 further comprising:

a) adding such selected at least one particular grocery item to at least one purchases list;

b) transferring such at least one purchases list to such selected at least one grocery store; and c) assisting user access to at least one shopping web site for such selected at least one grocery store.

17. The method according to claim 16 further comprising:

a) assisting user selection of such at least one shopping list;

b) assisting user selecting of a plurality of such particular grocery items from such selected shopping list;

c) assisting user selection of such at least one grocery store;

d) adding such plurality of grocery items to purchases list for such selected grocery store; and e) storing such at least one purchases list for such selected grocery store.

18. The method according to claim 1, wherein said at least one computer interface system structured and arranged to assist user selection of such at least two grocery stores comprises:

a) assisting user selection of at least one preferred shopping area; and b) assisting user selection of such at least two unrelated grocery stores within such at least one preferred shopping area.

19. The method according to claim 1 further comprising:

a) assisting registering such at least one user;

b) storing demographic information of such at least one user; and c) recording such at least one particular grocery item selected for purchase by such at least one user.

20. The method according to claim 1 further comprising:

a) receiving advertising information;

b) relating such advertising information to such at least one particular grocery item selected for purchase; and c) presenting to such at least one user such advertising information related to such at least one particular grocery item selected for purchase.

21. Internet web site shopping system comprising:

a) means for storing at least one organized listing of a plurality of grocery item general descriptions;

b) means for storing information describing at least two unrelated grocery stores;

c) means for relating at least one particular grocery item to at least one grocery item general description from such at least one organized listing of a plurality of grocery item general descriptions;

d) means for storing, for each of such at least two unrelated grocery stores, comparison information relating to such at least one particular grocery item;

e) means for user selecting of such at least two unrelated grocery stores;

f) means for user selecting of such at least one grocery item general description from such at least one organized listing of a plurality of grocery item general descriptions;

g) means for presenting such comparison information for such at least one particular grocery item available in such selected at least two grocery stores related to such selected at least one grocery item general description;

h) means for user selecting of such at least one particular grocery item to be purchased at such at least one selected grocery store;

i) means for receiving at least one diet plan;

j) means for storing such at least one diet plan;

k) means for receiving at least one dietary requirement related to such at least one diet plan;

l) means for storing such at least one dietary requirement related to such at least one diet plan;

m) means for user selecting of such at least one diet plan;

n) means for relating such at least one dietary requirement of such selected at least one diet plan to such at least one particular grocery item; and o) means for presenting such at least one particular grocery item related to both such at least one dietary requirement of such selected at least one diet plan and to such selected at least one grocery item general description ahead of such at least one particular grocery item related only to such selected at least one grocery item general description.

22. Internet web site shopping system comprising:

a) means for storing at least one organized listing of a plurality of grocery item general descriptions;

b) means for storing information describing at least two unrelated grocery stores;

c) means for relating at least one particular grocery item to at least one grocery item general description from such at least one organized listing of a plurality of grocery item general descriptions;

d) means for storing, for each of such at least two unrelated grocery stores, comparison information relating to such at least one particular grocery item;
e) means for user selecting of such at least two unrelated grocery stores;
f) means for user selecting of such at least one grocery item general description from such at least one organized listing of a plurality of grocery item general descriptions;
g) means for presenting such comparison information for such at least one particular grocery item available in such selected at least two grocery stores related to such selected at least one grocery item general description;
h) means for user selecting of such at least one particular grocery item to be purchased at such at least one selected grocery store;
i) means for adding such selected at least one grocery item general description to at least one shopping list;
j) means for storing such at least one shopping list;
k) means for user selecting of such at least one shopping list;
l) means for user selecting such at least one grocery item general description from such selected at least one shopping list;
m) means for removing such at least on grocery item general description from such at least one shopping list;
n) means for adding such selected at least one particular grocery item to at least one purchases list;
o) means for transferring such at least one purchases list to such selected at least one grocery store;
p) means for permitting user access to at least one shopping web site for such selected at least one grocery store;
q) means for user designating of such at least one particular grocery item included in such at least one purchases list as a charitable donation; and
r) means for transferring such charitable donation information to such at least one such selected at least one grocery store.

23. A computer-readable medium, having a set of computer-executable instructions to perform method steps for an Internet web site shopping system, the method steps comprising:

a) storing at least one organized listing of a plurality of grocery item general descriptions;
b) storing information describing at least two unrelated grocery stores;
c) relating at least one particular grocery item to at least one grocery item general description from such at least one organized listing of a plurality of grocery item general descriptions;
d) storing, for each of such at least two unrelated grocery stores, comparison information relating to such at least one particular grocery item;
e) assisting user selection of such at least two unrelated grocery stores;
f) assisting selecting of such at least one grocery item general description from such at least one organized listing of a plurality of grocery item general descriptions;
g) presenting such comparison information for such at least one particular grocery item available in such selected at least two grocery stores related to such selected at least one grocery item general description;
h) assisting user selection of such at least one particular grocery item to be purchased at such at least one selected grocery store;
i) receiving at least one diet plan;
j) storing such at least one diet plan;
k) receiving at least one dietary requirement related to such at least one diet plan;
l) storing such at least one dietary requirement related to such at least one diet plan;
m) assisting user selection of such at least one diet plan;
n) relating such at least one dietary requirement of such selected at least one diet plan to such at least one particular grocery item; and
o) presenting such at least one particular grocery item related to both such at least one dietary requirement of such selected at least one diet plan and to such selected at least one grocery item general description ahead of such at least one particular grocery item related only to such selected at least one grocery item general description.

* * * * *